(12) United States Patent
Sasaki

(10) Patent No.: US 9,179,152 B2
(45) Date of Patent: *Nov. 3, 2015

(54) IMAGE PROCESSING DEVICE AND METHOD

(71) Applicant: SONY CORPORATION, Tokyo (JP)

(72) Inventor: Masao Sasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,007

(22) Filed: Jul. 15, 2014

(65) Prior Publication Data

US 2014/0328386 A1 Nov. 6, 2014

Related U.S. Application Data

(63) Continuation of application No. 13/639,056, filed as application No. PCT/JP2011/058166 on Mar. 31, 2011, now Pat. No. 8,824,813.

(30) Foreign Application Priority Data

Apr. 9, 2010 (JP) ................................. 2010-090960

(51) Int. Cl.
*G06K 9/46* (2006.01)
*H04N 19/13* (2014.01)
(Continued)

(52) U.S. Cl.
CPC ............. *H04N 19/13* (2014.11); *H04N 19/174* (2014.11); *H04N 19/176* (2014.11); *H04N 19/196* (2014.11); *H04N 19/436* (2014.11); *H04N 19/61* (2014.11); *H04N 19/91* (2014.11)

(58) Field of Classification Search
USPC ................. 382/247, 232, 233, 238, 239, 243; 341/51, 52, 56, 107; 345/555; 358/426.04; 375/240.01, 240.02, 375/240.26, E7.082
See application file for complete search history.

(56) References Cited

U.S. PATENT DOCUMENTS 7,079,057 B2 * 7/2006 Kim et al. ...................... 341/107
7,924,925 B2    4/2011 He ............................. 375/240.01
(Continued)

FOREIGN PATENT DOCUMENTS

JP      9-275561 A    10/1997
JP   2005-347780 A    12/2005
(Continued)

OTHER PUBLICATIONS

Office Action issued Oct. 30, 2014 in Japanese Patent Application No. 2010-090960 (with English language translation).
(Continued)

*Primary Examiner* — Anh Do
(74) *Attorney, Agent, or Firm* — Oblon, McClelland, Maier & Neustadt, L.L.P.

(57) ABSTRACT

An image processing device that encodes image data including: an encoding unit which, with a small region line including, arrayed in the horizontal direction, small regions obtained by dividing large regions arrayed in the vertical direction of an image, performs encoding of image data of the large region, advancing the encoding order of small regions in the same order as a scan order, and advancing the encoding order of small region lines in an order different from the scan order; and a control unit that controls the encoding unit to encode in accordance with a state of a left small region situated at a left periphery of a small region to be processed, and a state of a lower small region situated at a lower periphery of the small region to be processed. The device suppresses deterioration in encoding efficiency due to high speed image encoding.

8 Claims, 30 Drawing Sheets

(51) Int. Cl.
*H04N 19/176* (2014.01)
*H04N 19/196* (2014.01)
*H04N 19/61* (2014.01)
*H04N 19/91* (2014.01)
*H04N 19/174* (2014.01)
*H04N 19/436* (2014.01)

(56) References Cited

U.S. PATENT DOCUMENTS

| | | | |
|---|---|---|---|
| 8,566,515 B2 | 10/2013 | Rubinstein et al. | 711/104 |
| 8,582,656 B2 | 11/2013 | Lin et al. | 375/240.26 |
| 8,619,874 B2 | 12/2013 | Lin et al. | 375/240.26 |
| 8,660,193 B2 | 2/2014 | Rubinstein et al. | 375/240.26 |
| 8,743,969 B2 * | 6/2014 | Sasai et al. | 375/240.26 |
| 8,792,739 B2 * | 7/2014 | Sasai et al. | 382/233 |
| 8,811,762 B2 * | 8/2014 | Sasai et al. | 382/239 |

FOREIGN PATENT DOCUMENTS

| | | |
|---|---|---|
| WO | 2010/029850 | 3/2010 |
| WO | WO 2011/052142 A1 | 5/2011 |

OTHER PUBLICATIONS

Office Action issued Oct. 30, 2014 in Japanese Patent Application No. 2014-046151 (with English language translation).
Vivienne Sze, et al., "Massively Parallel CABAC" ITU—Telecommunications Standardization Sector STUDY GROUP 16 Question 6 Video Coding Experts Group (VCEG) 38$^{th}$ Meeting, Jul. 2009, 11 Pages.
U.S. Appl. No. 14/331,964, filed Jul. 15, 2014, Sasaki.
Office Action issued Feb. 4, 2014 in Japanese Patent Application No. 2010-090960.
Jie Zhao et al., "New Results Using Entropy Slices for Parallel Decoding", ITU—Telecommunications Standardization Sector, STUDY GROUP 16 Question 6, Video Coding Experts Group (VCEG), VCEG-AI32, 35$^{th}$ Meeting, Jul. 16-18, 2008, 9 pages.
Xun Guo et al., "Ordered Entropy Slices for Parallel CABAC", ITU—Telecommunications Standardization Sector, STUDY GROUP 16 Question 6, Video Coding Experts Group (VCEG), VCEG-AK25, 37$^{th}$ Meeting, Apr. 15-18, 2009, 8 pages.
International Search Report Issued Jul. 5, 2011 in PCT/JP11/58166 Filed Mar. 31, 2011.
Office Action issued Jun. 4, 2015 in Japanese Patent Application No. 2010-090960 (with English language translation).
Office Action issued Jun. 4, 2015 in Japanese Patent Application No. 2014-046151 (with English language translation).

* cited by examiner

FIG. 22

| SLICE 1 |
|---------|
| SLICE 2 |
| SLICE 3 |
| SLICE 4 |

IMAGE PROCESSING DEVICE AND METHOD

CROSS REFERENCE TO RELATED APPLICATIONS

This application is a continuation of U.S. Ser. No. 13/639,056 filed Oct. 2, 2012, the entire content of which is incorporated herein by reference, and claims the benefit of priority from, PCT Application No. PCT/JP11/058,166 filed Mar. 31, 2011, and is further based upon, and claims the benefit of priority under 35 U.S.C. §119 from, Japanese Patent Application No. 2010-090960 filed Apr. 9, 2010.

TECHNICAL FIELD

The present disclosure relates to an image processing device and method, and more particularly relates to an image processing device and method enabling deterioration in encoding efficiency due to increased speed of image encoding to be suppressed.

BACKGROUND ART

Conventionally, with the AVC (Advanced Video Coding) image encoding format, CABAC (Context-based Adaptive Binary Arithmetic Coding) and CAVLC (Context-based Adaptive Variable Length Coding) have been defined as entropy encoding. Of these, CABAC is a binary arithmetic encoding format which performs encoding adaptively in accordance with surrounding situations (context (Context)).

With arithmetic encoding, processing is repeated in which a numeric section is divided in accordance with occurrence probability for each single symbol, thereby obtaining a code string. That is to say, there is the need to sequentially process all symbols, and since parallel processing has been difficult, making the processing high-speed has been difficult.

Accordingly, with AVC, enabling high throughput has been realized using a technique called multi slice (multi slice). With multi slice, an image is divided into multiple regions as shown in A in FIG. 1, and CABAC encoding processing is independently performed on each. That is to say, as indicated by the dotted arrows in A in FIG. 1, arithmetic encoding is performed for each macroblock, in the order heading from a macroblock line at the upper side within the image toward a macroblock line at the lower side within the image. Thus, CABAC encoding can be performed in parallel for each region, thereby realized high-speed processing. These divided regions are called slices (slice).

The macroblocks are each encoded while referencing other adjacent macroblocks, as shown in B in FIG. 1 and C in FIG. 1.

However, dividing regions is a factor in reducing encoding efficiency. Firstly, each slice is independently encoded, so as shown in B in FIG. 1 and C in FIG. 1, mutual reference cannot be performed in the encoding of each region (slice). Accordingly, intra-screen prediction (intra-prediction) at the boundary portion cannot be used, and there has been the concern that encoding efficiency would deteriorate.

Secondly, with CABAC, the state of surrounding macroblocks is referenced to select a symbol occurrence probability table, as shown in C in FIG. 1, but since reference of adjacent macroblocks is impossible at the boundary portion, there has been the concern that selection of a suitable occurrence probability table would be difficult.

Thirdly, the symbol occurrence probability table used with CABAC converges on actual occurrence probability as encoding progresses and the encoding efficiency increases, but with the case of multi slice (multi slice), the symbol occurrence probability table is initialized each region (slice), so there has been the concern that the encoding efficiency at the start point of the slice (slice) would deteriorate.

There has been proposed an entropy slice (entropy slice) format as a technique for improving encoding efficiency while performing CABAC in parallel (e.g., see NPL 1). According to this format, just the CABAC processed portion is divided into regions called entropy slices (entropy slice) and executed in parallel, so intra-screen prediction could be used at the entropy slice (entropy slice) boundary as well. However, surrounding macroblock reference in CABAC processing has been unusable at the entropy slice (entropy slice) boundary.

As a further improvement technique, the ordered entropy slices (ordered entropy slices) format has been proposed (e.g., see NPL 2). According to this format, reference of adjacent macroblocks has been enabled at the boundary portion for CABAC processing as well.

CITATION LIST

Non Patent Literature

NPL 1: A. Segall, J. Zhao, "Entropy slices for parallel entropy decoding", VCEG input document COM16-C405, Geneva, CH, April 2008

NPL 2: Xun Guo, Yu-Wen Huang, Shawmin Lei "Ordered Entropy Slices for Parallel CABAC", VCEG input document VCEG-AK25, Yokohama, Japan, April 2009

SUMMARY OF INVENTION

Technical Problem

However, in order to encode the second entropy slice (entropy slice), the processing of macroblocks of the first entropy slice (entropy slice) which is adjacent at the top thereof must have been encoded, leading to interdependence among slices (slice), and the merit of performing in parallel was lost. That is to say, achieving high speed with parallel execution of CABAC processing, which is the original object, has been difficult.

The present disclosure has been made in light of this situation, and it is an object thereof to suppress deterioration in encoding efficiency due to high speed image encoding.

Solution to Problem

One aspect of the present disclosure is an image processing device which encodes image data, the image processing device including: an encoding unit which, with a small region line in which are arrayed in the horizontal direction small regions obtained by dividing large regions arrayed in the vertical direction of an image as an object, performs encoding of image data of the large region, advancing the encoding order of small regions in the same order as with the scan order, and advancing the encoding order of small region lines in an order different from the scan order; and a control unit which controls the encoding unit so as to encode in accordance with a state of a left small region situated at a left periphery of a small region to be processed, and a state of a lower small region situated at a lower periphery of the small region to be processed.

The encoding unit may, with image data of a large region situated odd-numbered from the top of the image as an object, advance the encoding order of small regions in the same order as with the scan order, and advance the encoding order of small region lines in an order different from the scan order.

The control unit may, with image data of a large region situated odd-numbered from the top of the image as an object, control the encoding unit so as to encode image data of a small region to be processed without referencing the state of a small region situated one below the small region to be processed, for a small region line situated at the bottommost position of a large region to be processed.

In the event that image data of a small region line situated at the bottommost position of a large region to be processed has been stored in a storage unit, the control unit may, with image data of a large region situated odd-numbered from the top of the image as an object, control the encoding unit so as to read out and encode the image data from the storage unit in the order of the encoding.

The encoding unit may, with image data of a large region situated even-numbered from the top of the image as an object, advance the encoding order of small regions in the same order as with the scan order for the small region lines, and advance the encoding order of the small region lines in the same order as with the scan order.

The control unit may, with image data of a large region situated even-numbered from the top of the image as an object, for a small region line situated at the topmost position of a large region to be processed, control the encoding unit so as to encode image data of a small region to be processed while referencing the state of a small region of the small region line situated at the bottommost position in a large region situated one above the large region.

In the event that image data of a small region line situated at the topmost position of a large region to be processed has been stored in a storage unit, the control unit may, with image data of a large region situated even-numbered from the top of the image as an object, may control the encoding unit so as to read out and encode the image data from the storage unit in the order of the encoding.

The encoding unit may advance the encoding order of the small region lines in the opposite order from the scan order.

The scan order may be a raster scan order.

Also, an aspect of the present disclosure is an image processing method of an image processing device which encodes image data, wherein an encoding unit, with a small region line in which are arrayed in the horizontal direction small regions obtained by dividing large regions arrayed in the vertical direction of an image as an object, performs encoding of image data of the large region, advancing the encoding order of small regions in the same order as with the scan order, and advancing the encoding order of small region lines in an order different from the scan order; and a control unit controls the encoding unit so as to encode in accordance with a state of a left small region situated at a left periphery of a small region to be processed, and a state of a lower small region situated at a lower periphery of the small region to be processed.

Another aspect of the present disclosure is an image processing device which decodes encoded data of image data which has been encoded, the image processing device including: a decoding unit which, with a small region line in which are arrayed in the horizontal direction small regions obtained by dividing large regions arrayed in the vertical direction of an image to which the encoded data corresponds as an object, performs decoding of encoded data of the large region, advancing the decoding order of small regions in the same order as with the scan order, and advancing the decoding order of small region lines in an order different from the scan order; and a control unit which controls the decoding unit so as to decode in accordance with a state of a left small region situated at a left periphery of a small region to be processed, and a state of a lower small region situated at a lower periphery of the small region to be processed.

The decoding unit may, with image data of a large region situated odd-numbered from the top of the image as an object, advance the decoding order of small regions in the same order as with the scan order, and advance the decoding order of small region lines in an order different from the scan order.

The control unit may, with image data of a large region situated odd-numbered from the top of the image as an object, control the decoding unit so as to decode image data of a small region to be processed without referencing the state of a small region situated one below the small region to be processed, for a small region line situated at the bottommost position of a large region to be processed.

In the event that image data of a small region line situated at the bottommost position of a large region to be processed has been stored in a storage unit, the control unit may, with image data of a large region situated odd-numbered from the top of the image as an object, control the decoding unit so as to read out and decode the image data from the storage unit in the order of the decoding.

The decoding unit may, with encoded data of a large region situated even-numbered from the top of the image as an object, advance the decoding order of small regions in the same order as with the scan order for the small region lines, and advance the decoding order of the small region lines in the same order as with the scan order.

The control unit may, with encoded data of a large region situated even-numbered from the top of the image as an object, for a small region line situated at the topmost position of a large region to be processed, control the decoding unit so as to decode encoded data of a small region to be processed while referencing the state of a small region of the small region line situated at the bottommost position in a large region situated one above the large region.

In the event that image data of a small region line situated at the topmost position of a large region to be processed has been stored in a storage unit, the control unit may, with image data of a large region situated even-numbered from the top of the image as an object, control the decoding unit so as to read out and decode the image data from the storage unit in the order of the decoding.

The decoding unit may advance the decoding order of the small region lines in the opposite order from the scan order.

The scan order may be a raster scan order.

Also, another aspect of the present disclosure is an image processing method of an image processing device which decodes encoded data of image data which has been encoded, wherein a decoding unit, with a small region line in which are arrayed in the horizontal direction small regions obtained by dividing large regions arrayed in the vertical direction of an image to which the encoded data corresponds as an object, performs decoding of encoded data of the large region, advancing the decoding order of small regions in the same order as with the scan order, and advancing the decoding order of small region lines in an order different from the scan order; and a control unit controls the decoding unit so as to decode in accordance with a state of a left small region situated at a left periphery of a small region to be processed, and a state of a lower small region situated at a lower periphery of the small region to be processed.

With one aspect of the present disclosure, with a small region line in which are arrayed in the horizontal direction small regions obtained by dividing large regions arrayed in the vertical direction of an image as an object, encoding is performed of image data of the large region, advancing the encoding order of small regions in the same order as with the scan order, and advancing the encoding order of small region lines in an order different from the scan order, with an encoding unit being controlled so as to encode in accordance with a state of a left small region situated at a left periphery of a small region to be processed, and a state of a lower small region situated at a lower periphery of the small region to be processed.

With another aspect of the present disclosure, with a small region line in which are arrayed in the horizontal direction small regions obtained by dividing large regions arrayed in the vertical direction of an image to which the encoded data corresponds as an object, decoding is performed of encoded data of the large region, advancing the decoding order of small regions in the same order as with the scan order, and advancing the decoding order of small region lines in an order different from the scan order, with a decoding unit being controlled so as to decode in accordance with a state of a left small region situated at a left periphery of a small region to be processed, and a state of a lower small region situated at a lower periphery of the small region to be processed.

Advantageous Effects of Invention

According to the present disclosure, image data can be encoded. Particularly, deterioration in encoding efficiency due to high speed encoding of image encoding can be suppressed.

BRIEF DESCRIPTION OF DRAWINGS

FIG. 22 is a diagram describing an example of four-way division.

DESCRIPTION OF EMBODIMENTS

Hereinafter, embodiments of the present invention (hereinafter referred to as embodiments) will be described. Note that description will proceed in the following order.
1. First Embodiment (image encoding device)
2. Second Embodiment (image decoding device)
3. Third Embodiment (image encoding device/image decoding device)
4. Fourth Embodiment (personal computer)
5. Fifth Embodiment (television receiver)
6. Sixth Embodiment (cellular telephone)
7. Seventh Embodiment (hard disk recorder)
8. Eighth Embodiment (camera)

<1. First Embodiment>

[Image Encoding Device]

Figure 2:
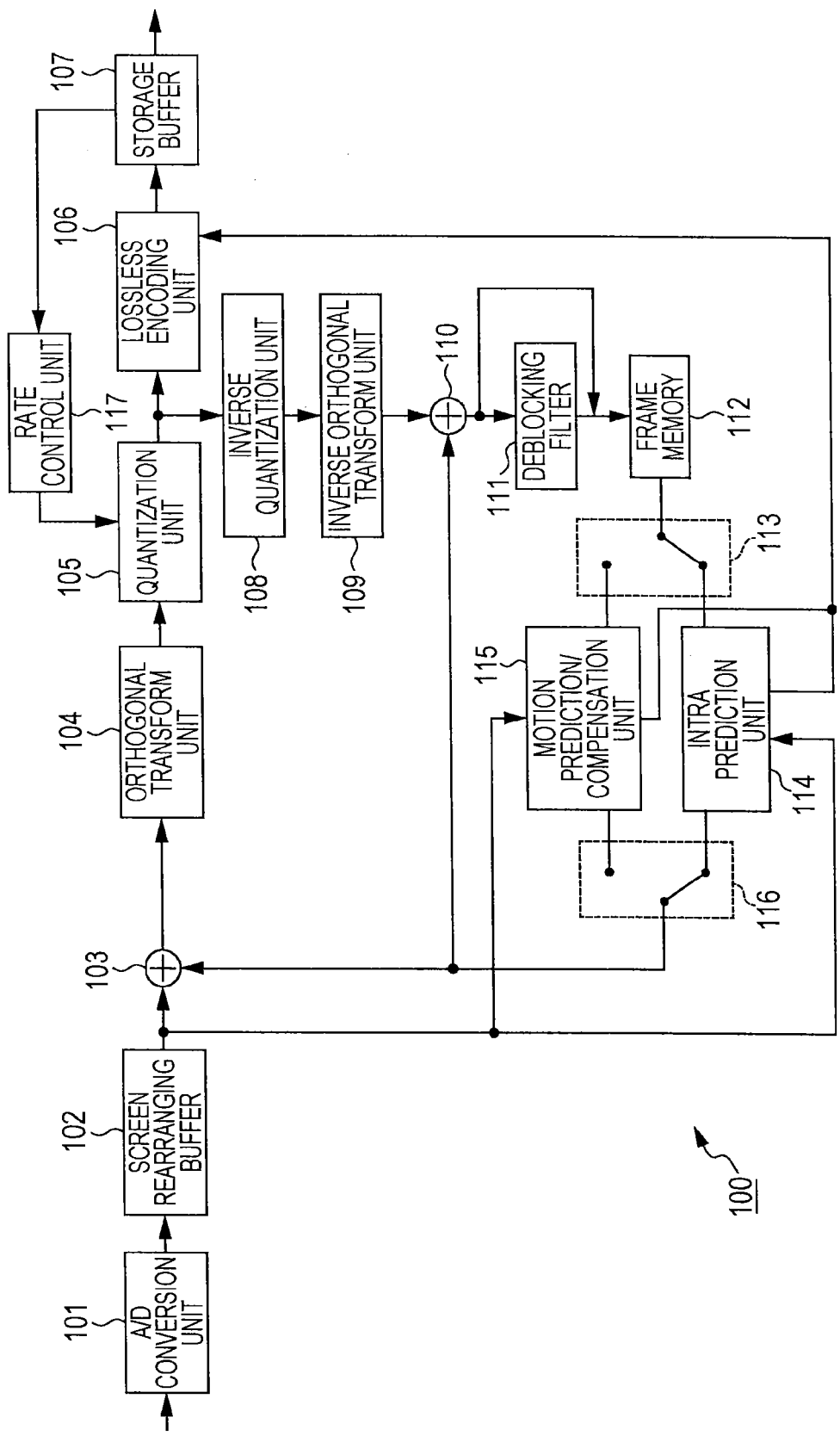
FIG. 2 is a block diagram illustrating a primary configuration example of an image encoding device.

FIG. 2 represents the configuration of an embodiment of an image encoding device serving as an image processing device.

An image encoding device 100 shown in FIG. 2 is an encoding device which subjects an image to compression encoding using, for example, the H.264 and MPEG (Moving Picture Experts Group) 4 Part 10 (AVC (Advanced Video Coding)) (hereafter, called H.264/AVC) format. Note however, that the image encoding device 100 performs CABAC with the multi slice format as a lossless encoding format.

With the example in FIG. 2, the image encoding device 100 has an A/D (Analog/Digital) conversion unit 101, a screen rearranging buffer 102, a computing unit 103, an orthogonal transform unit 104, a quantization unit 105, a lossless encoding unit 106, and a storage buffer 107. The image encoding device 100 also has an inverse quantization unit 108, an inverse orthogonal transform unit 109, and a computing unit 110. Further, the image encoding device 100 has a deblocking filter 111, and frame memory 112. Also, the image encoding device 100 has a selecting unit 113, an intra prediction unit 114, a motion prediction/compensation unit 115, and a selecting unit 116. Further, the image encoding device 100 has a rate control unit 117.

The A/D conversion unit 101 performs A/D conversion of input image data, and outputs to the screen rearranging buffer 102 and stores. The screen rearranging buffer 102 rearranges the images of frames in the stored order for display into the order of frames for encoding according to GOP (Group of Picture) structure. The screen rearranging buffer 102 supplies the images of which the frame order has been rearranged to the computing unit 103, intra prediction unit 114, and motion prediction/compensation unit 115.

The computing unit 103 subtracts, from the image read out from the screen rearranging buffer 102, the prediction image supplied from the selecting unit 116, and outputs difference information thereof to the orthogonal transform unit 104. For example, in the case of an image regarding which intra encoding has performed, the computing unit 103 adds the prediction image supplied from the intra prediction unit 114 to the image read out from the screen rearranging buffer 102. Also, for example, in the case of an image regarding which inter encoding has been performed, the computing unit 103 adds the prediction image supplied from the motion prediction/compensation unit 115 to the image read out from the screen rearranging buffer 102.

The orthogonal transform unit 104 subjects the difference information from the computing unit 103 to orthogonal transform, such as discrete cosine transform, Karhunen-Loéve transform, or the like, and supplies a transform coefficient thereof to the quantization unit 105. The quantization unit 105 quantizes the transform coefficient that the orthogonal transform unit 104 outputs. The quantization unit 105 supplies the quantized transform coefficient to the lossless encoding unit 106.

The lossless encoding unit 106 subjects the quantized transform coefficient to CABAC with the multi slice format. That is to say, the lossless encoding unit 106 divides a quantized transform coefficient image region into the two of upper and lower entropy slices (slice 1 and slice 2), and performs CABAC on each slice parallel with each other.

At this time, the lossless encoding device 106 performs CABAC as to the entropy slice at the upper side (slice 1) in the order heading from lower macroblocks toward upper macroblocks. Also, the lossless encoding device 106 performs CABAC as to the entropy slice at the lower side (slice 2) in the order heading from upper macroblocks toward lower macroblocks.

Thus, the lossless encoding unit 106 sequentially processes the macroblocks of the two upper and lower entropy slices in directions each going away from the boundary therebetween.

The lossless encoding unit 106 obtains information indicating intra prediction and so forth from the intra prediction unit 114, and obtains information indicating an inter prediction mode and so forth from the motion prediction/compensation unit 115. Note that the information indicating intra prediction will also be referred to as intra prediction mode information hereinafter. Also, the information indicating information mode indicating inter prediction will also be referred to as inter prediction mode information hereinafter.

The lossless encoding unit 106 encodes the quantized transform coefficient, and also takes filter coefficients, intra prediction mode information, inter prediction mode information, quantization parameters, and so forth, as part of header information in the encoded data (multiplexes). The lossless encoding unit 106 supplies the encoded data obtained by encoding to the storage buffer 107 for storage.

The storage buffer 107 temporarily holds the encoded data supplied from the lossless encoding unit 106, and at a predetermined timing outputs this to, for example, a recording device or transmission path or the like downstream not shown in the drawing, as an encoded image encoded by the H.264/AVC format.

Also, the quantized transform coefficient output from the quantization unit 105 is also supplied to the inverse quantization unit 108. The inverse quantization unit 108 performs inverse quantization of the quantized transform coefficient with a method corresponding to quantization at the quantization unit 105, and supplies the obtained transform coefficient to the inverse orthogonal transform unit 109.

The inverse orthogonal transform unit 109 performs inverse orthogonal transform of the supplied transform coefficients with a method corresponding to the orthogonal transform processing by the orthogonal transform unit 104. The output subjected to inverse orthogonal transform is supplied to the computing unit 110.

The computing unit 110 adds the inverse orthogonal transform result supplied from the inverse orthogonal transform unit 109, i.e., the restored difference information, to the prediction image supplied from the selecting unit 116, and obtains a locally decoded image (decoded image). In the event that the difference information corresponds to an image regarding which intra encoding is to be performed, for example, the computing unit 110 adds the prediction image supplied from the intra prediction unit 114 to that difference information. Also, in the event that the difference information corresponds to an image regarding which inter encoding is to be performed, for example, the computing unit 110 adds the prediction image supplied from the motion prediction/compensation unit 115 to that difference information.

The addition results thereof are supplied to the deblocking filter 111 or frame memory 112.

The deblocking filter 111 removes block noise from the decoded image by performing deblocking filter processing as appropriate, and also performs image quality improvement by performing loop filter processing as appropriate using a Wiener filter (Wiener Filter), for example. The deblocking filter 111 performs class classification of each of the pixels, and performs appropriate filter processing for each class. The deblocking filter 111 then supplies the filter processing results to the frame memory 112.

The frame memory 112 outputs the stored reference image to the intra prediction unit 114 or the motion prediction/compensation unit 115 via the selecting unit 113 at a predetermined timing.

For example, in the case of an image regarding which intra encoding is to be performed, for example, the frame memory 112 supplies the reference image to the intra prediction unit 114 via the selecting unit 113. Also, in the case of an image regarding which inter encoding is to be performed, for example, the frame memory 112 supplies the reference image to the motion prediction/compensation unit 115 via the selecting unit 113.

With the image encoding device 100, the I picture, B picture, and P picture from the screen rearranging buffer 102 are supplied to the intra prediction unit 114 as an image to be subjected to intra prediction (also referred to as intra processing), for example. Also, the B picture and P picture read out from the screen rearranging buffer 102 are supplied to the motion prediction/compensation unit 115 as an image to be subjected to inter prediction (also referred to as inter processing).

The selecting unit 113 supplies the reference image supplied from the frame memory 112 to the intra prediction unit 114 in the case of an image regarding which intra encoding is to be performed, and supplies to the motion prediction/compensation unit 115 in the case of an image regarding which inter encoding is to be performed.

The intra prediction unit 114 performs intra prediction to generate a prediction image using pixel values within the screen (intra screen prediction). The intra prediction unit 114 performs intra prediction by multiple modes (intra prediction modes). The intra prediction modes include a mode for generating a prediction image based on a reference image supplied from the frame memory 112 via the selecting unit 113.

The intra prediction unit 114 generates prediction images in all intra prediction modes, evaluates the prediction images, and selects an optimal mode. Upon selecting an optimal intra prediction mode, the intra prediction unit 114 supplies the prediction image generated in that optimal mode to the calculating unit 103 via the selecting unit 116. Also, as described above, the intra prediction unit 114 supplies information such as intra prediction mode information indicating the intra prediction mode employed, and so forth, to the lossless encoding unit 106 as appropriate.

With regard to the image to be subjected to inter encoding, the motion prediction/compensation unit 115 uses the input image supplied from the screen rearranging buffer 102 and decoded image serving as the reference frame supplied from the frame memory 112 via the selecting unit 113, and calculates a motion vector. The motion prediction/compensation unit 115 performs motion compensation processing according to the calculated motion vector, and generates a prediction image (inter prediction image information).

The motion prediction/compensation unit 115 performs inter prediction processing for all candidate inter prediction modes, and generates prediction images. The motion prediction/compensation unit 115 supplies the generated prediction image to the computing unit 103 via the selecting unit 116.

The motion prediction/compensation unit 115 supplies inter prediction mode information indicating the inter prediction mode that has been employed, and the motion vector information indicating the calculated motion vector, to the lossless encoding unit 106.

The selecting unit 116 supplies the output of the intra prediction unit 114 to the computing unit 103 in the case of an image for performing intra encoding, and supplies the output of the motion prediction/compensation unit 115 to the computing unit 103 in the case of an image for performing inter encoding.

The rate control unit 117 controls the rate of quantization operations of the quantization unit 105 based on the compressed image stored in the storage buffer 107, such that overflow or underflow does not occur.

[Configuration of Lossless Encoding Unit]

Figure 3:
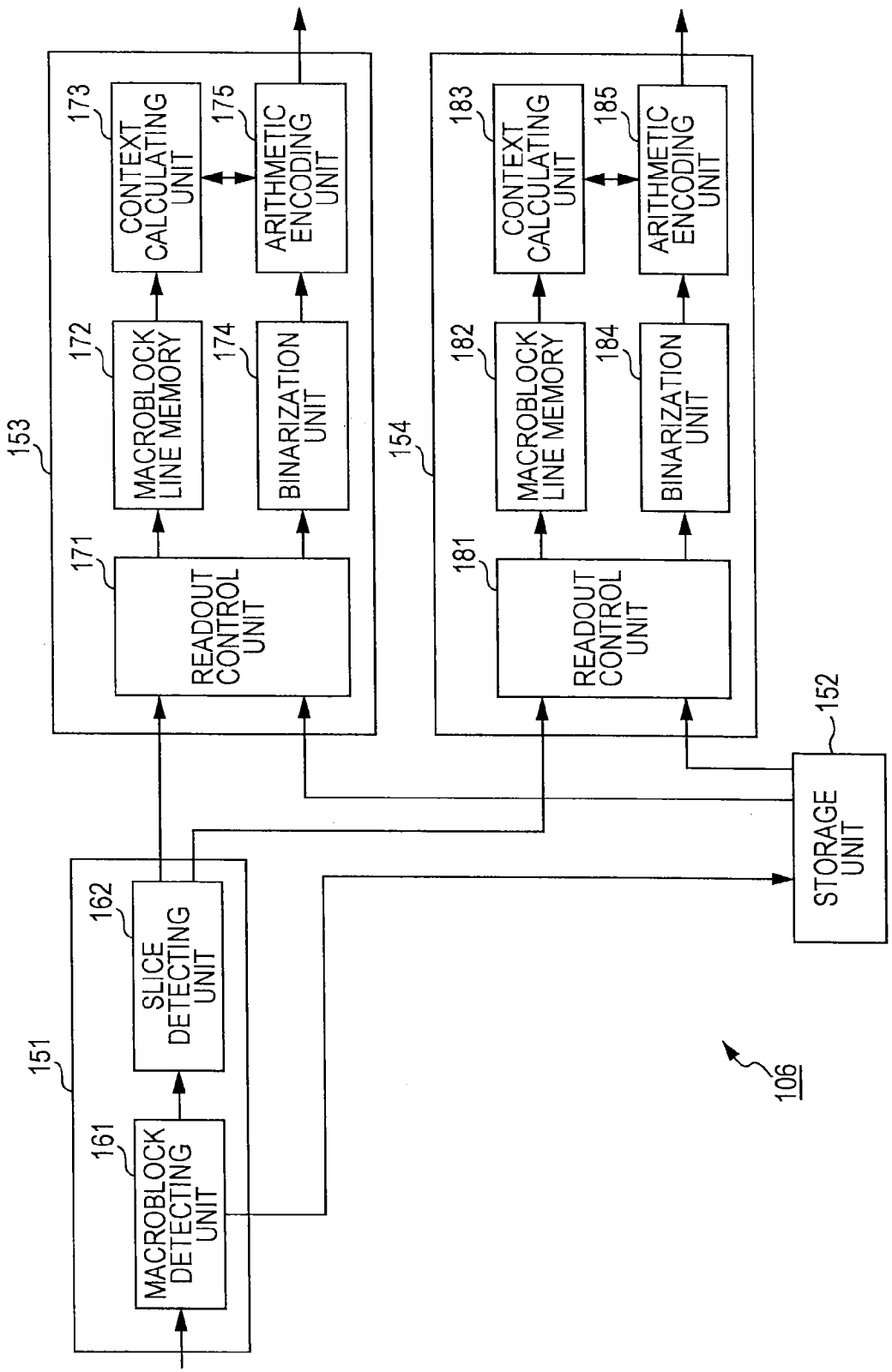
FIG. 3 is a block diagram illustrating a primary configuration example of a lossless encoding unit.

FIG. 3 is a block diagram illustrating a primary configuration example of the lossless encoding unit 106. As shown in FIG. 3, the lossless encoding unit 106 includes a control unit 151, a storage unit 152, a slice 1 processing unit 153, and a slice 2 processing unit 154.

The control unit 151 controls input/output of data of the storage unit 152. The control unit 151 has a macroblock detecting unit 161 and a slice detecting unit 162.

Coefficient data is supplied from the quantization unit 105 for each macroblock. For example, as indicated by the solid arrows in A in FIG. 1, coefficient data is supplied one macroblock at a time in the order heading from macroblocks at the left toward macroblocks at the right, in the horizontal direction array of the macroblocks (hereinafter referred to as macroblock line). Also, as indicated by the dotted arrows in A in FIG. 1, supply is performed with greater priority the higher in the image the macroblock line is.

That is to say, the coefficient data of one image (one picture or one field) is supplied from the macroblock at the upper left edge within the image, and the macroblock at the lower right edge is supplied last.

The macroblock detecting unit 161 detects each macroblock of coefficient data supplied from the quantization unit 105 in such an order, and stores the head address of each macroblock line in the storage unit 152 along with the coefficient data. Also, the macroblock detecting unit 161 notifies the slice detecting unit 162 of the head address of the macroblock line that has been detected.

The slice detecting unit 162 detects the boundary between entropy slices (the boundary between slice 1 and slice 2) from the head address of the macroblock line, and operates the slice 1 processing unit 153 and slice 2 processing unit 154 in accordance with these detection results.

Figure 1:
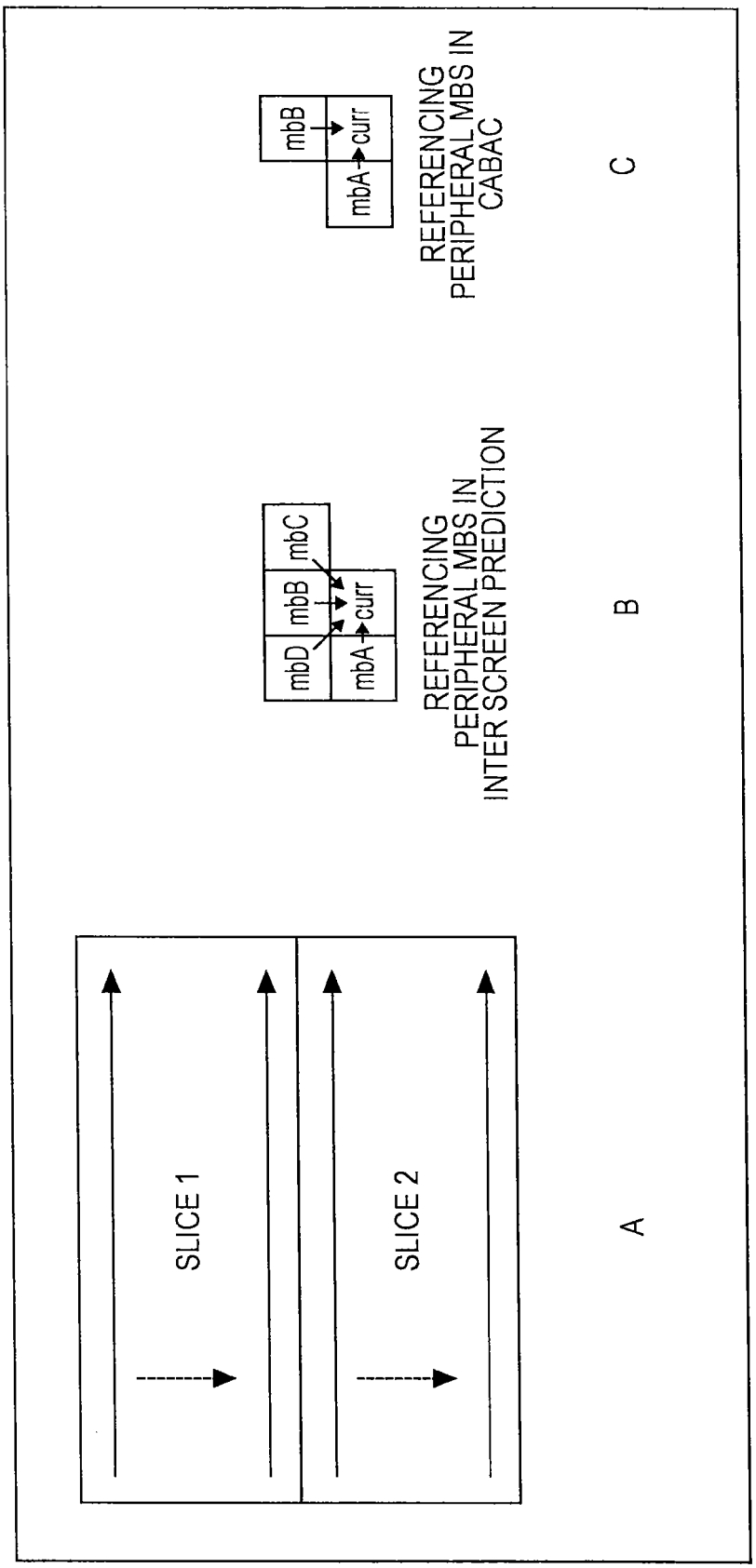
FIG. 1 is a diagram describing an example of conventional processing progression direction and reference direction.

For example, as shown in A in FIG. 1, in the event that an image (one picture or one field) is to be divided into two, slice 1 and slice 2, the slice detecting unit 162 detects from the head address of the macroblock line that the coefficient data of the upper half of the image has been stored in the storage unit 152, and detects the boundary of entropy slices.

Upon determining that the writing of the coefficient data of the bottommost macroblock line of slice 1 has started, the slice detecting unit 162 operates the slice 1 processing unit 153, and starts reading of the coefficient data of slice 1 from the storage unit 152.

Also, upon determining that the writing of the coefficient data one macroblock line below that has started, the slice detecting unit 162 operates the slice 2 processing unit 154 as well, and starts reading of the coefficient data of slice 2 from the storage unit 152 as well.

The storage unit 152 has a storage medium of an optional type, examples of which include semiconductor memory such as RAM (Random Access Memory), flash memory, a hard disk, and so forth, and stores information such as coefficient data and start address of macroblock lines and so forth. Basically, the arithmetic encoding processing (CABAC) which the slice 1 processing unit 153 and slice 2 processing unit 154 performs has a great load and processing time is long. Also, processing speed changes. Accordingly, by buffering the coefficient data supplied by the storage unit 152, occurrence of overflow and underflow can be suppressed.

The slice 1 processing unit 153 reads out the coefficient data of slice 1 from the storage unit 152, and performs CABAC. The slice 1 processing unit 153 has a readout control unit 171, macroblock line memory 172, a context calculating unit 173, a binarization unit 174, and an arithmetic encoding unit 175.

The readout control unit 171 references the head address of the macroblock line written to a different region from the region where the coefficient data is stored in the storage unit 152, and reads out the coefficient data of slice 1 from the storage unit 152 for each macroblock. The readout control unit 171 reads out with priority the coefficient data from the bottommost macroblock line of slice 1. The readout control unit 171 stores the coefficient data that has been read out in the macroblock line memory 172, and also supplies this to the binarization unit 174.

The macroblock line memory 172 has a recording medium of an optional type, examples of which include semiconductor memory such as RAM (Random Access Memory), flash memory, and so forth, a hard disk, or the like, and stores at least 1 macroblock line or more of coefficient data.

The context calculating unit 173 uses the coefficient data stored in the macroblock line memory 172 to obtain the state of peripheral macroblocks adjacent to a macroblock to be processed, calculates context (Context) indicating an occurrence probability table and symbols with a high probability of occurrence based on the peripheral state, and supplies these to the arithmetic encoding unit 175.

The binarization unit 174 binarizes the coefficient data (multi-value data) supplied from the readout control unit 171, and supplies this binarized data (binary data) to the arithmetic encoding unit 175.

The arithmetic encoding unit 175 performs binary arithmetic encoding of the binary data supplied from the binarization unit 174, following the context supplied from the context calculating unit 173. The arithmetic encoding unit 175 supplies the obtained encoded data to the storage buffer 107 so as to be stored.

The slice 2 processing unit 154 primarily reads out the coefficient data of slice 2 from the storage unit 152, and performs CABAC. The slice 2 processing unit 154 basically has the same configuration as the slice 1 processing unit 153. That is to say, the slice 2 processing unit 154 has a readout control unit 181, macroblock line memory 182, a context calculating unit 183, a binarization unit 184, and an arithmetic encoding unit 185.

The readout control unit 181 has the same configuration as that of the readout control unit 171, and performs the same processing. The macroblock line memory 182 has the same configuration as the macroblock line memory 172, and performs the same processing. The context calculating unit 183 has the same configuration as that of the context calculating unit 173, and performs the same processing. The binarization unit 184 has the same configuration as that of the binarization unit 174, and performs the same processing. The arithmetic encoding unit 185 has the same configuration as that of the arithmetic encoding unit 175, and performs the same processing.

Note however, with the case of slice 2, the processing order and reference direction of the macroblocks differs from the case of slice 1.

[Encoding Procedures]

Figure 4:
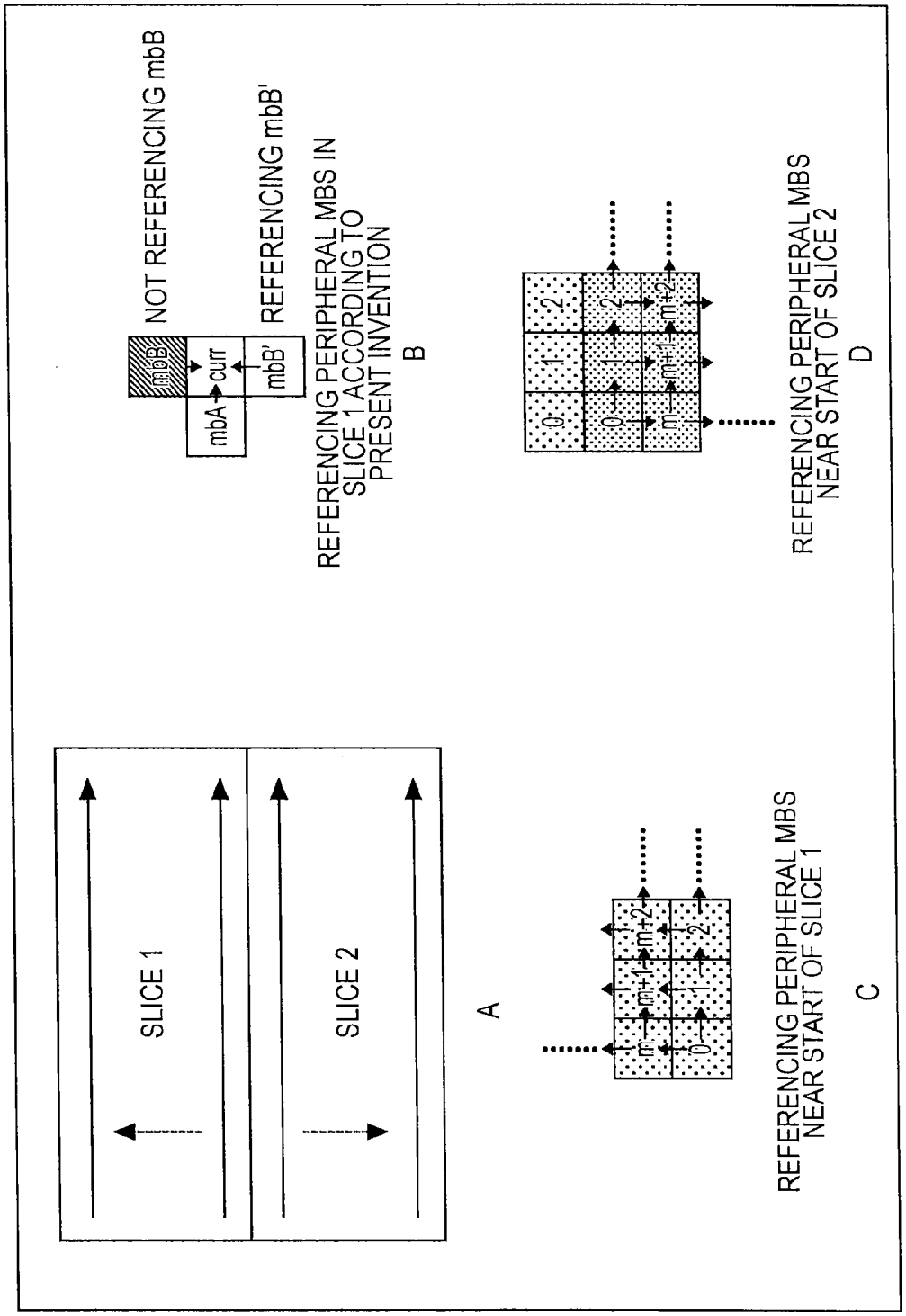
FIG. 4 is a diagram describing an example of processing progression direction and reference direction.

FIG. 4 is a diagram describing an example of processing progression direction and reference direction.

CABAC of one image (one picture or one field) worth is performed in an order indicated by arrows shown in A in FIG. 4. That is to say, the image is divided into multiple entropy slices (large regions) arrayed in the vertical direction, and CABAC (encoding) is performed for each of macroblocks (small regions) into which each entropy slice is divided in the row/column directions.

At slice 1, the coefficient data is first encoded for the bottommost macroblock line (small region row), and next the macroblock line one above is encoded, as indicated by the dotted arrows in A in FIG. 4. Thus, the object of processing is moved to the macroblock line above one row at a time, and finally, the topmost macroblock line is encoded.

Within each macroblock line, the leftmost macroblock is first encoded, and next the macroblock one to the right is encoded, in the same way as with a conventional arrangement, as indicated by the solid arrows in A in FIG. 4. Thus, the processing object moves to the macroblock to the right, one at a time, and finally, the macroblock at the right edge is encoded.

As indicated by the arrows in A in FIG. 1, the coefficient data is stored by macroblocks in the storage unit 152 in the order from the top macroblock line of the image toward the bottom macroblock line. That is to say, upon coefficient data of the leftmost macroblock of the bottommost macroblock line of slice 1 being written to the storage unit 152, CABAC of slice 1 is started.

In the case of conventional CABAC, a macroblock (mbA) one to the left of the macroblock (curr) to be processed, and a macroblock (mbB) one thereabove are referenced as peripheral macroblocks, as illustrated in C in FIG. 1. However, in the case of this slice 1, a macroblock (mbA) one to the left of the macroblock (curr) to be processed, and a macroblock (mbB') one below are referenced as peripheral macroblocks, as illustrated in B in FIG. 4.

Note however, that the macroblock line one below the bottommost macroblock line to be encoded first is a macroblock line of slice 2, and accordingly cannot be referenced, as shown in C in FIG. 4. In this case, processing is performed in the same way as the case of the topmost macroblock line in conventional CABAC, albeit in a different reference direction.

Also, as shown in C in FIG. 4, in the event that the object of processing is a macroblock at the left edge of the screen, a macroblock (mbA) one to the left thereof cannot be referenced. In this case, processing is performed in the same way as the case of conventional CABAC.

Conversely, with slice 2, encoding is advanced in the same way as with the conventional case, as indicated by the arrows in A in FIG. 4. That is to say, as indicated by the dotted arrows in A in FIG. 4, for the coefficient data, the topmost macroblock line is first encoded, and next the macroblock line one below is encoded. Thus, the object of processing is moved down one macroblock line at a time, and finally, the bottommost macroblock line is encoded.

Within each macroblock line, as indicated by the solid arrows in A in FIG. 4, the macroblock at the left edge is first encoded, and next the macroblock one to the right is encoded. Thus, the object of processing is moved to the right one macroblock at a time, and finally, the macroblock at the right edge is encoded.

In the case of this slice 2, the reference direction of the peripheral macroblocks is the same as with the conventional case, as shown in D in FIG. 4, with the macroblock (mbA) one to the left of the macroblock (curr) to be processed and the macroblock (mbB) one thereabove are referenced as peripheral macroblocks.

Accordingly, the CABAC of slice 2 can be started at the point that the coefficient data of the macroblock at the far left of the topmost macroblock line of slice 2 has been written to the storage unit 152. That is to say, the CABAC of slice 2 can be started without waiting for the CABAC of slice 1 to end. For example, the CABAC of slice 2 can be executed in parallel with the CABAC of slice 1.

The CABAC of slice 1 does not reference the coefficient data of slice 2. Also, as described later, while the bottommost macroblock line of slice 1 is referenced with regard to the topmost macroblock line of slice 2, this coefficient data of slice 1 exists in the storage unit 152 at the point that the CABAC of slice 2 is started. Accordingly, processing of the CABAC of slice 1 and the CABAC of slice 2 can advance independent of each other, without waiting up or the like for the processing of each other.

Accordingly, the lossless encoding unit 106 can improve the throughput of the encoding processing. In other words, the lossless encoding unit 106 can perform encoding at higher speeds.

Also, as described above, the macroblock line one above that is referenced at the time of CABAC of the topmost macroblock line of slice 2 is the bottommost macroblock line of slice 1, and is already stored in the storage unit 152. Accordingly, as shown in D in FIG. 4, in the case of CABAC of slice 2, the macroblock (mbB) one above can be referenced for the first macroblock line, i.e., for encoding to the topmost macroblock line.

More specifically, the readout control unit 181 of the slice 2 processing unit 154 reads out the bottommost macroblock line of slice 1 and holds this in the macroblock line memory 182, before reading out the coefficient data of the topmost macroblock line of slice 2 as the object of processing.

The context calculating unit 183 calculates the context of the peripheral macroblocks using coefficient data and the like of the bottommost macroblock line of slice 1 stored in the macroblock line memory 182, and provides this as to the arithmetic encoding processing of the coefficient data of the topmost macroblock line which is performed by the arithmetic encoding unit 185.

The arithmetic encoding unit 185 uses the context thereof to perform arithmetic encoding processing as to the coefficient data of the topmost macroblock line of slice 2.

In this way, the peripheral macroblocks can be referenced at the entropy slice boundary as well, so the lossless encoding unit 106 can suppress deterioration in encoding efficiency due to image division (multi slicing).

[Encoding Processing]

The flow of processing executed by the above image encoding device 100 will be described next. First, an example of the flow of encoding processing will be described with reference to the flowchart in FIG. 5.

In step S101, the A/D conversion unit 101 performs A/D conversion of an input image. In step S102, the screen rearranging buffer 102 stores the image supplied from the A/D conversion unit 101, and performs rearranging from the sequence for displaying the pictures to the sequence for encoding.

In step S103, the intra prediction unit 114 and motion prediction/compensation unit 115 each perform prediction processing for the image. That is to say, in step S103, the intra prediction unit 114 performs intra prediction mode intra prediction processing. The motion prediction/compensation unit 115 performs inter prediction mode motion prediction/compensation processing.

In step S104, the selecting unit 116 decides the optimal prediction mode based on the cost function values output from the intra prediction unit 114 and motion prediction/compensation unit 115. That is to say, the selecting unit 116 selects one or the other of the prediction image generated by the intra prediction unit 114 and the prediction image generated by the motion prediction/compensation unit 115.

Also, the selection information of the prediction image is supplied to the intra prediction unit 114 or motion prediction/compensation unit 115. In the event that the prediction image of the optimal intra prediction mode has been selected, the intra prediction unit 114 supplies information indicating the optimal intra prediction mode (i.e., intra prediction mode information) to the lossless encoding unit 106.

In the event that the prediction image of the optimal inter prediction mode has been selected, the motion prediction/compensation unit 115 outputs information indicating the optimal inter prediction mode, and information according to the optimal inter prediction mode as necessary, to the lossless encoding unit 106. Examples of information according to the optimal inter prediction mode include motion vector information, flag information, reference frame information, and so forth.

In step S105, the computing unit 103 computes difference between an image rearranged in step S102 and the prediction image obtained by the prediction processing in step S103. The prediction image is supplied to the computing unit 103 from the motion prediction/compensation unit 115 in the event of performing inter prediction, and from the intra prediction unit 114 in the event of performing intra prediction, via the selecting unit 116 in either case.

The difference data is reduced in data amount as compared to the original image data. Accordingly, the data amount can be compressed as compared to the case of encoding the original image without change.

In step S106, the orthogonal transform unit 104 subjects the difference information supplied from the computing unit 103 to orthogonal transform. Specifically, orthogonal transform, such as discrete cosine transform, Karhunen-Loéve transform, or the like, is performed, and a transform coefficient is output. In step S107, the quantization unit 105 quantizes the transform coefficient.

In step S108, the lossless encoding unit 106 encodes the quantized transform coefficient output from the quantization unit 105. That is to say, the difference image (secondary difference image in the case of inter) is subjected to lossless encoding such as arithmetic encoding or the like. Details of encoding processing will be described later.

Note that the lossless encoding unit 106 encodes information relating to the prediction mode of the prediction image selected by the processing in step S104, and adds to the header information of encoded data obtained by encoding the difference image.

That is to say, the lossless encoding unit 106 also encodes intra prediction mode information supplied from the intra prediction unit 114 or information according to the optimal inter prediction mode supplied from the motion prediction/compensation unit 115 and so forth, and adds this to the header information.

In step S109, the storage buffer 107 stores encoded data output from the lossless encoding unit 106. The encoded data stored in the storage buffer 107 is read out as suitable, and transmitted to the decoding side via the transmission path.

In step S110, the rate control unit 117 controls the rate of the quantization operation of the quantization unit 105, based on the compressed image stored in the storage buffer 107, so as not to cause overflow or underflow.

Also, the difference information quantized by the processing in step S107 is locally decoded as follows. That is to say, in step S111, the inverse quantization unit 108 subjects the transform coefficient quantized by the quantization unit 105 to inverse quantization using a property corresponding to the property of the quantization unit 105. In step S112, the inverse orthogonal transform unit 109 subjects the transform coefficient subjected to inverse quantization by the inverse quantization unit 108 to inverse orthogonal transform using a property corresponding to the property of the orthogonal transform unit 104.

In step S113, the computing unit 110 adds the prediction image input via the selecting unit 116 to the locally decoded difference information, and generates a locally decoded image (the image corresponding to the input to the computing unit 103). In step S114, the deblocking filter 111 subjects the image output from the computing unit 110 to filtering. Thus, block distortion is removed. In step S115, the frame memory 112 stores the image subjected to filtering. Note that an image not subjected to filtering processing by the deblocking filter 111 is also supplied from the computing unit 110 to the frame memory 112 for storing.

[Lossless Encoding Processing]

Next, an example of the flow of lossless encoding processing executed in step S108 in FIG. 5 will be described with reference to the flowchart in FIG. 6.

Upon the lossless encoding processing being started, in step S131, the storage unit 152 stores the coefficient data of each macroblock supplied via the macroblock detecting unit 161. In step S132, the storage unit 152 stores the head address of the macroblock line detected by the macroblock detecting unit 161 in a region different from the coefficient data.

In step S133, the slice detecting unit 162 determines whether or not the macroblock stored in the storage unit 152 is a macroblock at an entropy slice boundary, and in the event that determination is made that this is an entropy slice boundary, the processing advances to step S134.

In step S134, at the point that the macroblock at the far left of the bottommost macroblock line of slice 1 has been written to the storage unit 152, the slice detecting unit 162 controls the slice 1 processing unit 153 so as to start encoding from the bottom of slice 1 toward the top (latter-described slice 1 encoding processing). That is to say, the slice detecting unit 162 causes the slice 1 processing unit 153 to perform CABAC heading from the bottom to the top in slice 1 as described with reference to FIG. 4, as a separate task.

In step S135, at the point that the macroblock at the far left of the topmost macroblock line of slice 2 has been written to the storage unit 152, the slice detecting unit 162 controls the slice 2 processing unit 154 so as to start encoding from the top of slice 2 toward the bottom (latter-described slice 2 encoding processing). That is to say, the slice detecting unit 162 causes the slice 2 processing unit 154 to perform CABAC heading from the top to the bottom in slice 2 as described with reference to FIG. 4, as a separate task.

Upon starting the CABAC on slice 1 and the CABAC on slice 2, the slice detecting unit 162 advances the processing to step S136. Also, in the event that determination is made in step S133 that this is not a slice boundary, the slice detecting unit 162 advances the processing to step S136.

In step S136, the macroblock detecting unit 161 determines whether or not all macroblocks within the image (picture or field) have been processed, and in the event that determination is made that an unprocessed macroblock exists the processing is returned to step S131, and the subsequent processing is repeated on the macroblock supplied next.

Figure 5:
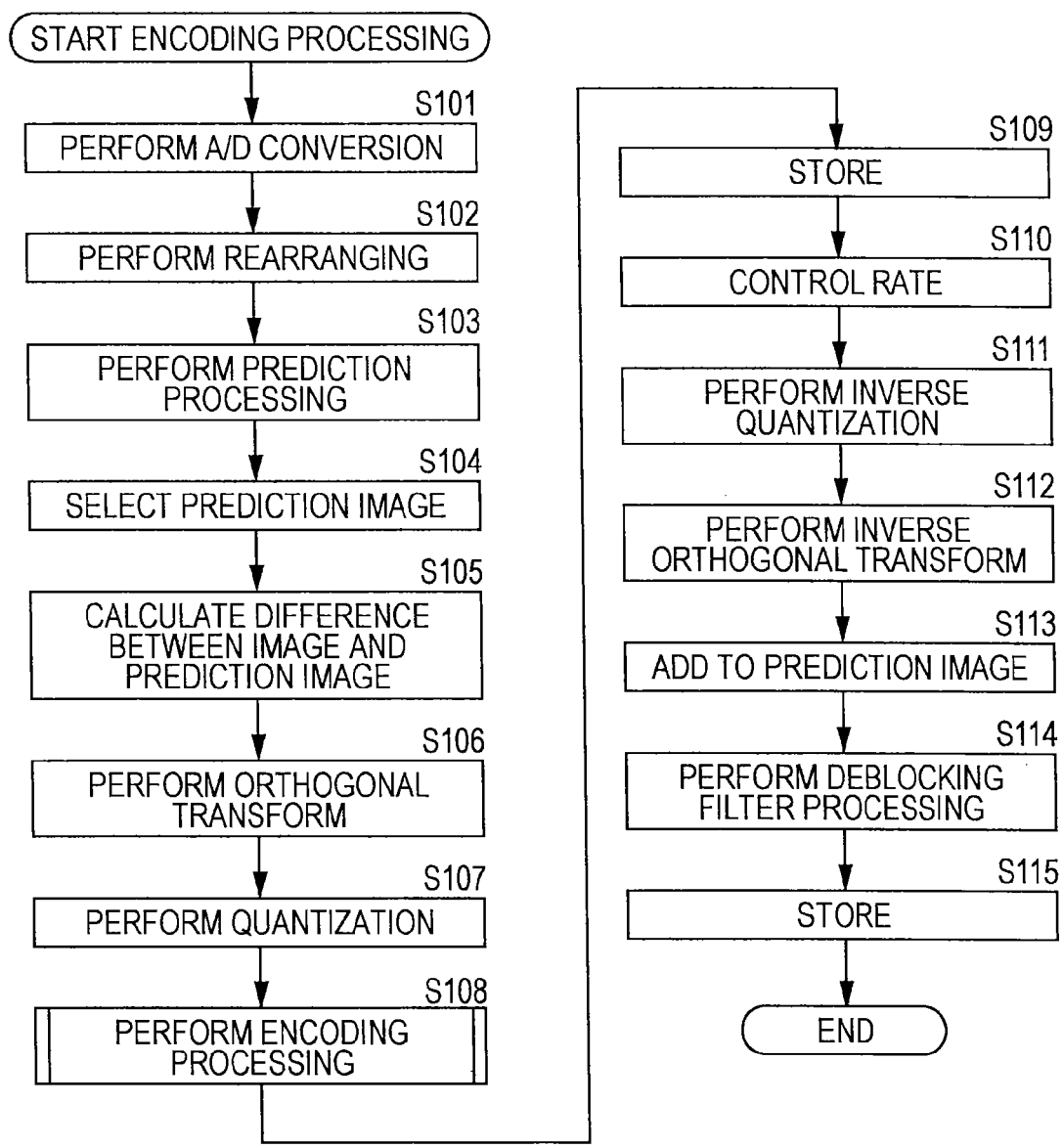
FIG. 5 is a flowchart describing an example of the flow of encoding processing.

Also, in the event that determination is made in step S136 that all macroblocks have been processed, the macroblock detecting unit 161 ends the lossless encoding processing, returns the processing to step S108 in FIG. 5, and advances the processing to step S109.

[Slice 1 Encoding Processing]

Next, and example of the flow of the slice 1 encoding processing executed by the slice 1 processing unit 153 will be described with reference to the flowchart in FIG. 7.

Figure 6:
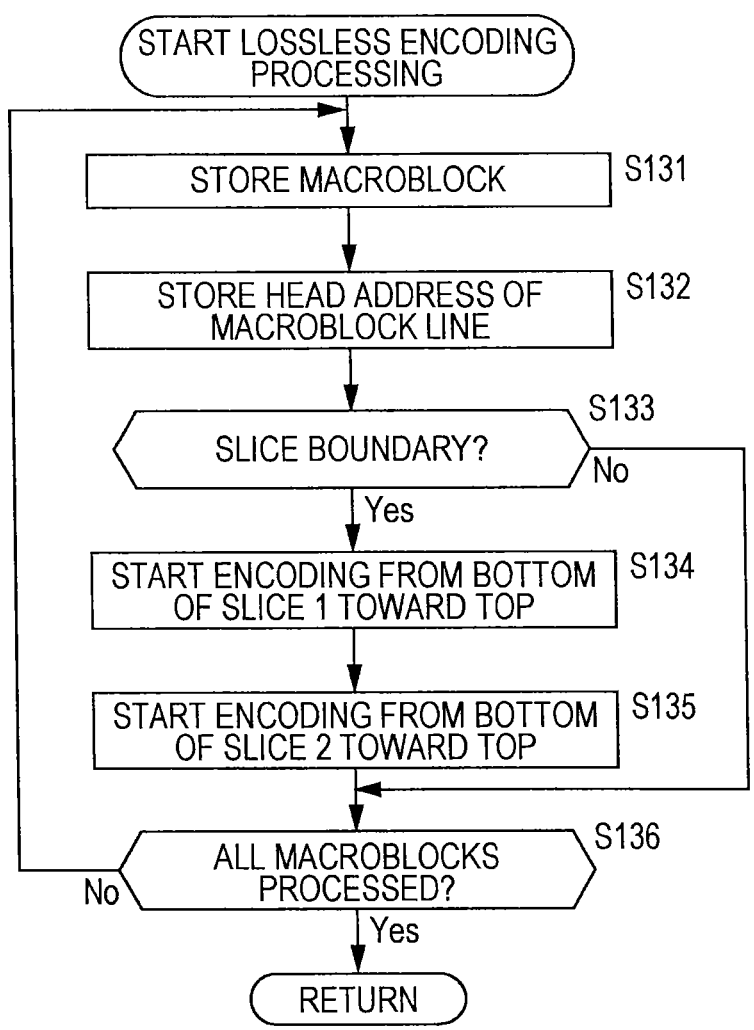
FIG. 6 is a flowchart describing an example of the flow of lossless encoding processing.

Upon the processing of step S134 in FIG. 6 being executed and the slice 1 encoding processing being started, in step S151 the readout control unit 171 of the slice 1 processing unit 153 reads out the coefficient data of the last macroblock line in slice 1. In step S152, the macroblock line memory 172 stores the coefficient data of the macroblock line read out in step S151.

In step S153, the binarization unit 174 binarizes the coefficient data of the macroblock line read out in step S151. In step S154, the arithmetic encoding unit 175 performs arithmetic encoding without reference the macroblock line below.

Thus, upon encoding all coefficient data of the bottommost macroblock line of slice 1, the slice 1 processing unit 153 advances the processing to step S155. In step S155, the readout control unit 171 of the slice 1 processing unit 153 reads out the coefficient data of the macroblock line one above the macroblock line read out last time. In step S156, the macroblock line memory 172 stores the coefficient data of the macroblock line read out in step S155.

In step S157, the binarization unit 174 binarizes the coefficient data of the macroblock line read out in step S155. In step S158, the context calculating unit 173 calculates the context of the macroblock to be processed, referencing the macroblock line one below. In step S159, the arithmetic encoding unit 175 performs arithmetic encoding using the context calculated in step S158.

In step S160, the readout control unit 171 determines whether or not all macroblock lines within the image (picture or field) have been processed, and in the event that an unprocessed macroblock line exists, returns the processing to step S155, and repeats the subsequent processing.

In the event that the processing of step S155 through step S160 is repeatedly executed, and determination is made in step S160 that all macroblock lines in the image have been processed, the readout control unit 171 ends the slice 1 encoding processing.

[Slice 2 Encoding Processing]

Next, an example of the flow of slice 2 encoding processing executed by the slice 2 processing unit 154 will be described with reference to the flowchart in FIG. 8.

Upon the processing of step S135 in FIG. 6 being executed and the slice 2 encoding processing starting, in step S181 the readout control unit 181 of the slice 2 processing unit 154 reads out the coefficient data of the last macroblock line in slice 1 the coefficient data of the first macroblock line in slice 2. In step S182, the macroblock line memory 182 stores the coefficient data of the macroblock lines read out in step S181.

In step S183, the binarization unit 184 binarizes the coefficient data of the first macroblock line of slice 2 read out in step S181. In step S184, the context calculating unit 183 calculates the context of the macroblock to be processed by referencing the last macroblock line of slice 1, that was stored in step S182. In step S185, the arithmetic encoding unit 185 performs arithmetic encoding using the context calculated in step S184.

Thus, upon encoding all coefficient data of the topmost macroblock line of slice 2, the slice 2 processing unit 154 advances the processing to step S186. In step S186, the readout control unit 181 of the slice 2 processing unit 154 reads out the coefficient data of the macroblock line one below the macroblock line read out last time. In step S187, the macroblock line memory 182 stores the coefficient data of the macroblock line read out in step S186.

In step S188, the binarization unit 184 binarizes the coefficient data of the macroblock line read out in step S186. In step S189, the context calculating unit 183 calculates the context of the macroblock to be processed, referencing the macroblock line one above. In step S190, the arithmetic encoding unit 185 performs arithmetic encoding using the context calculated in step S189.

In step S191, the readout control unit 181 determines whether or not all macroblock lines within the image (picture or field) have been processed, and in the event that an unprocessed macroblock line exists, returns the processing to step S186, and repeats the subsequent processing.

In the event that the processing of step S186 through step S191 is repeatedly executed, and determination is made in step S191 that all macroblock lines in the image have been processed, the readout control unit 181 ends the slice 2 encoding processing.

Thus, the lossless encoding unit 106 can realize high-speed image encoding while suppressing deterioration in encoding efficiency.

<2. Second Embodiment>
[Image Decoding Device]

The encoded data encoded by the image encoding device 100 described in the first embodiment is transmitted to an image decoding device corresponding to the image encoding device 100 via a predetermined transmission path, and is decoded.

Figure 9:
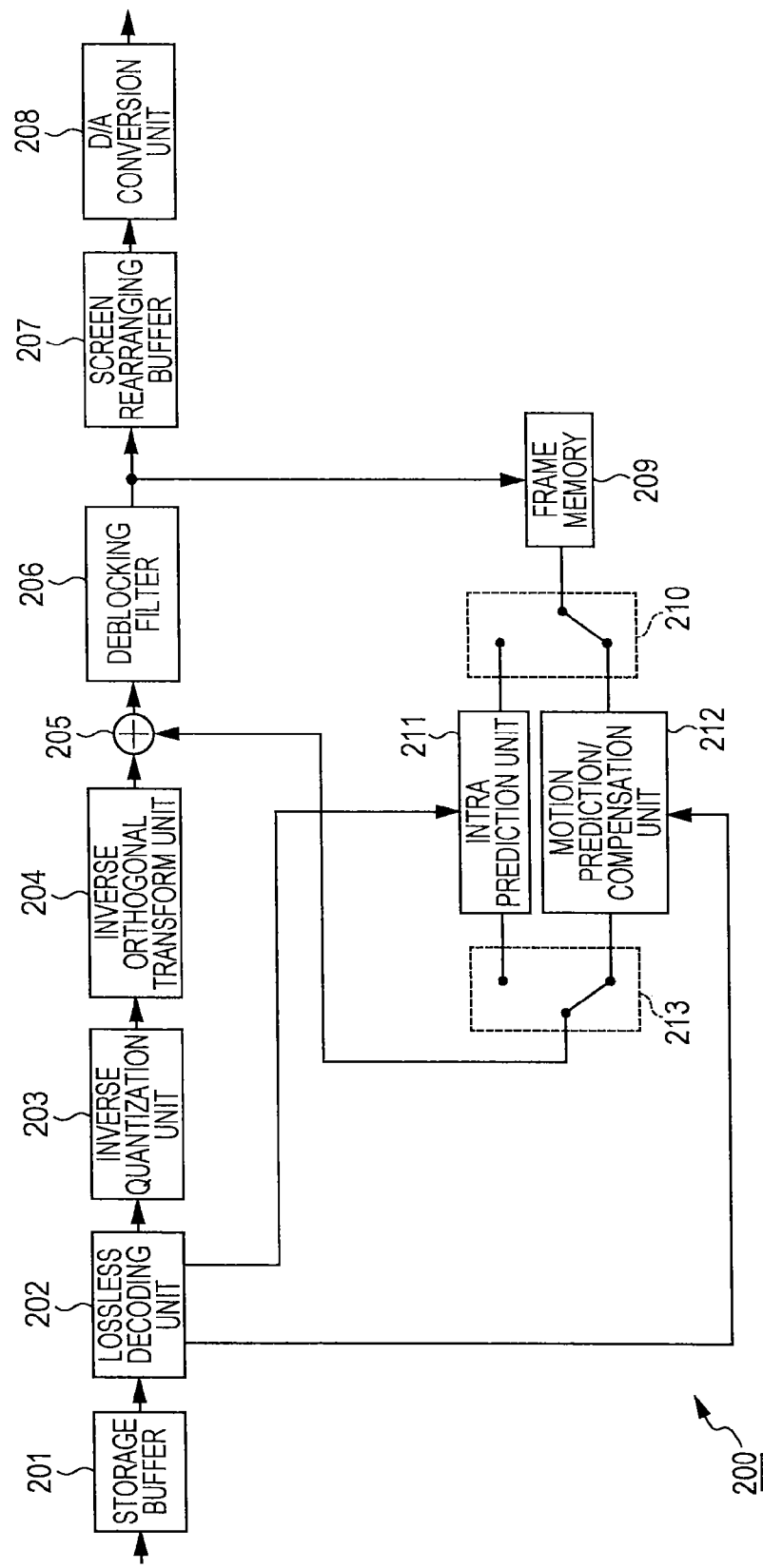
FIG. 9 is a block diagram illustrating a primary configuration example of an image decoding device.

The image decoding device will be described below. FIG. 9 is a block diagram illustrating a primary configuration example of the image decoding device.

As shown in FIG. 9, an image decoding device 200 is configured of a storing buffer 201, a lossless decoding unit 202, an inverse quantization unit 203, an inverse orthogonal transform unit 204, a computing unit 205, a deblocking filter 206, a screen rearranging buffer 207 and a D/A conversion unit 208. The image decoding device 200 also has frame memory 209, a selecting unit 210, an intra prediction unit 211, a motion prediction/compensation unit 212, and a selecting unit 213.

The storing buffer 201 stores encoded data transmitted thereto. This encoded data has been encoded by the image encoding device 100. The lossless decoding unit 202 decodes encoded data read out from the storing buffer 201 at a predetermined timing using a format corresponding to the encoding format of the lossless encoding unit 106 in FIG. 2.

The inverse quantization unit 203 subjects the obtained coefficient data decoded by the lossless decoding unit 202 to inverse quantization using a format corresponding to the quantization format of the quantization unit 105 in FIG. 2. The inverse quantization unit 203 supplies the coefficient data subjected to inverse quantization to the inverse orthogonal transform unit 204. The inverse orthogonal transform unit 204 subjects the coefficient data to inverse orthogonal transform using a format corresponding to the orthogonal transform format of the orthogonal transform unit 104 in FIG. 2, and obtains decoded residual data corresponding to the residual data before orthogonal transform at the image encoding device 100.

The decoded residual data obtained by being subjected to inverse orthogonal transform is supplied to the computing unit 205. Also, the computing unit 205 is supplied with a prediction image from the intra prediction unit 211 or motion prediction/compensation unit 212, via the selecting unit 213.

The computing unit 205 adds the decoded residual data and the prediction image, and obtains decoded image data corresponding to the image data before subtraction of the prediction image by the computing unit 103 of the image encoding device 100. The computing unit 205 supplies the decoded image data to the deblocking filter 206.

The deblocking filter 206 removes the block noise of the decoded image, and subsequently supplies this to the frame memory 209 is as to be stored and also supplies this to the screen rearranging buffer 207.

The screen rearranging buffer 207 performs rearranging of images. That is to say, the order of frames rearranged for encoding by the screen rearranging buffer 102 in FIG. 2 is rearranged to the original display order. The D/A conversion unit 208 performs D/A conversion of the image supplied from the screen rearranging buffer 207, outputs to an unshown display, and displays.

The selecting unit 210 reads out the image for inter processing and the image to be referenced from the frame memory, and supplies to the motion prediction/compensation unit 212. Also, the selecting unit 210 read out the image to be used for intra prediction from the frame memory 209, and supplies this to the intra prediction unit 211.

The intra prediction unit 211 is supplied with information indicating intra prediction mode obtained by decoding the header information and so forth, from the lossless decoding unit 202, as appropriate. The intra prediction unit 211 generates a prediction image based on this information, and supplies the generated prediction image to the selecting unit 213.

The motion prediction/compensation unit 212 obtains information obtained by decoding the header information (prediction mode information, motion vector information, reference frame information) from the lossless decoding unit 202. In the event that information indicating inter prediction mode has been supplied, based on the inter motion vector information from the lossless decoding unit 202, the motion prediction/compensation unit 212 generates a prediction image, and supplies the generated prediction image to the selecting unit 213.

The selecting unit 213 selects a prediction image generated by the motion prediction/compensation unit 212 or the intra prediction unit 211, and supplies this to the computing unit 205.

[Lossless Decoding Unit]

Figure 10:
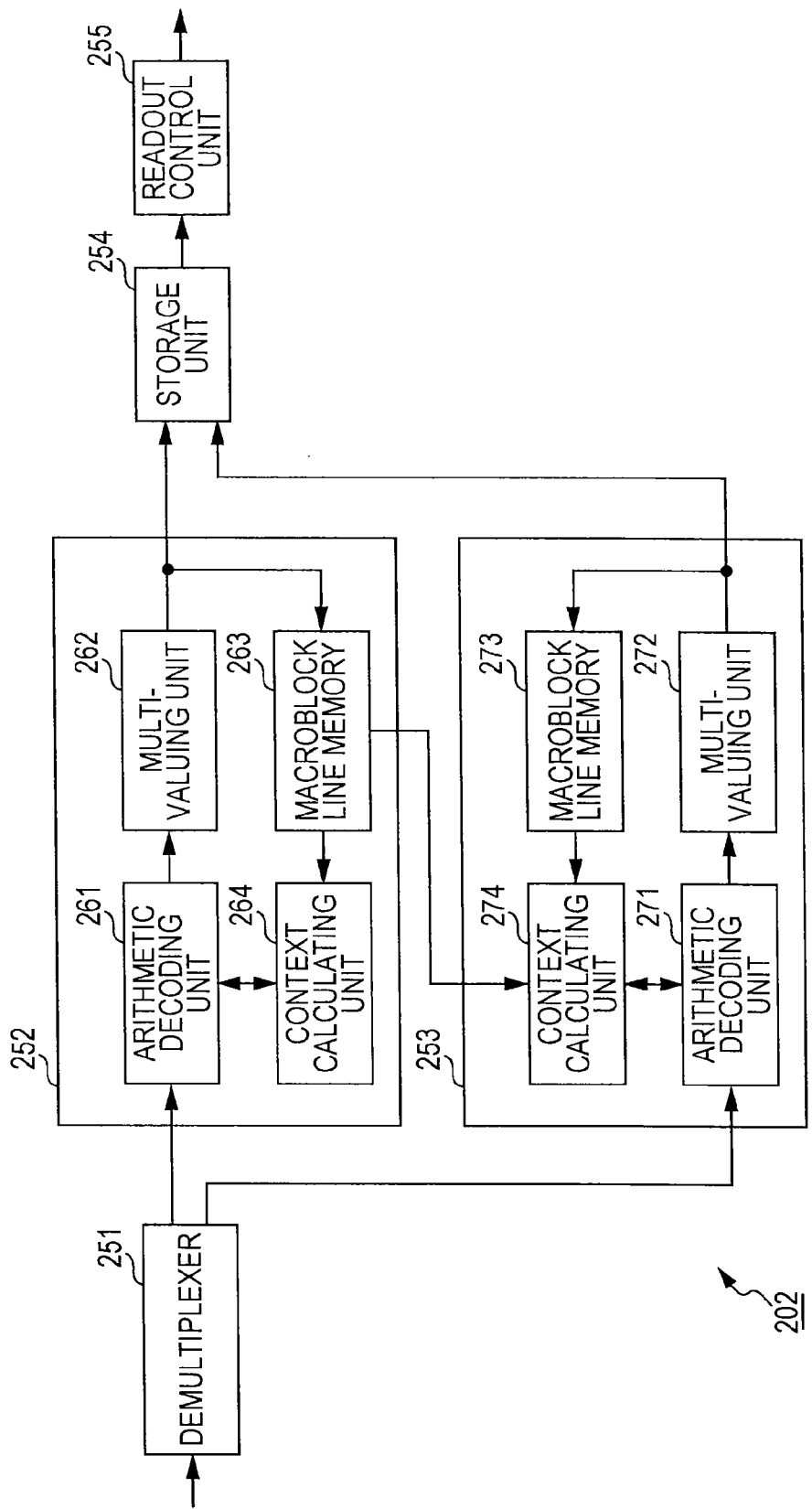
FIG. 10 is a block diagram illustrating a primary configuration example of a lossless decoding unit.

FIG. 10 is a block diagram illustrating a primary configuration example of the lossless decoding unit 202 shown in FIG. 9.

As shown in FIG. 10, the lossless decoding unit 202 has a demultiplexer 251, a slice 1 processing unit 252, a slice 2 storage unit 253, a storage unit 254, and a readout control unit 255.

The demultiplexer 251 identifies the entropy slice to which the encoded data supplied from the storage buffer 201 belongs (whether slice 1 or slice 2), and controls the supply destination of the encoded data depending on the entropy slice.

The bit stream generated by the image encoding device 100 shown in FIG. 2 is multiplexed with each entropy slice as en independent stream. The multiplexed streams are supplied from the storage buffer 201.

For example, in the event of encoded data belonging to slice 1, the demultiplexer 251 supplies to the slice 1 processing unit 252. Also, for example, in the event of encoded data belonging to slice 2, the demultiplexer 251 supplies to the slice 2 processing unit 253.

The slice 1 processing unit 252 performs arithmetic decoding of the encoded data belonging to slice 1. With the image encoding device 100, each macroblock belonging to slice 1 has been encoded from left to right and bottom to top of the image. Also, the peripheral blocks to be referenced are a macroblock one to the left and a macroblock one below in the macroblock to be processed. Decoding processing is also performed in the same processing order and reference direction as this.

The slice 2 processing unit 253 performs arithmetic decoding of the encoded data belonging to slice 2. With the image encoding device 100, each macroblock belonging to slice 2 has been encoded from left to right and top to bottom of the image. Also, the peripheral blocks to be referenced are a macroblock one to the left and a macroblock one above in the macroblock to be processed. Decoding processing is also performed in the same processing order and reference direction as this.

The storage unit 254 obtains the decoded coefficient data generated at the slice 1 processing unit 252 (multi-value data) and the decoded coefficient data generated at the slice 2 processing unit 253 (multi-value data), and stores these. The readout control unit 255 reads out the decoded coefficient data stored in the storage unit 254 at a predetermined timing and in a predetermined order, and supplies these to the inverse quantizing unit 203.

Note that the lossless decoding unit 202 actually extracts metadata such as encoding parameters and prediction mode information and so forth from the supplied bit streams, and supplies these to the intra prediction unit 211 and motion prediction/compensation unit 212.

The slice 1 processing unit 252 has an arithmetic decoding unit 261, a multi-valuing unit 262, macroblock line memory 263, and a context calculating unit 264.

The arithmetic decoding unit 261 performs arithmetic decoding of encoded data using context calculated by the context calculating unit 264, and generates binary data. The multi-valuing unit 262 performs multi-valuing of the binary data output from the arithmetic decoding unit 261. The multi-valuing unit 262 supplies the generated multi-value data to the storage unit 254 as decoded coefficient data, and also supplies this to the macroblock line memory 263.

The macroblock line memory 263 stores the decoded coefficient data supplied from the multi-valuing unit 262. The macroblock line memory 263 can store one macroblock line worth or more of decoded coefficient data.

The context calculating unit 264 uses the decoded coefficient data stored in the macroblock line memory 263 to calculate the context of the peripheral macroblocks adjacent to the macroblock to be subjected to decoding processing by the arithmetic decoding unit 261, and supplies this to the arithmetic decoding unit 261.

For example, the context calculating unit 264 generates context of the macroblock one to the left of the macroblock to be processed, and context of the macroblock one below the macroblock to be processed.

The slice 2 processing unit 253 has an arithmetic decoding unit 271, a multi-valuing unit 272, macroblock line memory 273, and a context calculating unit 274.

The arithmetic decoding unit 271 performs arithmetic decoding of encoded data using context calculated by the context calculating unit 274, and generates binary data. The multi-valuing unit 272 performs multi-valuing of the binary data output from the arithmetic decoding unit 271. The multi-valuing unit 272 supplies the generated multi-value data to the storage unit 254 as decoded coefficient data, and also supplies this to the macroblock line memory 273.

The macroblock line memory 273 stores the decoded coefficient data supplied from the multi-valuing unit 272. The macroblock line memory 273 can store one macroblock line worth or more of decoded coefficient data.

The context calculating unit 274 uses the decoded coefficient data stored in the macroblock line memory 273 to calculate the context of the peripheral macroblocks adjacent to the macroblock to be subjected to decoding processing by the arithmetic decoding unit 271, and supplies this to the arithmetic decoding unit 271.

For example, the context calculating unit 274 generates context of the macroblock one to the left of the macroblock to be processed, and context of the macroblock one above the macroblock to be processed.

Note that in the event that the object of decoding processing is a macroblock line at the topmost position of slice 2, the context calculating unit 274 generates the context of the macroblock one above the macroblock to be processed, using the decoded coefficient data of the bottommost macroblock line of slice 1 stored in the macroblock line memory 263 of the slice 1 processing unit 252.

By performing such decoding processing as described above, the lossless decoding unit 202 advances processing in an order the same as with the case of the lossless encoding unit 106, and performs peripheral reference in the same direction, so the encoded data can be correctly decoded.

[Decoding Processing]

Next, the flow of each processing executed by the above-described image decoding device 200 will be described. First, an example of the flow of decoding processing will be described with reference to the flowchart in FIG. 11.

Upon the decoding processing being started, in step S201, the storing buffer 201 stores the transmitted encoded data. In step S202, the lossless decoding unit 202 decodes the encoded data supplied from the storing buffer 201. Specifically, the I picture, P picture, and B picture encoded by the lossless encoding unit 106 in FIG. 2 are decoded.

At this time, the motion vector information, reference frame information, prediction mode information (intra prediction mode or inter prediction mode), and flag information and so forth, are also decoded.

Specifically, in the event that the prediction mode information is intra prediction mode information, the prediction mode information is supplied to the intra prediction unit 211. In the event that the prediction mode information is inter prediction mode information, prediction mode information and corresponding motion vector information are supplied to the motion prediction/compensation unit 212.

In step S203, the inverse quantization unit 203 inversely quantizes the transform coefficient decoded by the lossless decoding unit 202 using a property corresponding to the property of the quantization unit 105 in FIG. 2. In step S204, the inverse orthogonal transform unit 204 subjects the transform coefficient inversely quantized by the inverse quantization unit 203 to inverse orthogonal transform using a property corresponding to the property of the orthogonal transform unit 104 in FIG. 2. This means that difference information corresponding to the input of the orthogonal transform unit 104 in FIG. 2 (the output of the computing unit 103) has been decoded.

In step S205, the intra prediction unit 211 or motion prediction/compensation unit 212 performs the respective image prediction processing in accordance with the prediction mode information supplied from the lossless decoding unit 202.

That is to say, in the event that intra prediction mode information is supplied from the lossless decoding unit 202, the intra prediction unit 211 performs intra prediction mode intra prediction processing. Also, in the event that inter prediction mode information is supplied from the lossless decoding unit 202, the motion prediction/compensation unit 212 performs inter prediction mode motion prediction processing.

In step S206, the selecting unit 213 selects a prediction image. That is to say, the selecting unit 213 is supplied with a prediction image generated by the intra prediction unit 211, or, a prediction image generated by the motion prediction/compensation unit 212. The selecting unit 213 selects one of these. The selected prediction image is supplied to the computing unit 205.

In step S207, the computing unit 205 adds the prediction image selected in the processing in step S206 to the difference information obtained by the processing in step S204. Thus, the original image data is decoded.

In step S208, the deblocking filter 206 subjects the decoded image data supplied from the computing unit 205 to filtering. Thus, block distortion is removed.

In step S209, the frame memory 209 stores the decoded image data subjected to filtering.

In step S210, the screen rearranging buffer 207 performs rearranging frames of the decoded image data. Specifically, the sequence of frames of the decoded image data rearranged for encoding by the screen rearranging buffer 102 (FIG. 2) of the image encoding device 100 is rearranged in the original display sequence.

In step S211, the D/A conversion unit 208 performs D/A conversion of the decoded image data from the screen rearranging buffer 207 regarding which the frames have been rearranged. This decoded image data is output to an unshown display, and the image is displayed.

[Lossless Decoding Processing]

Figure 11:
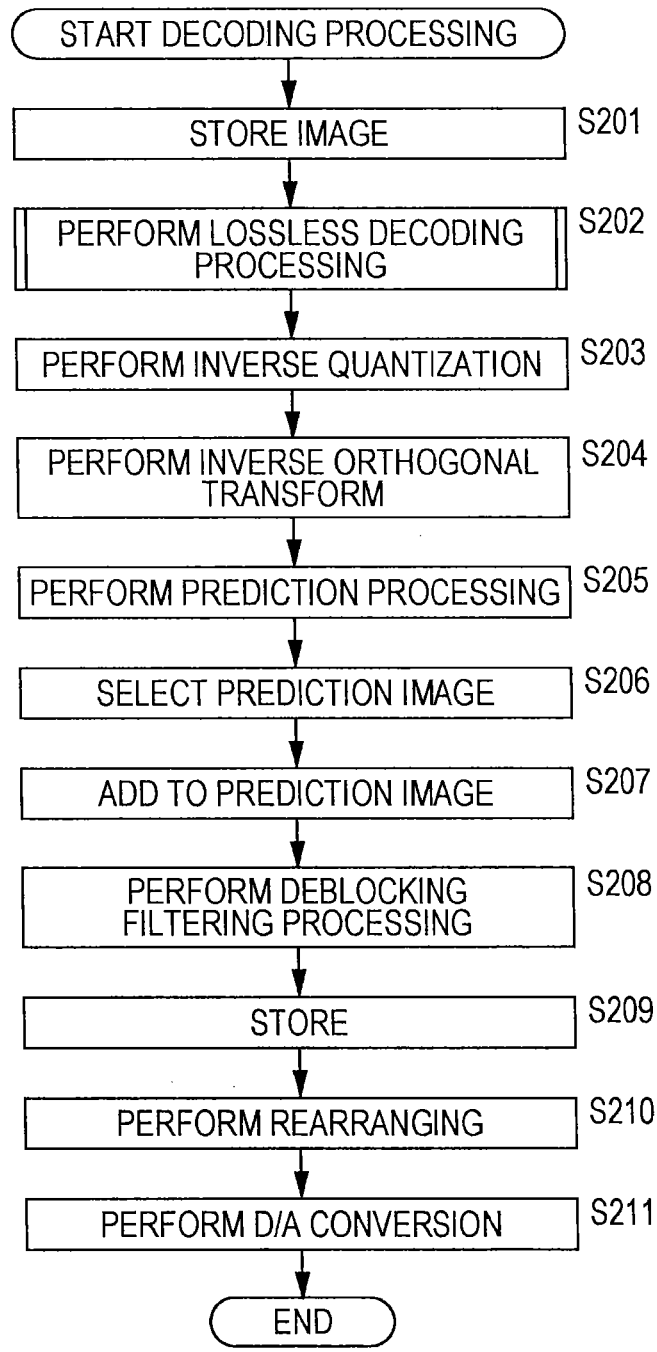
FIG. 11 is a flowchart describing an example of the flow of decoding processing.
Figure 12:
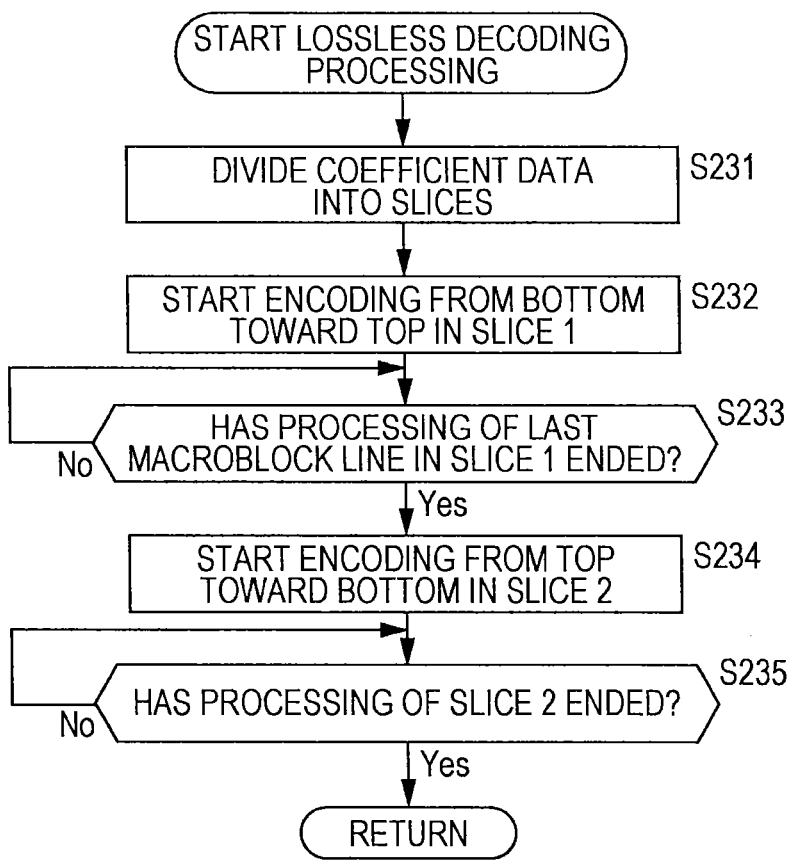
FIG. 12 is a flowchart describing an example of the flow of lossless decoding processing.

Next, an example of the flow of lossless decoding processing executed in step S202 in FIG. 11 will be described with reference to the flowchart in FIG. 12.

Upon the lossless decoding processing being started, in step S231 the demultiplexer 251 divides the coefficient data into individual slices. In step S232, the demultiplexer 251 supplies the encoded data of slice 1 to the slice 1 processing unit 252, and starts decoding heading from the bottom toward the top of slice 1 (slice 1 decoding processing) as a separate task.

In step S233, the demultiplexer 251 determines whether or not decoding of the last (bottommost) macroblock line of slice 1 has ended with the slice 1 decoding processing started in step S232, and stands by until determination is made that this has ended. In the event that determination is made that decoding of the last (bottommost) macroblock line of slice 1 has ended, the demultiplexer 251 advances the processing to step S234.

In step S234, the demultiplexer 251 supplies the encoded data from slice 2 to the slice 2 processing unit 253 and starts decoding heading from the top toward the bottom of slice 2 (slice 2 decoding processing) as a separate task.

In step S235, the demultiplexer 251 determines whether or not decoding of all macroblocks of slice 2 has ended with the slice 2 decoding processing started in step S234, and stands by until determination is made that this has ended. In the event that determination is made that decoding of slice 2 has ended, the demultiplexer 251 ends the lossless decoding processing, returns the processing to step S202 in FIG. 11, and advances the processing to step S203.

[Slice 1 Decoding Processing]

Figure 13:
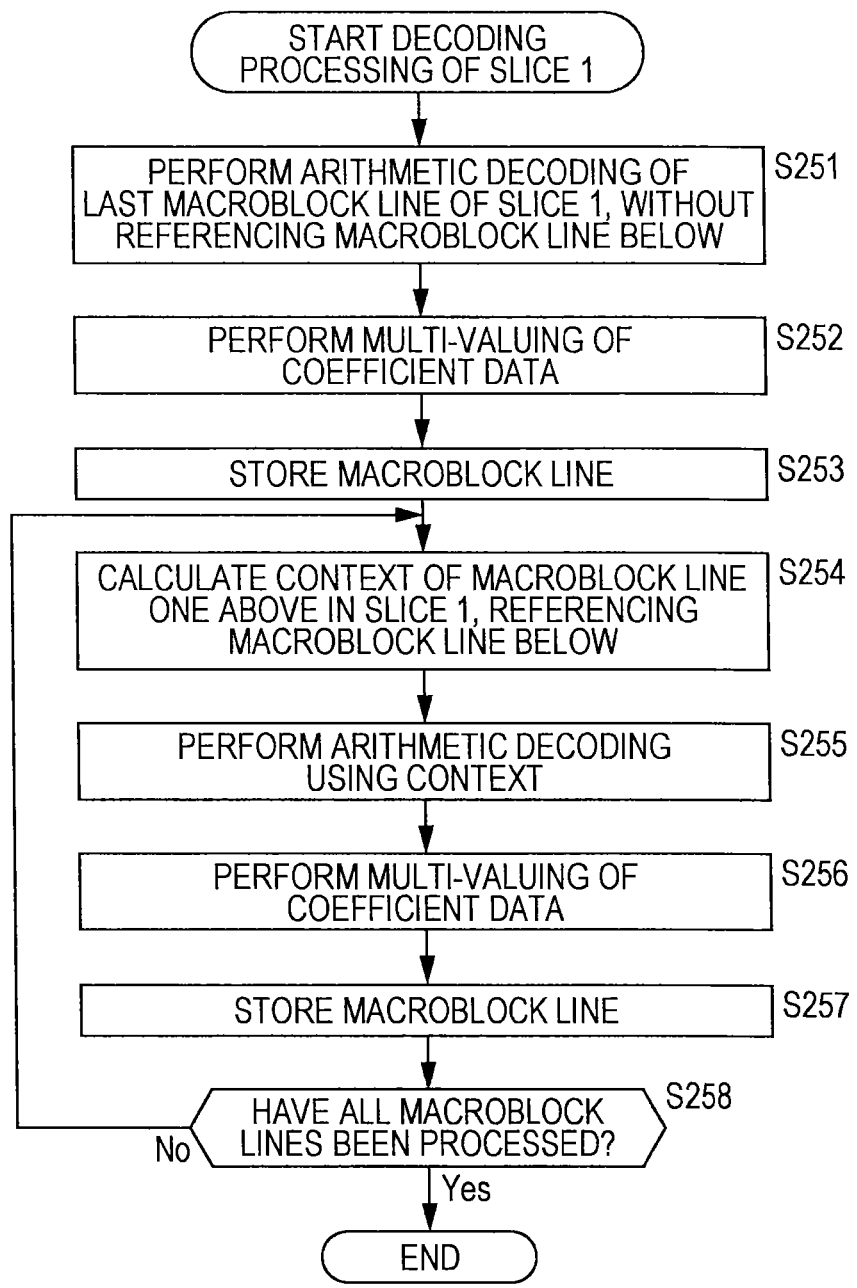
FIG. 13 is a flowchart describing an example of the flow of decoding processing of slice 1.

Next, an example of the flow of slice 1 decoding processing started by the processing in step S232 in FIG. 12 will be described with reference to the flowchart in FIG. 13.

Upon the slice 1 decoding processing being started, in step S251 the arithmetic decoding unit 261 performs arithmetic decoding of each macroblock in the last (bottommost) macroblock line of slice 1 without referencing the macroblocks of the macroblock line below.

In step S251, the multi-valuing unit 262 multi-values the binary coefficient data obtained by decoding in step S252, and converts into multi-value coefficient data.

In step S253, the macroblock line memory 263 stores the coefficient data (multi-value data) of the macroblock line to be processed, that is generated as described above. Upon storing the coefficient data of the bottommost macroblock line of slice 1, the macroblock line memory 263 advances the processing to step S254.

Upon the processing advancing to step S254, the macroblock line to be subjected to decoding processing moves one up. In step S254, the context calculating unit 264 references not only the macroblock line to be subjected to decoding processing, but also the macroblock line one below the macroblock line to be subjected to decoding processing, and calculates context.

In step S255, the arithmetic decoding unit 261 performs arithmetic decoding using the context generated in step S254.

In step S256, the multi-valuing unit 262 multi-values the binary coefficient data obtained by decoding in step S255, and generates multi-value data.

In step S257, the macroblock line memory 263 stores the coefficient data (multi-value data) of the macroblock line to be processed that is generated as described above. Upon storing the coefficient data of the macroblock line to be processed, the macroblock line memory 263 advances the processing to step S258.

In step S258, the slice 1 processing unit 252 determines whether or not all macroblock lines in slice 1 have been processed. In the event that determination is made that there exists an unprocessed macroblock line, the slice 1 processing unit 252 returns the processing to step S254, takes the macroblock line one above the macroblock line taken as the object of processing the previous time, and repeats the processing.

The processing of step S254 through step S258 is repeatedly performed, and in the event that determination is made in step S258 that all macroblock lines have been processed, the slice 1 decoding processing is ended.

[Slice 2 Decoding Processing]

Figure 14:
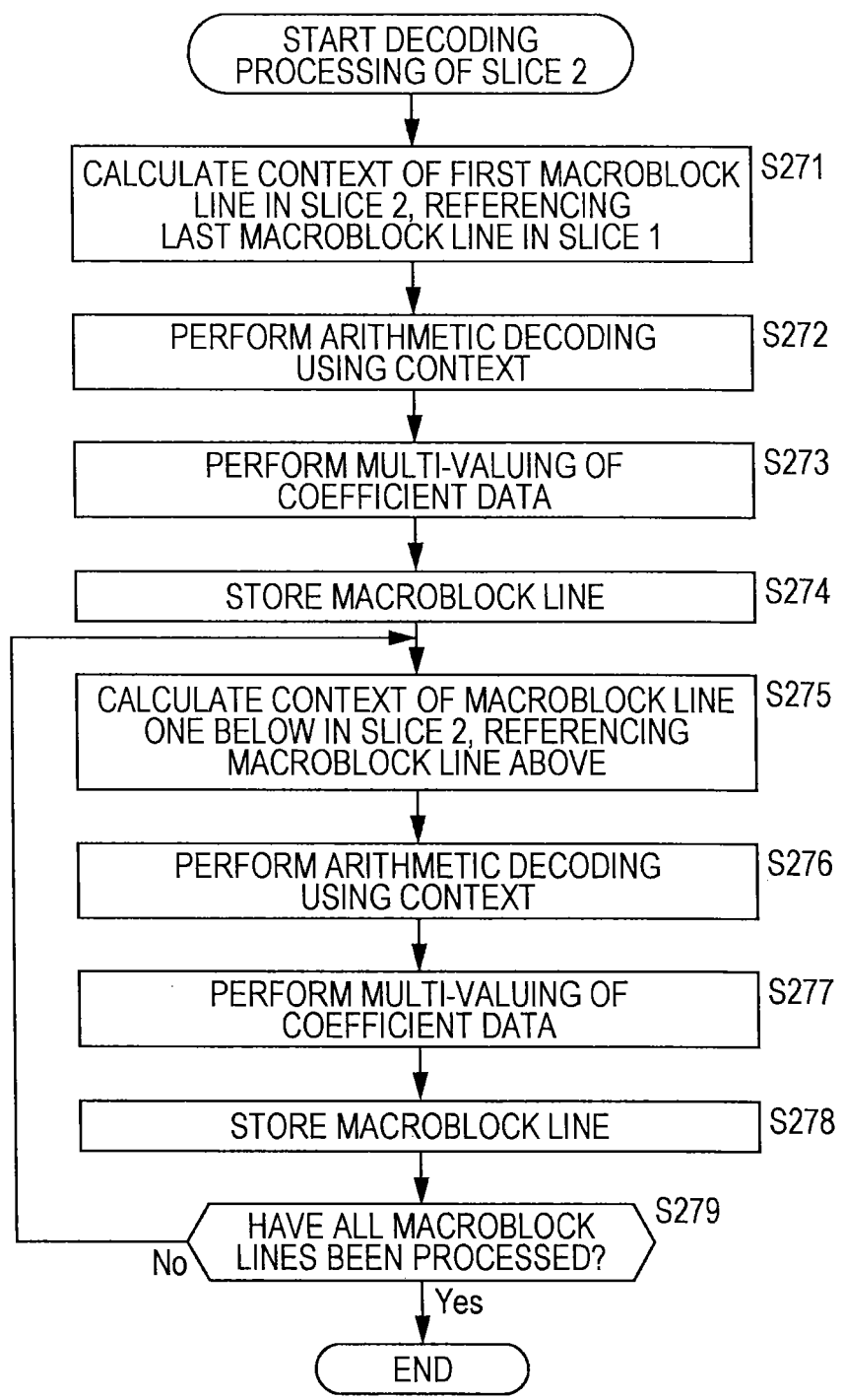
FIG. 14 is a flowchart describing an example of the flow of decoding processing of slice 2.

Next, an example of the flow of slice 2 decoding processing started by the processing in step S234 in FIG. 12 will be described with reference to the flowchart in FIG. 14.

Upon the slice 2 decoding processing being started, in step S271 the context calculating unit 274 calculates context for each macroblock in the first (topmost) macroblock line in slice 2 to be processed, referencing not only that macroblock line to be processed but also the last (bottommost) macroblock line of slice 1 stored in the macroblock line memory 263 as well.

In step S272, the arithmetic decoding unit 271 performs arithmetic decoding using the context calculated in step S271.

In step S273, the multi-valuing unit 272 multi-values the binary coefficient data obtained by decoding in step S272, and converts into multi-value coefficient data.

In step S274, the macroblock line memory 273 stores the coefficient data (multi-value data) of the macroblock line to be processed, that is generated as described above. Upon storing the coefficient data of the topmost macroblock line of slice 2, the macroblock line memory 273 advances the processing to step S275.

Upon the processing advancing to step S275, the macroblock line to be subjected to decoding processing moves one down. In step S275, the context calculating unit 274 references not only the macroblock line to be subjected to decoding processing, but also the macroblock line one above the macroblock line to be subjected to decoding processing, and calculates context.

In step S276, the arithmetic decoding unit 271 performs arithmetic decoding using the context generated in step S275.

In step S277, the multi-valuing unit 272 multi-values the binary coefficient data obtained by decoding in step S276, and generates multi-value data.

In step S278, the macroblock line memory 273 stores the coefficient data (multi-value data) of the macroblock line to be processed that is generated as described above. Upon storing the coefficient data of the macroblock line to be processed, the macroblock line memory 273 advances the processing to step S279.

In step S279, the slice 2 processing unit 253 determines whether or not all macroblock lines in slice 2 have been processed. In the event that determination is made that there exists an unprocessed macroblock line, the slice 2 processing unit 253 returns the processing to step S275, takes the macroblock line one below the macroblock line taken as the object of processing the previous time, and repeats the processing.

The processing of step S275 through step S279 is repeatedly performed, and in the event that determination is made in step S279 that all macroblock lines have been processed, the slice 2 decoding processing is ended.

Thus, the image decoding device 200 can correctly decoding encoded data obtained by being encoded by the image encoding device 100. Accordingly, the lossless decoding unit 202 realize high speed image encoding while suppressing deterioration in encoding efficiency.

<3. Third Embodiment>
[Configuration of Lossless Encoding Unit]

Now, while generating of context has been described above as being performed at the slice 1 processing unit 153 and the slice 2 processing unit 154, context may be generated before stored in the storage unit 152, unrestricted to this.

Figure 15:
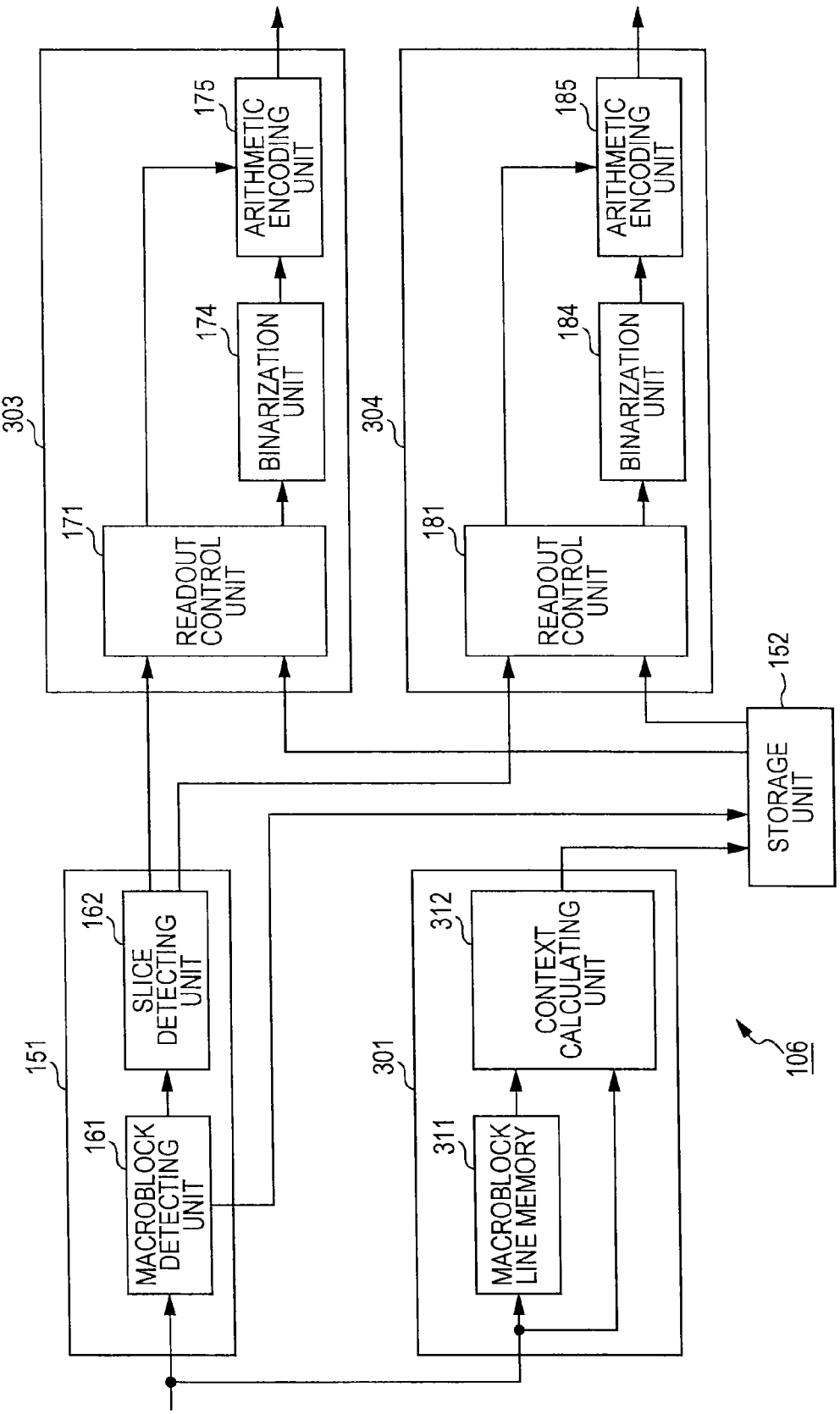
FIG. 15 is a block diagram illustrating another configuration example of a lossless encoding unit.

FIG. 15 is a block diagram illustrating another configuration example of the lossless encoding unit 106 in FIG. 1.

As shown in FIG. 15, in this case, the lossless encoding unit 106 has, in addition to the configuration of the case in FIG. 3, a context processing unit 301. Also, the lossless encoding unit 106 has a slice 1 processing unit 303 instead of the slice 1 processing unit 153 in the case in FIG. 3, and further has a slice 2 processing unit 304 instead of the slice 2 processing unit 154.

The context processing unit 301 calculates context form the coefficient data supplied from the quantization unit 105. The slice 1 processing unit 303 basically has the same configuration as with the slice 1 processing unit 153, but since the context processing unit 301 exists externally from the slice 1 processing unit 303, the macroblock line memory 172 and context calculating unit 173 are omitted. The slice 2 processing unit 304 basically has the same configuration as with the slice 2 processing unit 154, but since the context processing unit 301 exists externally from the slice 2 processing unit 304, the macroblock line memory 182 and context calculating unit 183 are omitted.

The context processing unit 301 has macroblock line memory 311 and a context calculating unit 312. The macroblock line memory 311 is basically the same as with the macroblock line memory 172 and macroblock line memory 182, and stores coefficient data supplied from the quantization unit 105. Note that the reference direction of slice 1 is opposite to the conventional, and the macroblock line one below the macroblock to be processed is referenced, so the macroblock line memory 311 needs to be arranged to store at least all coefficient data of one macroblock line.

The context calculating unit 312 is basically the same as with the context calculating unit 173 and context calculating unit 183, and references the macroblock line stored in the macroblock line memory 311 to calculate context.

In the case of calculating context with slice 2, the context calculating unit 312 references the macroblock line one above the object of processing, but in the case of calculating context in slice 1, references the macroblock line one blow the object of processing.

That is to say, in the case of calculating context in slice 2, the context calculating unit 312 calculates context (context index) by referencing a macroblock (mb-A) one to the left of the macroblock to be processed (curr) and a macroblock one above (mb-B), in the same way as with the conventional.

Conversely, in the case of calculating context in slice 1, the context calculating unit 312 calculates context (context index) by referencing a macroblock (mb-A) one to the left of the macroblock to be processed (curr) and a macroblock one below (mb-B'). That is to say, at the point that the macroblock one below (mb-B') is supplied, the context calculating unit 312 reads out the macroblock to be processed (curr) and the macroblock (mb-A) one to the left which are stored in the macroblock line memory 311, and calculates context (context index).

Note that at the time of generating context with the macroblock line second from the bottom in slice 1 as the object of processing (curr), the context calculating unit 312 generates context of the bottommost macroblock line of slice 1 as well.

The context calculating unit 312 stores the calculated context in a region of the storage unit 152 separate from the coefficient data and head address of the macroblock addresses, in a manner tagged so as to indicate the correlation as to the coefficient data and head address of the macroblock addresses.

The readout control unit 171 of the slice 1 processing unit 303 reads out, along with the coefficient data and head address of the macroblock addresses, necessary context as well, from the storage unit 152. The readout control unit 171 supplies the context that has been read out to the arithmetic encoding unit 175.

The readout control unit 181 of the slice 2 processing unit 304 reads out, along with the coefficient data and head address of the macroblock addresses, necessary context as well, from the storage unit 152. The readout control unit 181 supplies the context that has been read out to the arithmetic encoding unit 185.

[Lossless Encoding Processing]

Figure 16:
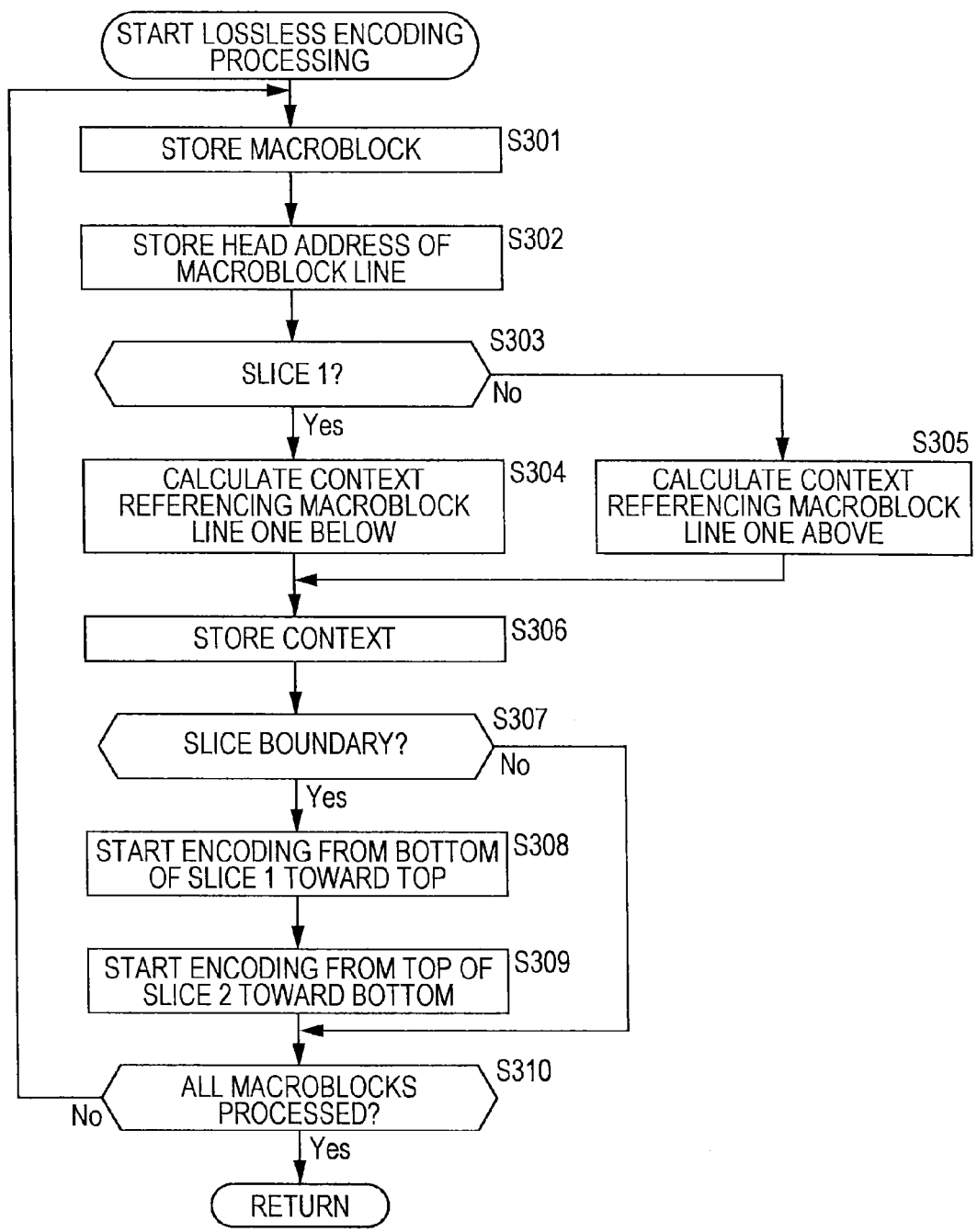
FIG. 16 is a flowchart describing an example of the flow of lossless encoding processing.

An example of the flow of lossless encoding processing in this case will be described with reference to the flowchart in FIG. 16. This flowchart corresponds to the flowchart in FIG. 6.

In this case, each processing of step S301 and step S302 are executed in the same way of each processing of step S131 and step S132 in FIG. 6.

In step S303, the context processing unit 301 determines whether or not the macroblock line to be processed is slice 1, and in the event that determination is made that this is slice 1, advances the processing to step S304.

In step S304, the context processing unit 301 calculates context referencing the macroblock line one blow. Note that context of the topmost macroblock line and bottommost macroblock line of slice 1 is generated as described above. Upon having generated context, the context processing unit 301 advances the processing to step S306.

Also, in the event that determination is made in step S303 that the macroblock line to be processed is slice 2, the context processing unit 301 advances the processing to step S305.

In step S305, the context processing unit 301 calculates context referencing the macroblock line one above. Note that context of the topmost macroblock line in slice 2 is generated referencing the bottommost macroblock line of slice 1. Upon having generated context, the context processing unit 301 advances the processing to step S306.

In step S306, the storage unit 152 stores the context calculated in step S304 or step S305.

Each processing of step S307 through step S310 is performed in the same way as each processing of step S133 through step S136 in FIG. 6.

[Slice 1 Encoding Processing]

Figure 17:
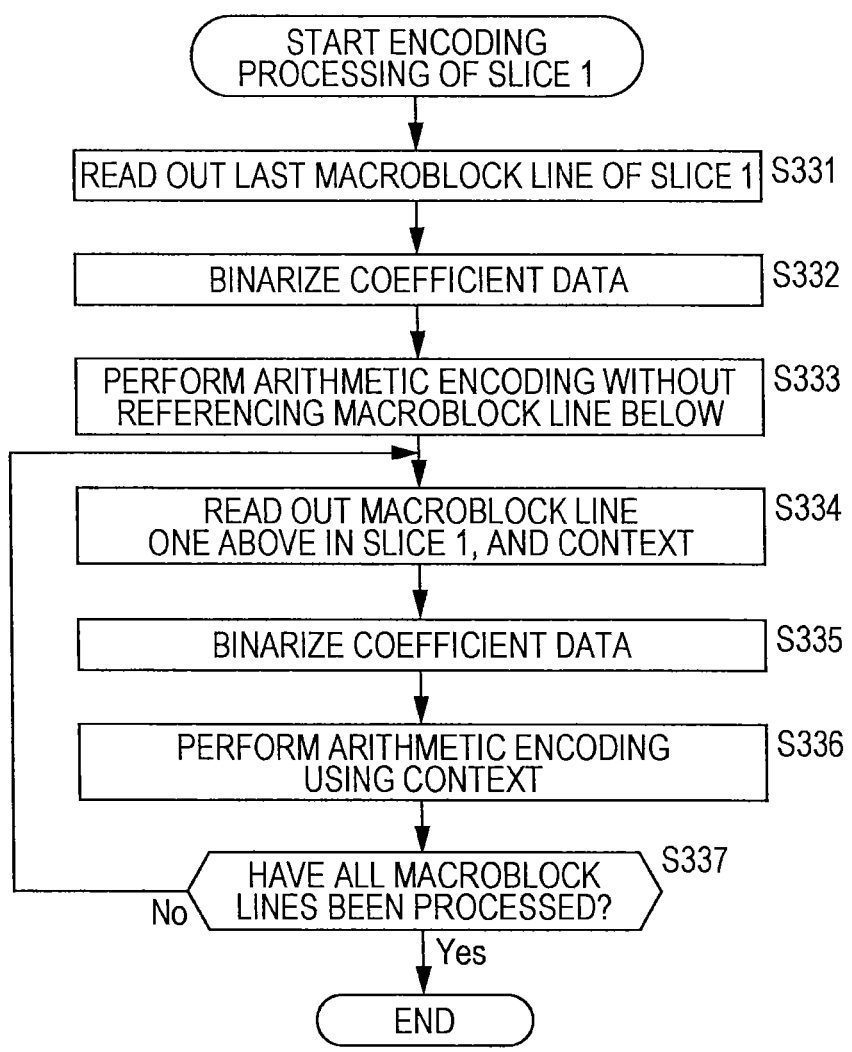
FIG. 17 is a flowchart describing another example of the flow of encoding processing of slice 1.

Next, an example of the flow of slice 1 encoding processing started from the processing in step S308 in FIG. 16 will be described with reference to the flowchart in FIG. 17. Note that this flowchart corresponds to the flowchart in FIG. 7.

Figure 7:
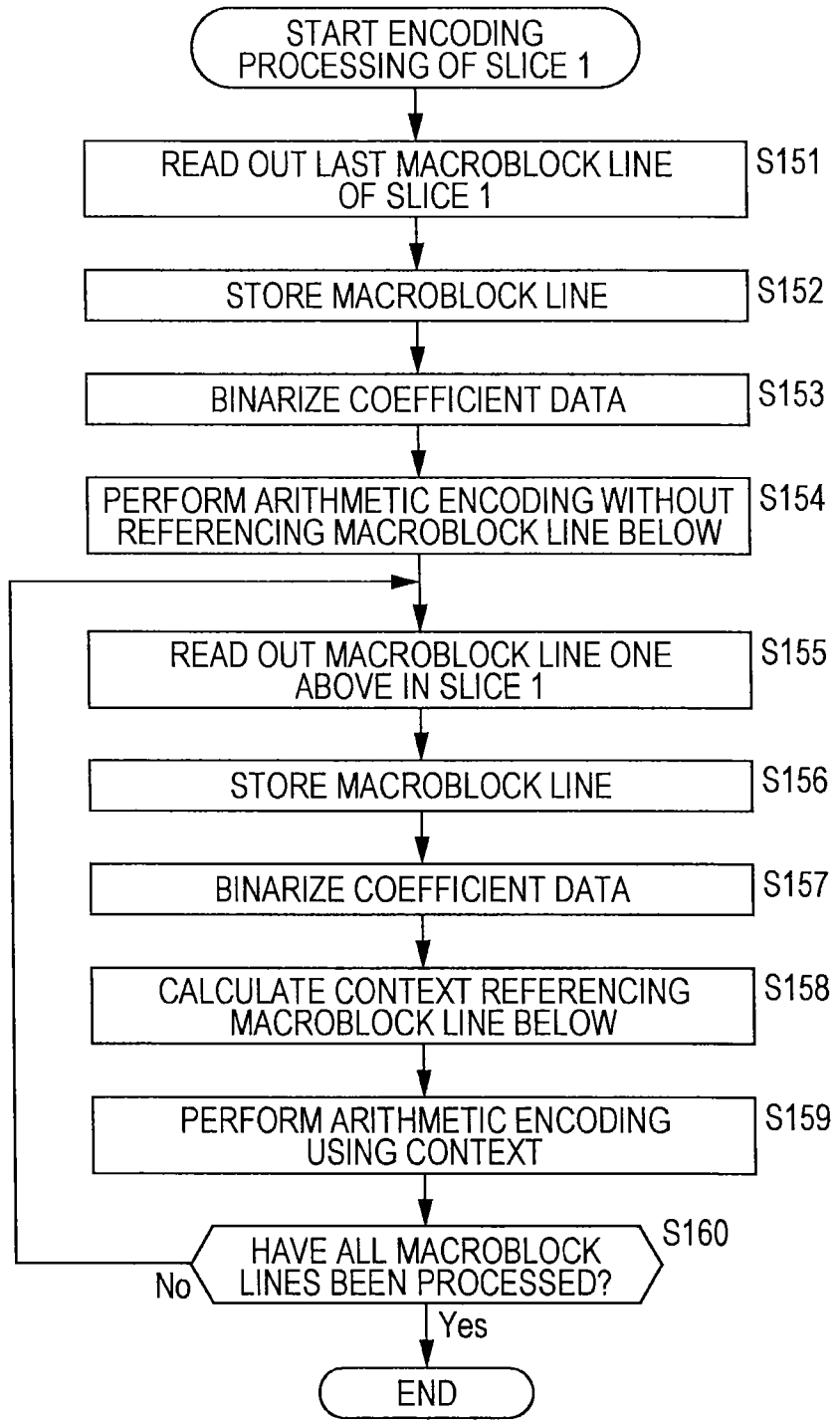
FIG. 7 is a flowchart describing an example of the flow of encoding processing of slice 1.

This case is also basically performed in the same way as with FIG. 7, but the context has already been generated, so each processing of step S152, step S156, and step S158 in FIG. 7 is omitted, and each processing of step S331 corresponding to step S151, step S332 corresponding to step S153, step S333 corresponding to step S154, step S334 corresponding to step S155, step S335 corresponding to step S157, step S336 corresponding to step S159, and step S337 corresponding to step S160, is executed.

Note however, that in step S334, the readout control unit 171 reads out, along with the macroblock line one above in slice 1, the corresponding context as well, from the storage unit 152. In step S336, the arithmetic encoding unit 175 uses the context read out in this step S334 to perform arithmetic encoding.

[Slice 2 Encoding Processing]

Figure 18:
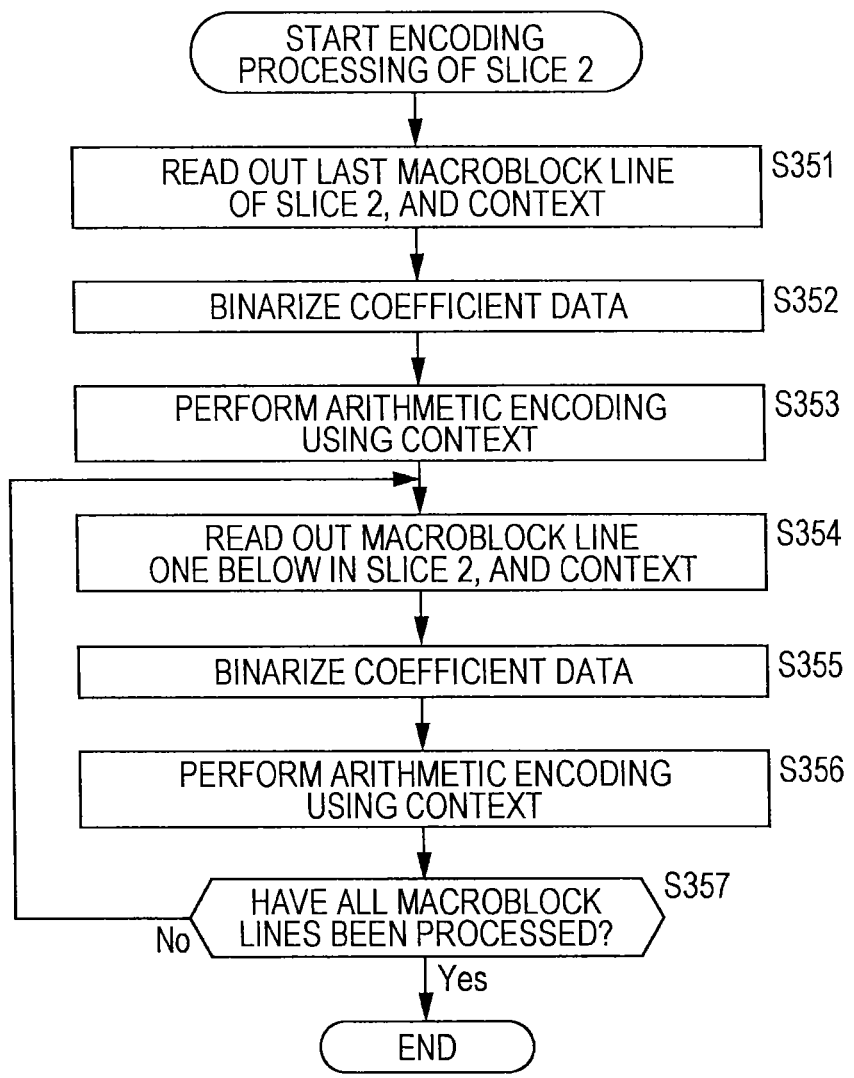
FIG. 18 is a flowchart describing another example of the flow of encoding processing of slice 2.

Next, an example of the flow of slice 2 encoding processing started from the processing in step S309 in FIG. 16 will be described with reference to the flowchart in FIG. 18. Note that this flowchart corresponds to the flowchart in FIG. 8.

Figure 8:
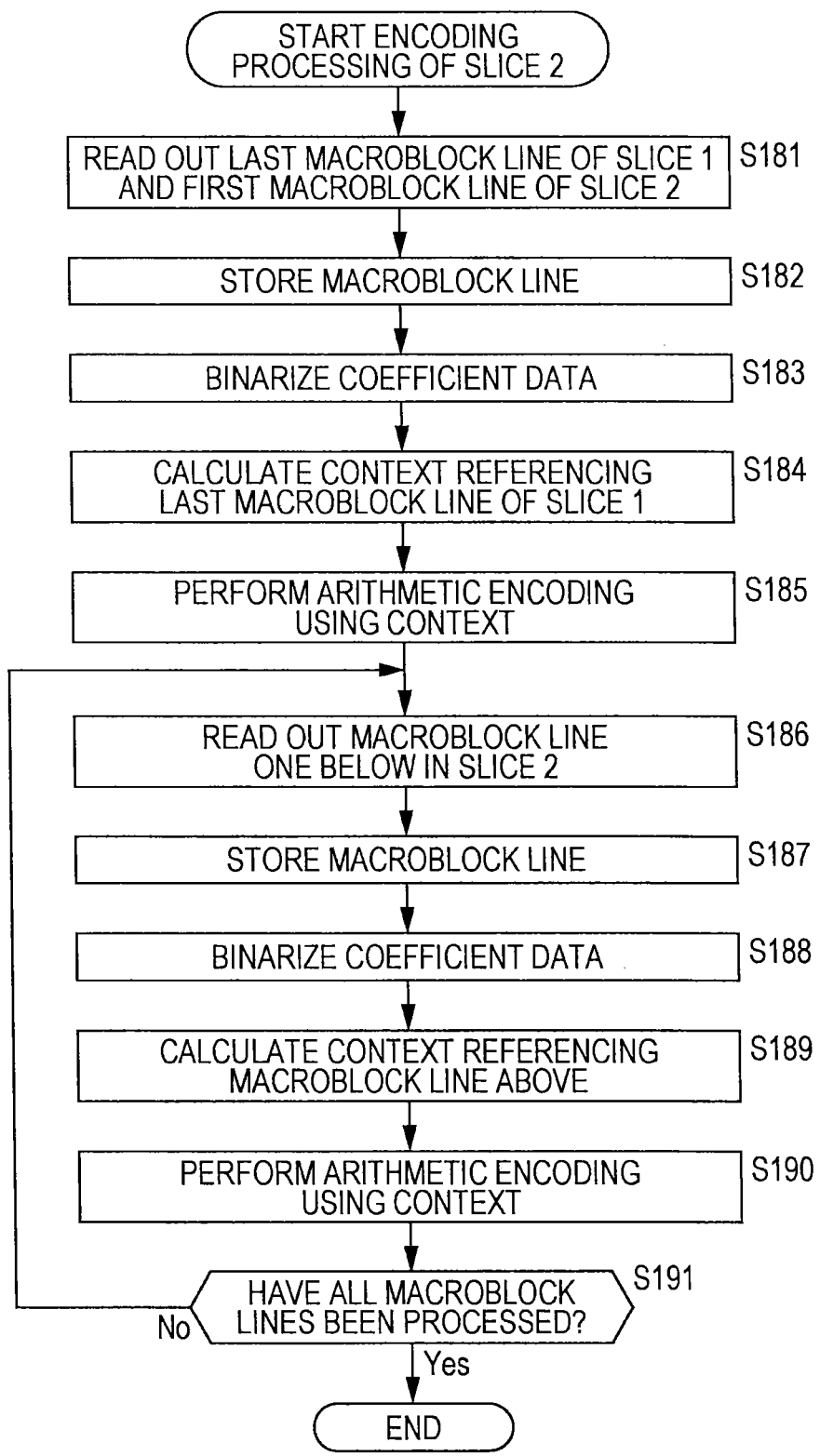
FIG. 8 is a flowchart describing an example of the flow of encoding processing of slice 2.

This case is also basically performed in the same way as with FIG. 8, but the context has already been generated, so each processing of step S182, step S184, step S186, and step S189 in FIG. 8 is omitted, and each processing of step S351 corresponding to step S181, step S352 corresponding to step S183, step S353 corresponding to step S185, step S354 corresponding to step S186, step S355 corresponding to step S188, step S356 corresponding to step S190, and step S357 corresponding to step S191, is executed.

Note however, that in step S351, the readout control unit 181 reads out, along with the first (topmost) macroblock line in slice 2, the corresponding context as well, from the storage unit 152. That is to say, the context of the last (bottommost) macroblock line of slice 1 is also read out. In step S353, the arithmetic encoding unit 185 uses the context read out in this step S351 to perform arithmetic encoding.

In the same way, in step S354, the readout control unit 181 reads out, along with the macroblock line one below in slice 2, the corresponding context as well, from the storage unit 152. In step S356, the arithmetic encoding unit 185 uses the context read out in this step S354 to perform arithmetic encoding.

As described above, by performing calculation of context before storing the coefficient data in the storage unit 152, the load on the arithmetic encoding processing after readout (slice 1 processing unit 303 and slice 2 processing unit 304) can be alleviated. Generally, the load of arithmetic encoding processing is greater as compared to other processing before and after this, so as described above, by calculating context beforehand, before storing the coefficient data in the storage unit 152, the load can be dispersed, and reduction in costs and even higher speed of encoding processing and so forth can be realized.

[Duplication of Probability Table]

Further, the initial state of arithmetic encoding can be improved.

With the AVC standard, the probability table for CABAC is initialized using a parameter called cabac_init_idc, and parameters called slice_type and SliceQPy.

Figure 19:
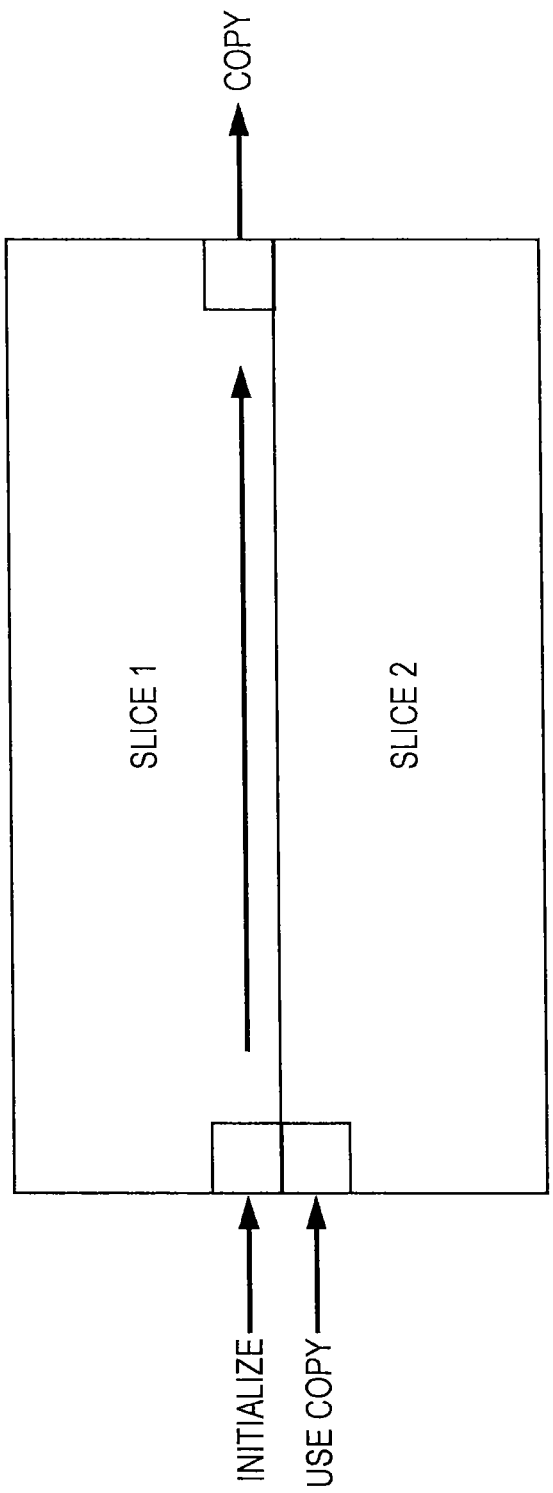
FIG. 19 is a diagram describing an example of the way in which a probability table is used.

In contrast with this, as shown in FIG. 19, at the point of the processing of the bottommost macroblock line of slice 1 ending, the contents of the probability table which the slice 1 processing unit 153 has are copied to the probability table which the slice 2 processing unit 154 has. The slice 2 processing unit 154 starts CABAC with the values which the slice 1 processing unit 153 had been using as the initial value.

Thus, the lossless encoding unit 106 can start encoding with probability values more suitable for the image than the initial values according to the standard, and encoding efficiency can be improved.

[Slice 1 Encoding Processing]

Figure 20:
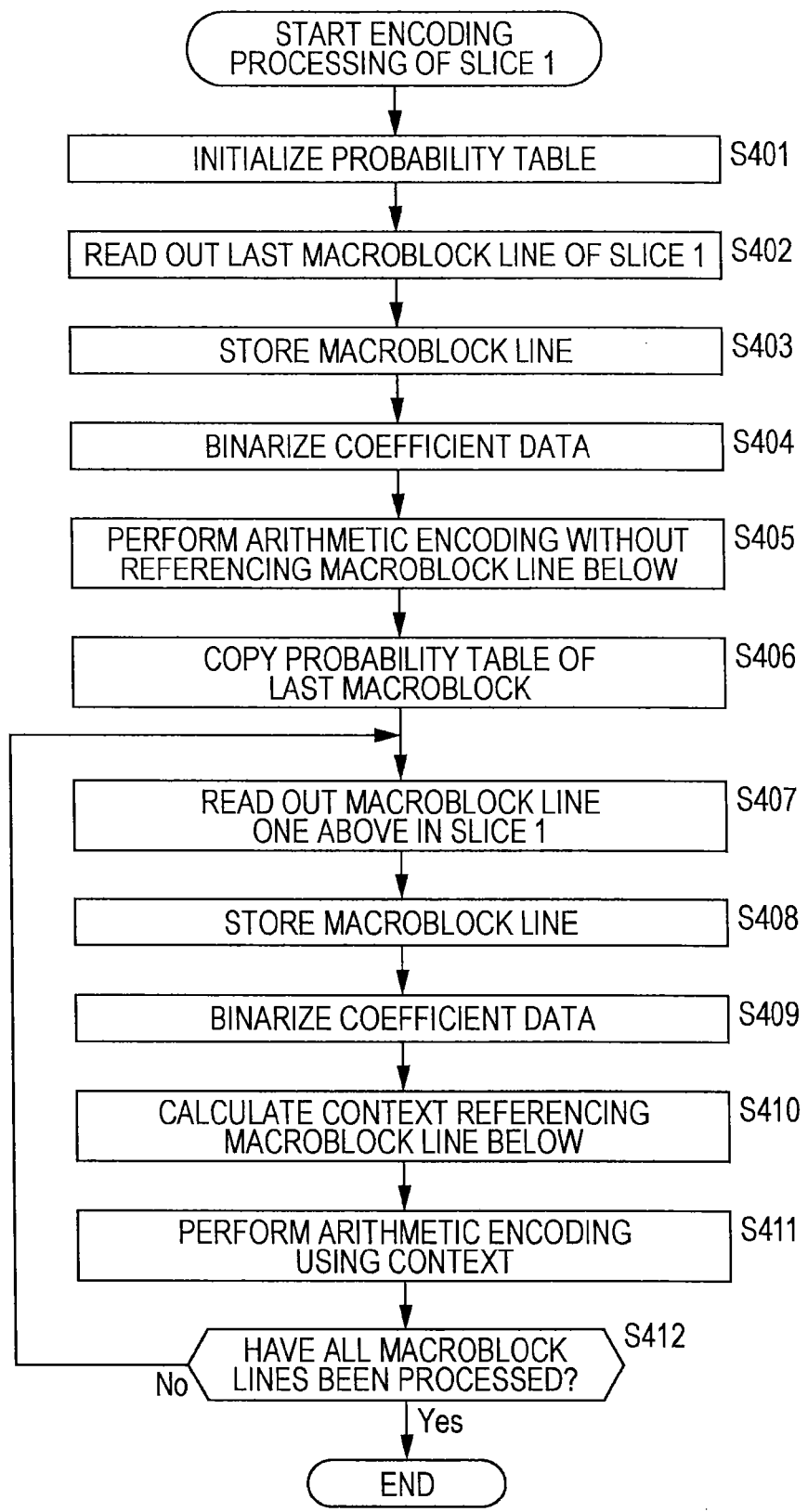
FIG. 20 is a flowchart describing another example of the flow of encoding processing of slice 1.

An example of the flow of the slice 1 encoding processing in this case will be described with reference to the flowchart in FIG. 20. The flowchart shown in FIG. 20 corresponds to the flowchart in FIG. 7.

In step S401, the arithmetic coding unit 175 initializes the probability table. Each processing of step S402 through step S405 is performed in the same way as with each processing of step S151 through step S154 in FIG. 7.

In step S406, the arithmetic coding unit 175 copies the probability table of the last (rightmost) macroblock of the bottommost macroblock line, and supplies this to the arithmetic coding unit 185.

Each processing of step S407 through step S412 is performed in the same way as with each processing of step S155 through step S160 in FIG. 7.

[Slice 2 Encoding Processing]

Figure 21:
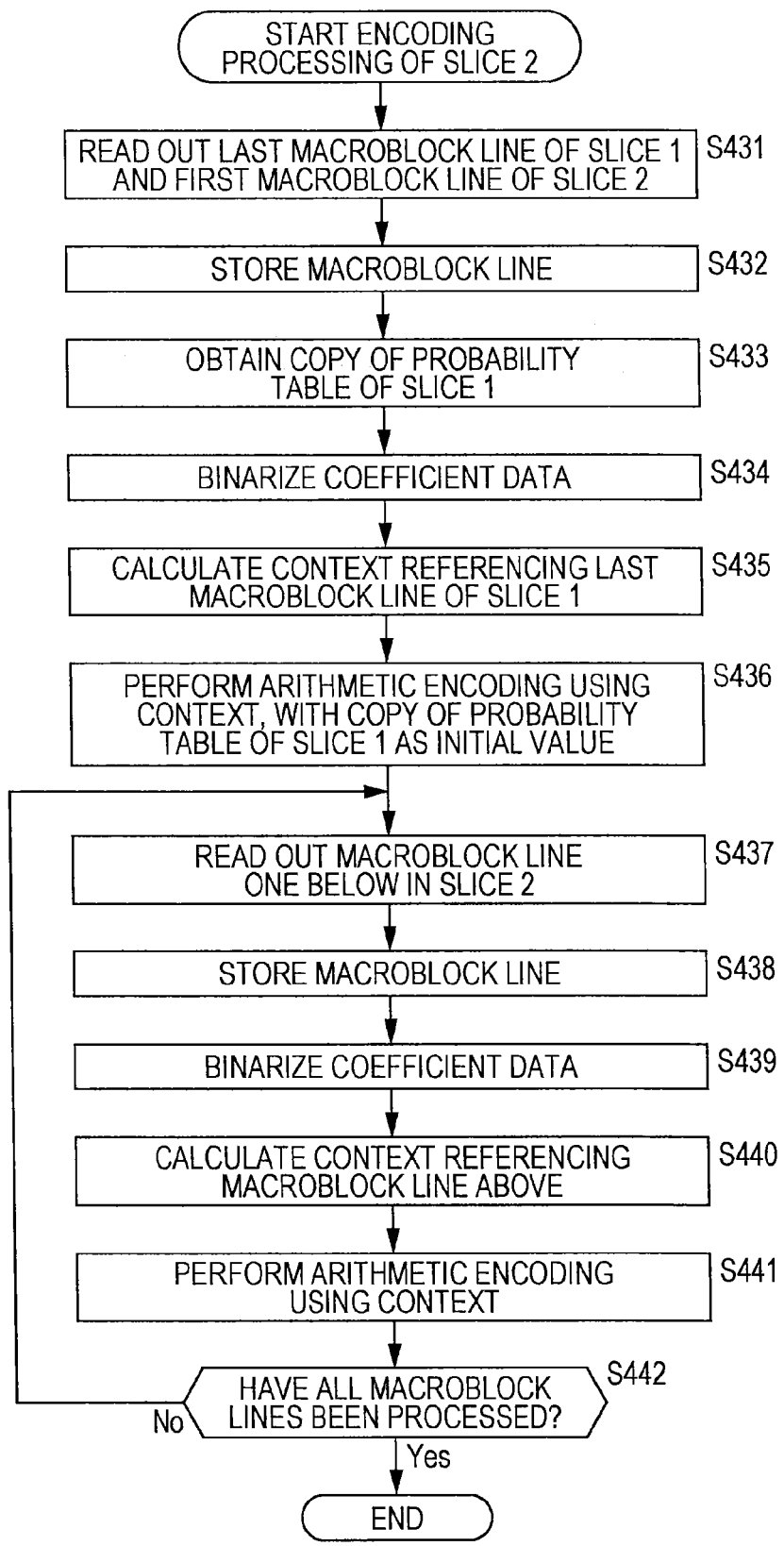
FIG. 21 is a flowchart describing another example of the flow of encoding processing of slice 2.
Figure 23:
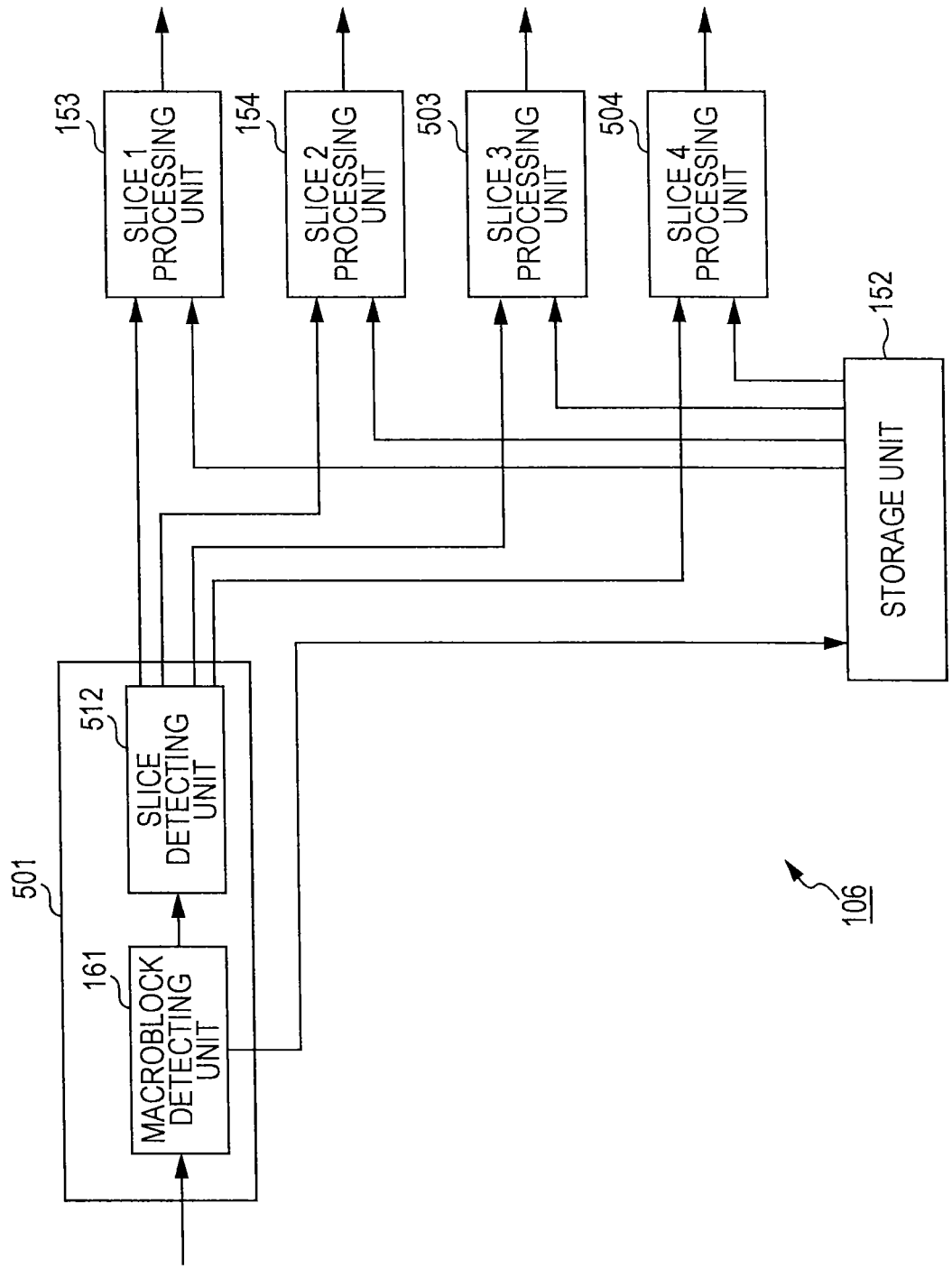
FIG. 23 is a block diagram illustrating another configuration example of a lossless encoding unit.

An example of the flow of the slice 2 encoding processing in this case will be described with reference to the flowchart in FIG. 21. The flowchart shown in FIG. 21 corresponds to the flowchart in FIG. 8.

Each processing of step S431 and step S432 is performed in the same way as with each processing of step S181 and step S182 in FIG. 8.

In step S433, the arithmetic coding unit 185 obtains a copy of the probability table of slice 1. Each processing of step S434 and step S435 is performed in the same way as with each processing of step S183 and step S184 in Fig. 8.

In step S436, the arithmetic coding unit 185 performs arithmetic encoding using context, with the copy of the probability table of slice 1 as the initial value.

Each processing of step S437 through step S442 is performed in the same way as with each processing of step S186 through step S191 in FIG. 8.

Note that with the image decoding device 200 as well, a copy of the probability table is used as an initial value for decoding, in the same way. Accordingly, the image encoding device 100 provides the image decoding device 200 with information indicating whether the probability table has been initialized or copied, by adding to the encoded data or the like, for example. Upon obtaining information to the effect that a copy of the probability table is to be used as the initial value, the lossless decoding unit 202 of the image decoding device 200 copies the contents of the CABAC probability table at the point that the arithmetic decoding unit 261 of the slice 1 processing unit 252 has ended processing of the bottommost macroblock line of slice 1, and the arithmetic decoding unit 271 of the slice 2 processing unit 253 starts the arithmetic decoding processing using that copy. Due to such an arrangement, the lossless decoding unit 202 can use the same probability table as with the above-described case of encoding, and the encoded data can be correctly decoded.

[Multi-Division]

While description has been made above of dividing the image into two, the number of divisions may be other than two. For example, the image may be divided into four entropy slices of slice 1 through slice 4, as shown in FIG. 22.

Figure 22:
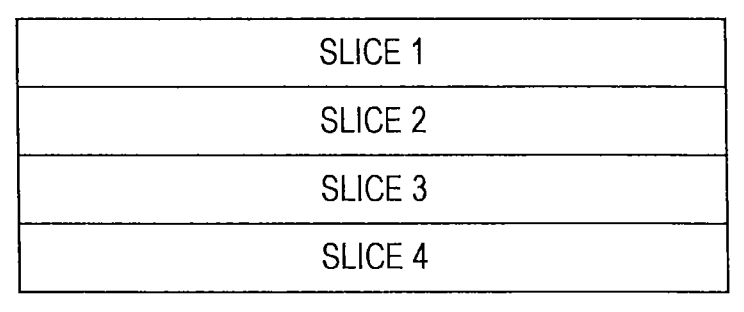

In the case of dividing an image into four as with the example in FIG. 22 here, encoding of slice 1 and slice 2 is performed in the same way as with the case of division into two, described above. Also, slice 3 is encoded in the same way as with slice 1, and slice 4 in the same way as with slice 2.

That is to say, encoding processing of slice 1 and slice 3 is advanced in the order from the bottom macroblock line toward the top macroblock line. Also, with the encoding processing of slice 1 and slice 3, the macroblock one to the left and the macroblock one below the macroblock which is the object of processing are referenced as peripheral macroblocks.

On the other hand, encoding processing of slice 2 and slice 4 is advanced in the order from the top macroblock line toward the bottom macroblock line, in the same way as with the conventional. Also, with the encoding processing of slice 2 and slice 4, the macroblock one to the left and the macroblock one above the macroblock which is the object of processing are referenced as peripheral macroblocks.

In the same way as with encoding processing of slice 2 being started when coefficient data of the bottommost macroblock line of slice 1 being stored in the storage unit 152, encoding processing of slice 4 is started when coefficient data of the bottommost macroblock line of slice 3 is stored in the storage unit 152.

Further, in the same way as the bottommost macroblock line of slice 1 being referenced in the encoding processing of the topmost macroblock line of slice 2, in the encoding processing of the topmost macroblock line of slice 4, the bottommost macroblock line of slice 3 is referenced as the macroblock one above the macroblock to be processed.

[Configuration of Lossless Encoding Unit]

In the case of dividing the image into four in this way, the lossless encoding unit 106 has a slice 3 processing unit 503 which is the same as the slice 1 processing unit 153 in FIG. 3, and a slice 4 processing unit 504 which is the same as with the slice 2 processing unit 154.

Also, instead of the control unit 151 which divides the image into two slices, the lossless encoding unit 106 has a control unit 501 which divides the image into four slices.

The control unit 501 has the macroblock detecting unit 161 and a slice detecting unit 512. The slice detecting unit 512 controls the slice 1 processing unit 153, slice 2 processing unit 154, slice 3 processing unit 503, and slice 4 processing unit 504, so as to divide the image into four slices, and causes each to perform encoding processing in parallel.

Other than the image being divided into four, each processing is executed in the same way as with the case of being divided into two. That is to say, slice 3 is encoded in the same way as with slice 1, and slice 4 is encoded in the same way as with slice 2.

By increasing the number of divisions in this way, the number of parallels increases, so throughput improves, and the lossless encoding unit 106 can perform lossless encoding processing at higher speed. At this time, encoding processing is performed in the same way as with the case of division into two, so the lossless encoding unit 106 can realize high speed image encoding while suppressing deterioration in encoding efficiency.

That is to say, the lossless encoding unit 106 of the image encoding device 100 divides the image to be encoded into multiple regions which are arrayed vertically. As for the even-numbered regions from the top, the lossless encoding unit 106 then performs encoding in the order from the top macroblock line toward the bottom as with the conventional, and references the macroblock one to the left and the macroblock one above the macroblock to be processed, as peripheral macroblocks.

Conversely, with odd-numbered regions from the top, the lossless encoding unit 106 performs encoding in the order from the bottom macroblock line toward the top, opposite to the conventional, and references the macroblock one to the left and the macroblock one below the macroblock to be processed, as peripheral macroblocks.

Further, at the point that encoding of the bottommost macroblock line of the odd-numbered regions form the top has ended, the lossless encoding unit 106 starts encoding processing of the region one below (even-numbered from the top).

Also, at this time, the lossless encoding unit 106 references the bottommost macroblock line in the odd-numbered region from the top, and performs encoding processing for the topmost macroblock line of the region one below (even numbered from the top).

[Configuration of Lossless Decoding Unit]

Figure 24:
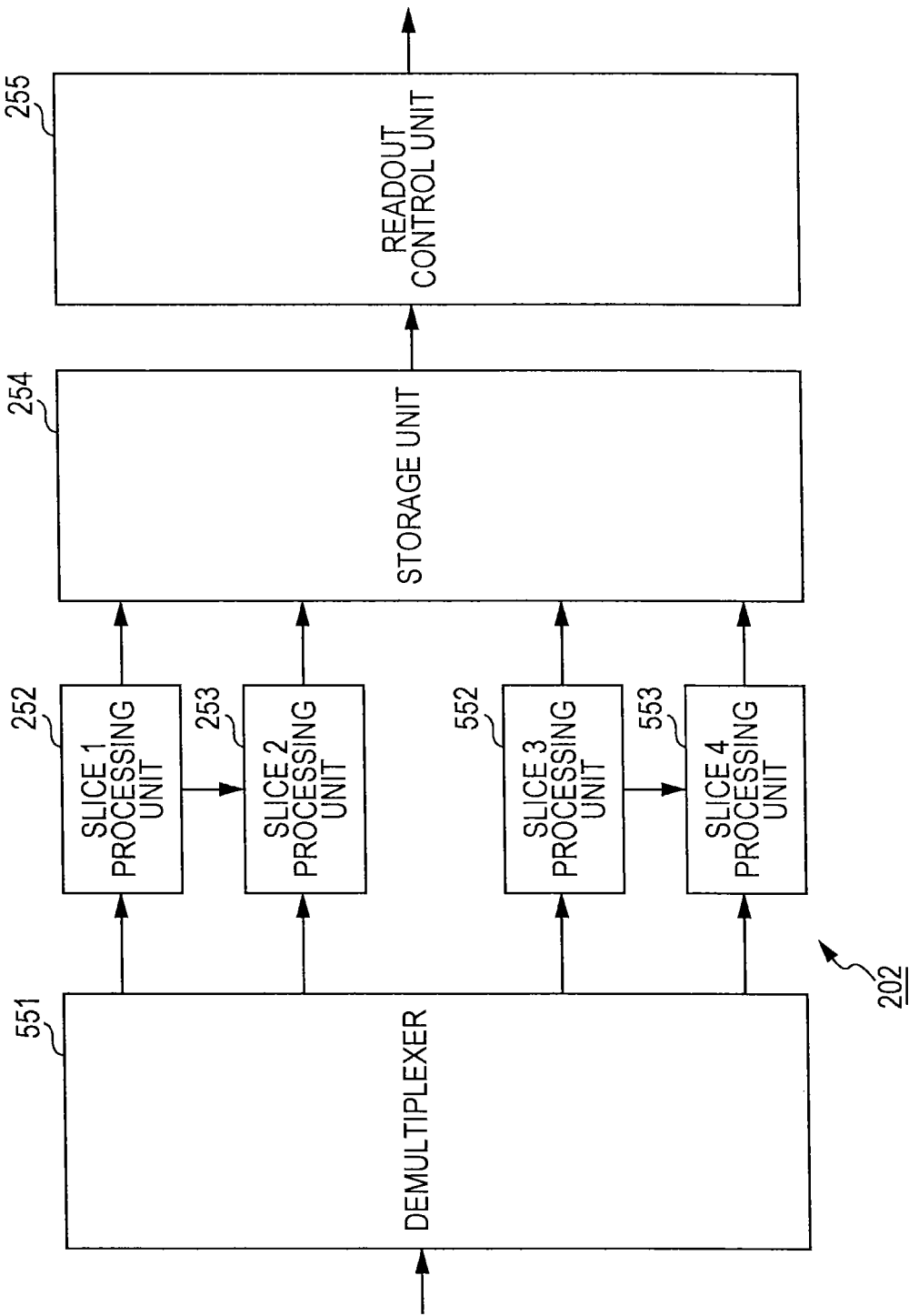
FIG. 24 is a block diagram illustrating another configuration example of a lossless decoding unit.

FIG. 24 illustrates a configuration example of the lossless decoding unit 202 of the image decoding device 200 in the case of dividing an image into four.

As shown in FIG. 24, the lossless decoding unit 202 in this case has a demultiplexer 551 which divides the encoded data into four slice, instead of the demultiplexer 251, as compared with the case shown in FIG. 10, and further has a slice 3 processing unit 552 and a slice 4 processing unit 553.

The slice 3 processing unit 552 is a processing unit for decoding encoded data of slice 3, has the same configuration as with the slice 1 processing unit 252, and performs the same processing. With slice 3, encoding has been performed with the same method as slice 1, so the slice 3 processing unit 552 can correctly decode the encoded data of slice 3 by decoding with the same method as with the slice 1 processing unit 252.

The slice 4 processing unit 553 is a processing unit for decoding encoded data of slice 4, has the same configuration as with the slice 2 processing unit 253, and performs the same processing. With slice 4, encoding has been performed with the same method as slice 2, so the slice 4 processing unit 553 can correctly decode the encoded data of slice 4 by decoding with the same method as with the slice 2 processing unit 253.

First, decoding processing of the encoded data of slice 1 by the slice 1 processing unit 252, and decoding processing of the encoded data of slice 3 by the slice 3 processing unit 552, are started. The decoding processing of the topmost macroblock line in slice 2 by the slice 2 processing unit 253 is started after waiting for the decoding processing results of the bottommost macroblock line of slice 1 (referred to as peripheral macroblock).

In the same way, the decoding processing of the topmost macroblock line in slice 4 by the slice 4 processing unit 553 is started after waiting for the decoding processing results of the bottommost macroblock line of slice 3 (referred to as peripheral macroblock).

That is to say, the lossless decoding unit 202 of the image decoding device 200 divides an image before encoded which corresponds to the encoded data to be decoded, into multiple regions arrayed vertically. The lossless decoding unit 202 then decodes encoded data corresponding to even-numbered regions from the top in the order from the top macroblock line toward the bottom, as with the conventional, and references the macroblock one to the left and the macroblock one above the macroblock to be processed, as peripheral macroblocks.

On the other hand, the lossless decoding unit 202 decodes encoded data corresponding to odd-numbered regions from the top in the order from the bottom macroblock line toward the top, opposite the conventional, and references the macroblock one to the left and the macroblock one below the macroblock to be processed, as peripheral macroblocks.

Further, at the point that decoding encoded data corresponding to the bottommost macroblock line of an odd-numbered region from the top has ended, the lossless decoding unit 202 starts decoding processing for encoded data of the region one below (even-numbered from the top).

Also, at this time, the lossless decoding unit 202 references the bottommost macroblock line in an odd-numbered region from the top and performs decoding processing regarding the encoded data corresponding to the topmost macroblock line of the region one below (even-numbered from the top).

Note that an arrangement may be made where the image encoding device 100 and image decoding device 200 each have multiple slice processing units to begin with, and slice processing units of a number the same as the number of entropy slices are operated. That is to say, the number of entropy slices can be changed in increments of images, increments of sequences, increments of contents, and so forth. In this case, the image encoding device 100 notifies the image decoding device 200 of the number of entropy slices employed for the encoding processing. The image decoding device 200 performs decoding processing based on this information, and thus can correctly decode the encoded data which the image encoding device 100 has generated.

[Macroblocks]

While the size of the macroblocks may be 16×16 or smaller, the size may be greater than 16×16.

Figure 25:
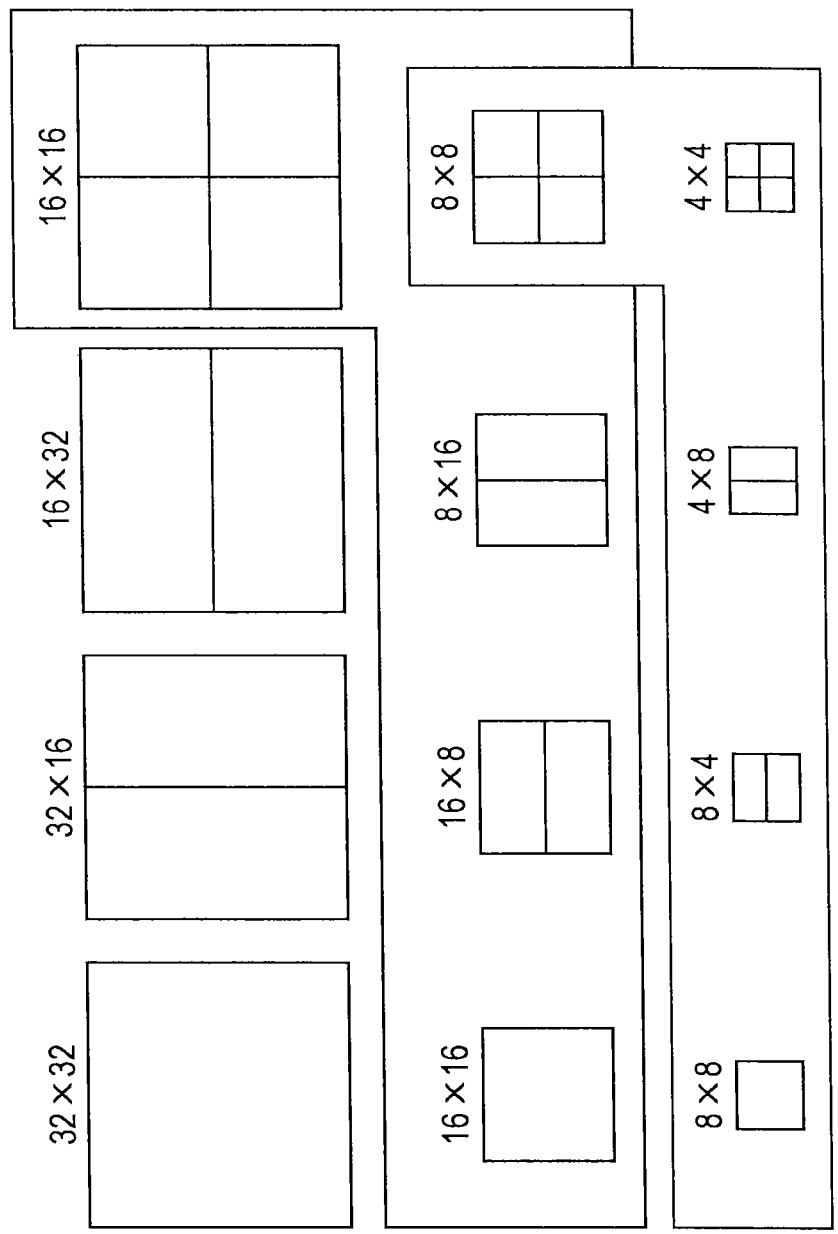
FIG. 25 is a diagram illustrating another example of macroblocks.

The present technology can be applied to various sizes of macroblocks such as shown in FIG. 25, for example. For example, the present technology can be applied to not only macroblocks such as normal 16×16 pixels, but also to extended macroblocks such as 32×32 pixels (extended macroblock).

In FIG. 25, macroblocks made up of 32×32 pixels divided into blocks (partitions) of 32×32 pixels, 32×16 pixels, 16×32 pixels, and 16×16 pixels are shown from the left in order on the upper tier. Also, blocks made up of 16×16 pixels divided into blocks of 16×16 pixels, 16×8 pixels, 8×16 pixels, and 8×8 pixels are shown from the left in order on the middle tier. Also, blocks made up of 8×8 pixels divided into blocks of 8×8 pixels, 8×4 pixels, 4×8 pixels, and 4×4 pixels are shown from the left in order on the lower tier.

In other words, the macroblocks of 32×32 pixels may be processed with blocks of 32×32 pixels, 32×16 pixels, 16×32 pixels, and 16×16 pixels shown on the upper tier.

The blocks of 16×16 pixels shown on the right side on the upper tier may be processed with blocks of 16×16 pixels, 16×8 pixels, 8×16 pixels, and 8×8 pixels shown on the middle tier in the same way as with the H.264/AVC format.

The block of 8×8 pixels shown on the right side on the middle tier may be processed with blocks of 8×8 pixels, 8×4 pixels, 4×8 pixels, and 4×4 pixels shown on the lower tier in the same way as with the H.264/AVC format.

These blocks can be classified into the following three hierarchical levels. That is, we will refer to the blocks of 32×32 pixels, 32×16 pixels and 16×32 pixels, shown on the upper tier in FIG. 25, as a first hierarchical level. We will refer to the blocks of 16×16 pixels, shown to the right of the upper tier, and the blocks of 16×16 pixels, 16×8 pixels, and 8×16 pixels, shown in the middle tier, as a second hierarchical level. We will refer to the blocks of 8×8 pixels, shown to the right of the middle tier, and the blocks of 8×8 pixels, 8×4 pixels, 4×8 pixels, and 4×4 pixels shown in the lower tier, as a third hierarchical level.

By employing such a hierarchical structure, regarding a 16×16 pixel block or smaller, a greater block can be defined as a superset thereof while maintaining compatibility with the H.264/AVC format.

<4. Fourth Embodiment>

[Personal Computer]

The above-described series of processing may be executed by hardware, and may be executed by software. In this case, a configuration may be made as a personal computer such as shown in FIG. 26, for example.

Figure 26:
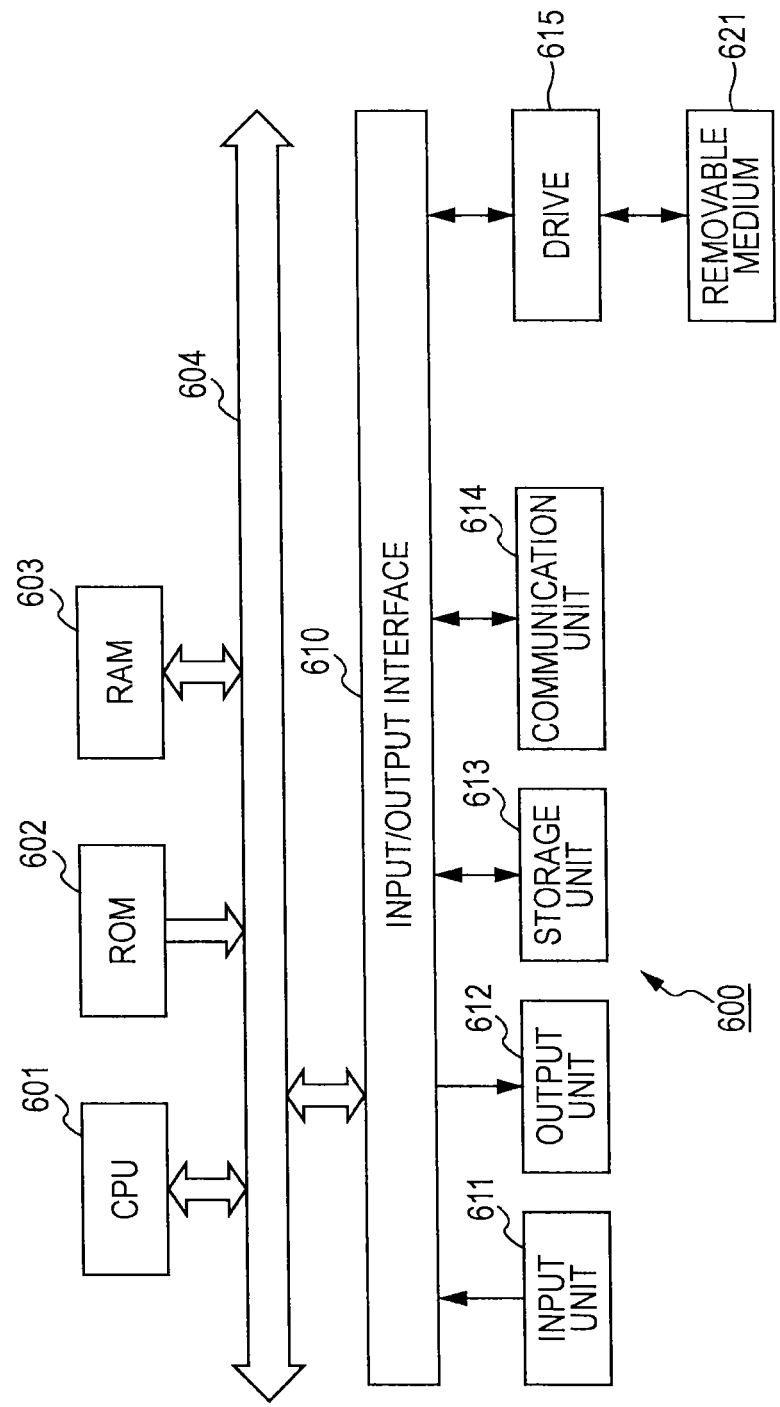
FIG. 26 is a block diagram illustrating a primary configuration example of a personal computer.

In FIG. 26, a CPU (Central Processing Unit) 601 of a personal computer 600 executes various types of processing following programs stored in ROM (Read Only Memory) 602 or programs loaded to RAM (Random Access Memory) 603 from a storage unit 613. The RAM 603 also stores data and so forth necessary for the CPU 601 to execute various types of processing, as appropriate.

The CPU 601, ROM 602, and RAM 603 are mutually connected by a bus 604. This bus 604 is also connected to an input/output interface 610.

Connected to the input/output interface 610 is an input unit 611 made up of a keyboard, a mouse, and so forth, an output unit 612 made up of a display such as a CRT (Cathode Ray Tube) or LCD (Liquid Crystal Display) or the like, a speaker, and so forth, a storage unit 613 made up of a hard disk and so forth, and a communication unit 614 made up of a modem and so forth. The communication unit 614 performs communication processing via networks including the Internet.

Also connected to the input/output interface 610 is a drive 615 as necessary, to which a removable medium 621 such as a magnetic disk, an optical disc, a magneto-optical disk, semiconductor memory, or the like, is mounted as appropriate, and computer programs read out therefrom are installed in the storage unit 613 as necessary.

In the event of executing the above-described series of processing by software, a program configuring the software is installed from a network or recording medium.

As shown in FIG. 26, for example, this recording medium is not only configured of a removable medium 621 made up of a magnetic disk (including flexible disk), optical disc (including CD-ROM (Compact Disc-Read Only Memory), DVD (Digital Versatile Disc), magneto-optical disc (including MD (Mini Disc)), or semiconductor memory or the like, in which programs are recorded and distributed so as to distribute programs to users separately from the device main unit, but also is configured of ROM 602, a hard disk included in the storage unit 613, and so forth, in which programs are recorded, distributed to users in a state of having been built into the device main unit beforehand.

Note that a program which the computer executes may be a program in which processing is performed in time sequence following the order described in the present Specification, or may be a program in which processing is performed in parallel, or at a necessary timing, such as when a call-up has been performed.

Also, with the present Specification, steps describing programs recorded in the recording medium includes processing performed in time sequence following the described order as a matter of course, and also processing executed in parallel or individually, without necessarily being processed in time sequence.

Also, with the present specification, the term system represents the entirety of devices configured of multiple devices (devices).

Also, a configuration which has been described above as one device (or processing unit) may be divided and configured as multiple devices (or processing units). Conversely, configurations which have been described above as multiple devices (or processing units) may be integrated and configured as a single device (or processing unit). Also, configurations other than those described above may be added to the configuration of the devices (or processing units), as a matter of course. Further, part of a configuration of a certain device (or processing unit) may be included in a configuration of another device (or another processing unit), as long as the configuration and operations of the overall system is substantially the same. That is to say, the embodiments of the present invention are not restricted to the above-described embodiments, and that various modifications may be made without departing from the essence of the present invention.

For example, the above-described image encoding device 100 and image decoding device 200 may be applied to various electronic devices. The following is a description of examples thereof.

<5. Fifth Embodiment>
[Television Receiver]

Figure 27:
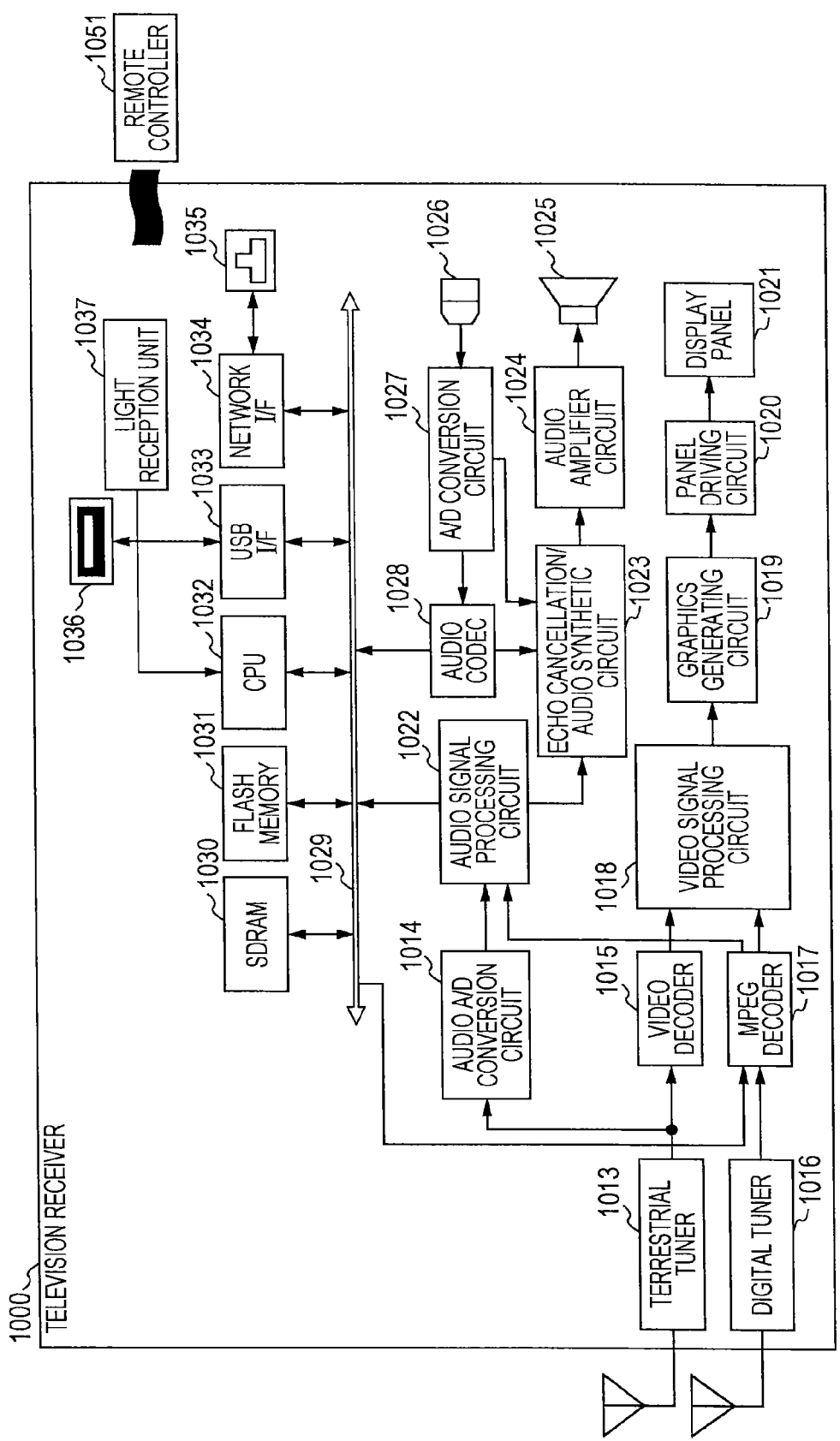
FIG. 27 is a block diagram illustrating a primary configuration example of a television receiver.

FIG. 27 is a block diagram illustrating a primary configuration example of a television receiver using the image decoding device 200.

A television receiver 1000 shown in FIG. 27 includes a terrestrial tuner 1013, a video decoder 1015, a video signal processing circuit 1018, a graphics generating circuit 1019, a panel driving circuit 1020, and a display panel 1021.

The terrestrial tuner 1013 receives the broadcast wave signals of a terrestrial analog broadcast via an antenna, demodulates, obtains video signals, and supplies these to the video decoder 1015. The video decoder 1015 subjects the video signals supplied from the terrestrial tuner 1013 to decoding processing, and supplies the obtained digital component signals to the video signal processing circuit 1018.

The video signal processing circuit 1018 subjects the video data supplied from the video decoder 1015 to predetermined processing such as noise removal or the like, and supplies the obtained video data to the graphics generating circuit 1019.

The graphics generating circuit 1019 generates the video data of a program to be displayed on a display panel 1021, or image data due to processing based on an application to be supplied via a network, or the like, and supplies the generated video data or image data to the panel driving circuit 1020. Also, the graphics generating circuit 1019 also performs processing such as supplying video data obtained by generating video data (graphics) for the user displaying a screen used for selection of an item or the like, and superimposing this on the video data of a program, to the panel driving circuit 1020 as appropriate.

The panel driving circuit 1020 drives the display panel 1021 based on the data supplied from the graphics generating circuit 1019 to display the video of a program, or the above-mentioned various screens on the display panel 1021.

The display panel 1021 is made up of an LCD (Liquid Crystal Display) and so forth, and displays the video of a program or the like in accordance with the control by the panel driving circuit 1020.

Also, the television receiver 1000 also includes an audio A/D (Analog/Digital) conversion circuit 1014, an audio signal processing circuit 1022, an echo cancellation/audio synthesizing circuit 1023, an audio amplifier circuit 1024, and a speaker 1025.

The terrestrial tuner 1013 demodulates the received broadcast wave signal, thereby obtaining not only a video signal but also an audio signal. The terrestrial tuner 1013 supplies the obtained audio signal to the audio A/D conversion circuit 1014.

The audio A/D conversion circuit 1014 subjects the audio signal supplied from the terrestrial tuner 1013 to A/D conversion processing, and supplies the obtained digital audio signal to the audio signal processing circuit 1022.

The audio signal processing circuit 1022 subjects the audio data supplied from the audio A/D conversion circuit 1014 to predetermined processing such as noise removal or the like, and supplies the obtained audio data to the echo cancellation/audio synthesizing circuit 1023.

The echo cancellation/audio synthesizing circuit 1023 supplies the audio data supplied from the audio signal processing circuit 1022 to the audio amplifier circuit 1024.

The audio amplifier circuit 1024 subjects the audio data supplied from the echo cancellation/audio synthesizing circuit 1023 to D/A conversion processing, subjects to amplifier processing to adjust to predetermined volume, and then outputs the audio from the speaker 1025.

Further, the television receiver 1000 also includes a digital tuner 1016, and an MPEG decoder 1017.

The digital tuner 1016 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 1017.

The MPEG decoder 1017 descrambles the scrambling given to the MPEG-TS supplied from the digital tuner 1016, and extracts a stream including the data of a program serving as a playing object (viewing object). The MPEG decoder 1017 decodes an audio packet making up the extracted stream, supplies the obtained audio data to the audio signal processing circuit 1022, and also decodes a video packet making up the stream, and supplies the obtained video data to the video signal processing circuit 1018. Also, the MPEG decoder 1017 supplies EPG (Electronic Program Guide) data extracted from the MPEG-TS to a CPU 1032 via an unshown path.

The television receiver 1000 uses the above-mentioned image decoding device 200 as the MPEG decoder 1017 for decoding video packets in this way. Note that the MPEG-TS transmitted from the broadcasting station or the like has been encoded by the image encoding device 100.

In the same way as with the image decoding device 200, the MPEG decoder 1017 decodes encoded data supplied from the image encoding device 100 for each entropy slice in parallel, and generates decoded image data. At this time, in the same way as with the image decoding device 200, the MPEG decoder 1017 divides the image before encoding, corresponding to the encoded data to be decoded, into vertically arrayed multiple (an even number) regions. The MPEG decoder 1017 then performs decoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the MPEG decoder 1017 performs decoding opposite the conventional manner, in the order from the bottom macroblock line toward the top, for the encoded data corresponding to odd-numbered regions from the top, referencing as peripheral macroblocks the macroblock one to the left and one below the macroblock to be processed.

Further, at the point that decoding of encoded data corresponding to the bottommost macroblock line of the odd-numbered regions from the top ending, the MPEG decoder 1017 starts decoding processing for the encoded data of the region one thereunder (even-numbered from the top).

Also, at this time, the MPEG decoder 1017 references the bottommost macroblock line of the even-numbered regions from the top to perform decoding processing for the encoded data corresponding to the topmost macroblock line of the region one thereunder (even-numbered from the top).

Accordingly, the MPEG decoder 1017 can realize high speed image encoding while suppressing deterioration in encoding efficiency.

The video data supplied from the MPEG decoder 1017 is, in the same way as with the case of the video data supplied from the video decoder 1015, subjected to predetermined processing at the video signal processing circuit 1018, superimposed on the generated video data and so forth at the graphics generating circuit 1019 as appropriate, supplied to the display panel 1021 via the panel driving circuit 1020, and the image thereof is displayed thereon.

The audio data supplied from the MPEG decoder 1017 is, in the same way as with the case of the audio data supplied from the audio A/D conversion circuit 1014, subjected to predetermined processing at the audio signal processing circuit 1022, supplied to the audio amplifier circuit 1024 via the echo cancellation/audio synthesizing circuit 1023, and subjected to D/A conversion processing and amplifier processing. As a result thereof, the audio adjusted in predetermined volume is output from the speaker 1025.

Also, the television receiver 1000 also includes a microphone 1026, and an A/D conversion circuit 1027.

The A/D conversion circuit 1027 receives the user's audio signals collected by the microphone 1026 provided to the television receiver 1000 serving as for audio conversation, subjects the received audio signal to A/D conversion processing, and supplies the obtained digital audio data to the echo cancellation/audio synthesizing circuit 1023.

In the event that the user (user A)'s audio data of the television receiver 1000 has been supplied from the A/D conversion circuit 1027, the echo cancellation/audio synthesizing circuit 1023 perform echo cancellation with the user (user A)'s audio data taken as a object, and outputs audio data obtained by synthesizing the user A's audio data and other audio data, or the like from the speaker 1025 via the audio amplifier circuit 1024.

Further, the television receiver 1000 also includes an audio codec 1028, an internal bus 1029, SDRAM (Synchronous Dynamic Random Access Memory) 1030, flash memory 1031, a CPU 1032, a USB (Universal Serial Bus) I/F 1033, and a network I/F 1034.

The A/D conversion circuit 1027 receives the user's audio signal collected by the microphone 1026 provided to the television receiver 1000 serving as for audio conversation, subjects the received audio signal to A/D conversion processing, and supplies the obtained digital audio data to the audio codec 1028.

The audio codec 1028 converts the audio data supplied from the A/D conversion circuit 1027 into the data of a predetermined format for transmission via a network, and supplies to the network I/F 1034 via the internal bus 1029.

The network I/F 1034 is connected to the network via a cable mounted on a network terminal 1035. The network I/F 1034 transmits the audio data supplied from the audio codec 1028 to another device connected to the network thereof, for example. Also, the network I/F 1034 receives, via the network terminal 1035, the audio data transmitted from another device connected thereto via the network, and supplies this to the audio codec 1028 via the internal bus 1029, for example.

The audio codec 1028 converts the audio data supplied from the network I/F 1034 into the data of a predetermined format, and supplies this to the echo cancellation/audio synthesizing circuit 1023.

The echo cancellation/audio synthesizing circuit 1023 performs echo cancellation with the audio data supplied from the audio codec 1028 taken as a object, and outputs the data of audio obtained by synthesizing the audio data and other audio data, or the like, from the speaker 1025 via the audio amplifier circuit 1024.

The SDRAM 1030 stores various types of data necessary for the CPU 1032 performing processing.

The flash memory 1031 stores a program to be executed by the CPU 1032. The program stored in the flash memory 1031 is read out by the CPU 1032 at predetermined timing such as when activating the television receiver 1000, or the like. EPG data obtained via a digital broadcast, data obtained from a predetermined server via the network, and so forth are also stored in the flash memory 1031.

For example, MPEG-TS including the content data obtained from a predetermined server via the network by the control of the CPU 1032 is stored in the flash memory 1031. The flash memory 1031 supplies the MPEG-TS thereof to the MPEG decoder 1017 via the internal bus 1029 by the control of the CPU 1032, for example.

The MPEG decoder 1017 processes the MPEG-TS thereof in the same way as with the case of the MPEG-TS supplied from the digital tuner 1016. In this way, the television receiver 1000 receives the content data made up of video, audio, and so forth via the network, decodes using the MPEG decoder 1017, whereby video thereof can be displayed, and audio thereof can be output.

Also, the television receiver 1000 also includes a light reception unit 1037 for receiving the infrared signal transmitted from a remote controller 1051.

The light reception unit 1037 receives infrared rays from the remote controller 1051, and outputs a control code representing the content of the user's operation obtained by demodulation, to the CPU 1032.

The CPU 1032 executes the program stored in the flash memory 1031 to control the entire operation of the television receiver 1000 according to the control code supplied from the light reception unit 1037, and so forth. The CPU 1032, and the units of the television receiver 1000 are connected via an unshown path.

The USB I/F 1033 performs transmission/reception of data as to an external device of the television receiver 1000 which is connected via a USB cable mounted on a USB terminal 1036. The network I/F 1034 connects to the network via a cable mounted on the network terminal 1035, also performs transmission/reception of data other than audio data as to various devices connected to the network.

The television receiver 1000 can correctly decode encoded data encoded at high speed, while suppressing deterioration in encoding efficiency, by using the image decoding device 200 as the MPEG decoder 1017. As a result, the television receiver 1000 can further improve encoding efficiency of broadcast signals received via an antenna or content data obtained via a network, and can realize real-time processing with lower costs.

<6. Sixth Embodiment>

[Cellular Telephone]

Figure 28:
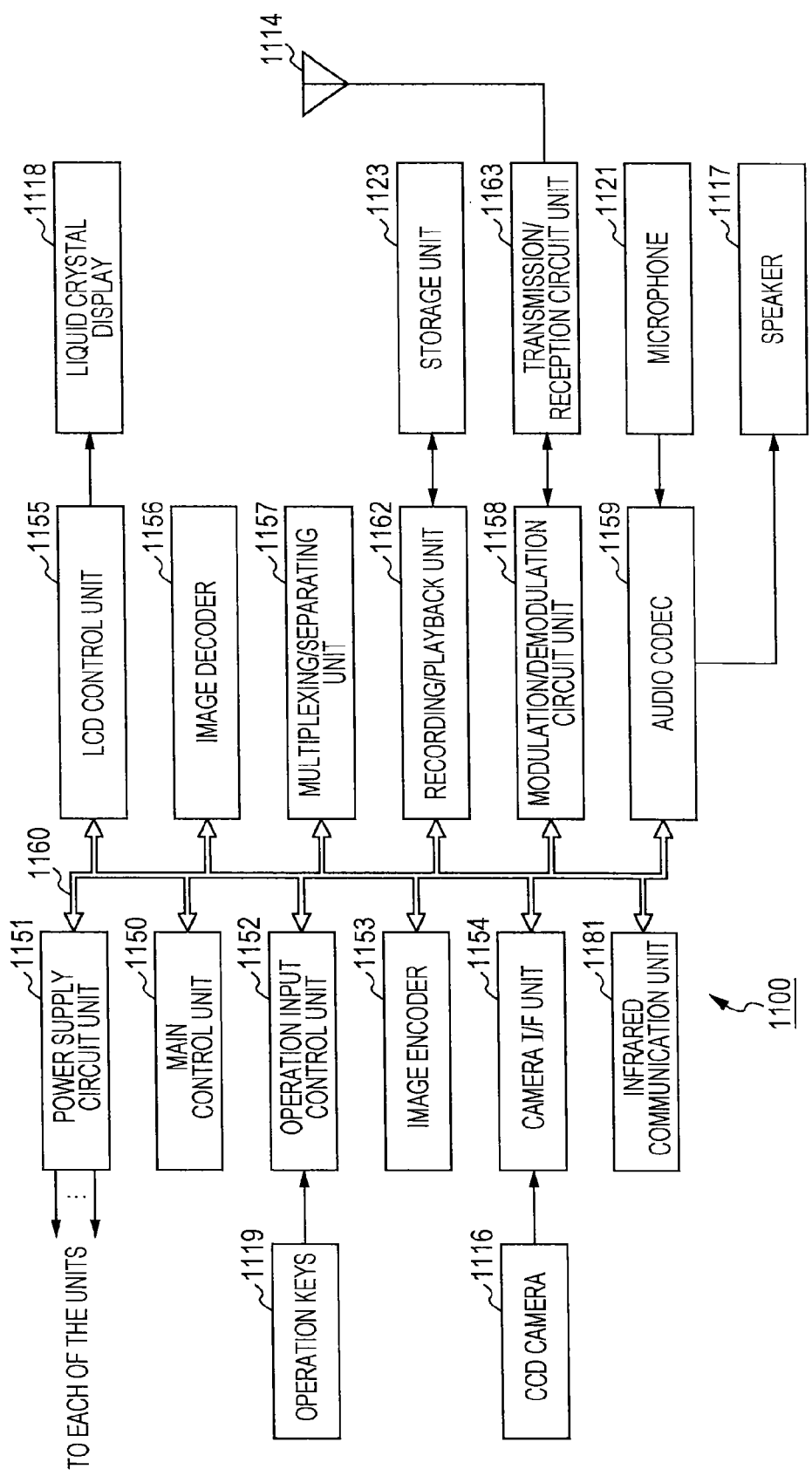
FIG. 28 is a block diagram illustrating a primary configuration example of a cellular phone.

FIG. 28 is a block diagram illustrating a primary configuration example of a cellular telephone using the image encoding device 100 and image decoding device 200.

A cellular telephone 1100 shown in FIG. 28 includes a main control unit 1150 configured so as to integrally control the units, a power supply circuit unit 1151, an operation input control unit 1152, an image encoder 1153, a camera I/F unit 1154, an LCD control unit 1155, an image decoder 1156, a multiplexing/separating unit 1157, a recording/playing unit 1162, a modulation/demodulation circuit unit 1158, and an audio codec 1159. These are mutually connected via a bus 1160.

Also, the cellular telephone 1100 includes operation keys 1119, a CCD (Charge Coupled Devices) camera 1116, a liquid crystal display 1118, a storage unit 1123, a transmission/reception circuit unit 1163, an antenna 1114, a microphone (MIC) 1121, and a speaker 1117.

Upon a call end and power key being turned on by the user's operation, the power supply circuit unit 1151 activates the cellular telephone 1100 in an operational state by supplying power to the units from a battery pack.

The cellular telephone 1100 performs various operations, such as transmission/reception of an audio signal, transmission/reception of an e-mail and image data, image shooting, data recoding, and so forth, in various modes such as a voice call mode, a data communication mode, and so forth, based on the control of the main control unit 1150 made up of a CPU, ROM, RAM, and so forth.

For example, in the voice call mode, the cellular telephone 1100 converts the audio signal collected by the microphone (mike) 1121 into digital audio data by the audio codec 1159, subjects this to spectrum spread processing at the modulation/demodulation circuit unit 1158, and subjects this to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (audio signal) transmitted to the base station is supplied to the cellular telephone of the other party via the public telephone network.

Also, for example, in the voice call mode, the cellular telephone 1100 amplifies the reception signal received at the antenna 1114, at the transmission/reception circuit unit 1163, further subjects to frequency conversion processing and analog/digital conversion processing, subjects to spectrum inverse spread processing at the modulation/demodulation circuit unit 1158, and converts into an analog audio signal by the audio codec 1159. The cellular telephone 1100 outputs the converted and obtained analog audio signal thereof from the speaker 1117.

Further, for example, in the event of transmitting an e-mail in the data communication mode, the cellular telephone 1100 accepts the text data of the e-mail input by the operation of the operation keys 1119 at the operation input control unit 1152. The cellular telephone 1100 processes the text data thereof at the main control unit 1150, and displays on the liquid crystal display 1118 via the LCD control unit 1155 as an image.

Also, the cellular telephone 1100 generates e-mail data at the main control unit 1150 based on the text data accepted by the operation input control unit 1152, the user's instructions, and so forth. The cellular telephone 1100 subjects the e-mail data thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (e-mail) transmitted to the base station is supplied to a predetermined destination via the network, mail server, and so forth.

Also, for example, in the event of receiving an e-mail in the data communication mode, the cellular telephone 1100 receives the signal transmitted from the base station via the antenna 1114 with the transmission/reception circuit unit 1163, amplifies, and further subjects to frequency conversion processing and analog/digital conversion processing. The cellular telephone 1100 subjects the reception signal thereof to spectrum inverse spread processing at the modulation/demodulation circuit unit 1158 to restore the original e-mail data. The cellular telephone 1100 displays the restored e-mail data on the liquid crystal display 1118 via the LCD control unit 1155.

Note that the cellular telephone 1100 may record (store) the received e-mail data in the storage unit 1123 via the recording/playing unit 1162.

This storage unit 1123 is an optional rewritable recording medium. The storage unit 1123 may be, for example, semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 1123 may be other than these.

Further, for example, in the event of transmitting image data in the data communication mode, the cellular telephone 1100 generates image data by imaging at the CCD camera 1116. The CCD camera 1116 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 1116 performs encoding of the image data at the image encoder 1153 via the camera I/F unit 1154, and converts into encoded image data.

The cellular telephone 1100 employs the above-mentioned image encoding device 100 as the image encoder 1153 for performing such processing. In the same way as with the image encoding device 100, the image encoder 1153 divides the image to be encoded into vertically arrayed multiple (an even number) regions. The image encoder 1153 then performs encoding in the conventional manner in the order from the top macroblock line toward the bottom corresponding to even-numbered regions from the top, referencing as peripheral macroblocks the macroblock one to the left and one above the macroblock to be processed.

Conversely, the image encoder 1153 performs encoding opposite the conventional manner, in the order from the bottom macroblock line toward the top, for odd-numbered regions from the top, referencing as peripheral macroblocks the macroblock one to the left and one below the macroblock to be processed.

Further, at the point that encoding has ended for the bottommost macroblock line of the odd-numbered regions from the top ending, the image encoder 1153 starts decoding processing for the encoded data of the region one thereunder (even-numbered from the top).

Also, at this time, the image encoder 1153 references the bottommost macroblock line of the even-numbered regions from the top to perform encoding processing for the topmost macroblock line of the region one thereunder (even-numbered from the top).

Accordingly, the image encoder 1153 can realize high speed image encoding while suppressing deterioration in encoding efficiency.

Note that, at this time simultaneously, the cellular telephone 1100 converts the audio collected at the microphone (mike) 1121, while shooting with the CCD camera 1116, from analog to digital at the audio codec 1159, and further encodes this.

The cellular telephone 1100 multiplexes the encoded image data supplied from the image encoder 1153, and the digital audio data supplied from the audio codec 1159 at the multiplexing/separating unit 1157 using a predetermined method. The cellular telephone 1100 subjects the multiplexed data obtained as a result thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (image data) transmitted to the base station is supplied to the other party via the network or the like.

Note that in the event that image data is not transmitted, the cellular telephone 1100 may also display the image data generated at the CCD camera 1116 on the liquid crystal display 1118 via the LCD control unit 1155 instead of the image encoder 1153.

Also, for example, in the event of receiving the data of a moving image file linked to a simple website or the like in the data communication mode, the cellular telephone 1100 receives the signal transmitted from the base station at the transmission/reception circuit unit 1163 via the antenna 1114, amplifies, and further subjects to frequency conversion processing and analog/digital conversion processing. The cellular telephone 1100 subjects the received signal to spectrum inverse spread processing at the modulation/demodulation circuit unit 1158 to restore the original multiplexed data. The cellular telephone 1100 separates the multiplexed data thereof at the multiplexing/separating unit 1157 into encoded image data and audio data.

The cellular telephone 1100 decodes the encoded image data at the image decoder 1156, thereby generating playing moving image data, and displays this on the liquid crystal display 1118 via the LCD control unit 1155. Thus, moving image data included in a moving image file linked to a simple website is displayed on the liquid crystal display 1118, for example.

The cellular telephone 1100 employs the above-mentioned image decoding device 200 as the image decoder 1156 for performing such processing. That is to say, in the same way as with the image decoding device 200, the image decoder 1156 decodes encoded data supplied from the image encoding device 100 for each entropy slice in parallel, and generates decoded image data. At this time, in the same way as with the image decoding device 200, the image decoder 1156 divides the image before encoding, corresponding to the encoded data to be decoded, into vertically arrayed multiple (an even number) regions. The image decoder 1156 then performs decoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the image decoder 1156 performs decoding opposite the conventional manner, in the order from the bottom macroblock line toward the top, for the encoded data corresponding to odd-numbered regions from the top, referencing as peripheral macroblocks the macroblock one to the left and one below the macroblock to be processed.

Further, at the point that decoding of encoded data corresponding to the bottommost macroblock line of the odd-numbered regions from the top ending, the image decoder 1156 starts decoding processing for the encoded data of the region one thereunder (even-numbered from the top).

Also, at this time, the image decoder 1156 references the bottommost macroblock line of the odd-numbered regions from the top to perform decoding processing for the encoded data corresponding to the topmost macroblock line of the region one thereunder (even-numbered from the top).

Accordingly, the image decoder 1156 can realize high speed image encoding while suppressing deterioration in encoding efficiency.

At this time, simultaneously, the cellular telephone 1100 converts the digital audio data into an analog audio signal at the audio codec 1159, and outputs this from the speaker 1117. Thus, audio data included in a moving image file linked to a simple website is played, for example.

Note that, in the same way as with the case of e-mail, the cellular telephone 1100 may record (store) the received data linked to a simple website or the like in the storage unit 1123 via the recording/playing unit 1162.

Also, the cellular telephone 1100 analyzes the imaged two-dimensional code obtained by the CCD camera 1116 at the main control unit 1150, whereby information recorded in the two-dimensional code can be obtained.

Further, the cellular telephone 1100 can communicate with an external device at the infrared communication unit 1181 using infrared rays.

The cellular telephone 1100 employs the image encoding device 100 as the image encoder 1153, whereby deterioration of encoding efficiency due to high speed of image encoding can be suppressed at the time of encoding and transmitting image data generated at the CCD camera 1116, for example, thereby realizing real-time processing at lower costs.

Also, the cellular telephone 1100 employs the image decoding device 200 as the image decoder 1156, and thus can correctly decode data of a moving image file linked to at a simple website or the like (encoded data encoded at high speed while suppressing deterioration in encoding efficiency), for example, thereby realizing real-time processing at lower costs.

Note that description has been made so far wherein the cellular telephone 1100 employs the CCD camera 1116, but the cellular telephone 1100 may employ an image sensor (CMOS image sensor) using CMOS (Complementary Metal Oxide Semiconductor) instead of this CCD camera 1116. In this case as well, the cellular telephone 1100 can image a subject and generate the image data of an image of the subject in the same way as with the case of employing the CCD camera 1116.

Also, description has been made so far regarding the cellular telephone 1100, but the image encoding device 100 and the image decoding device 200 may be applied to any kind of device in the same way as with the case of the cellular telephone 1100 as long as it is a device having the same imaging function and communication function as those of the cellular telephone 1100, for example, such as a PDA (Personal Digital Assistants), smart phone, UMPC (Ultra Mobile Personal Computer), net book, notebook-sized personal computer, or the like.

<7. Seventh Embodiment>
[Hard Disk Recorder]

Figure 29:
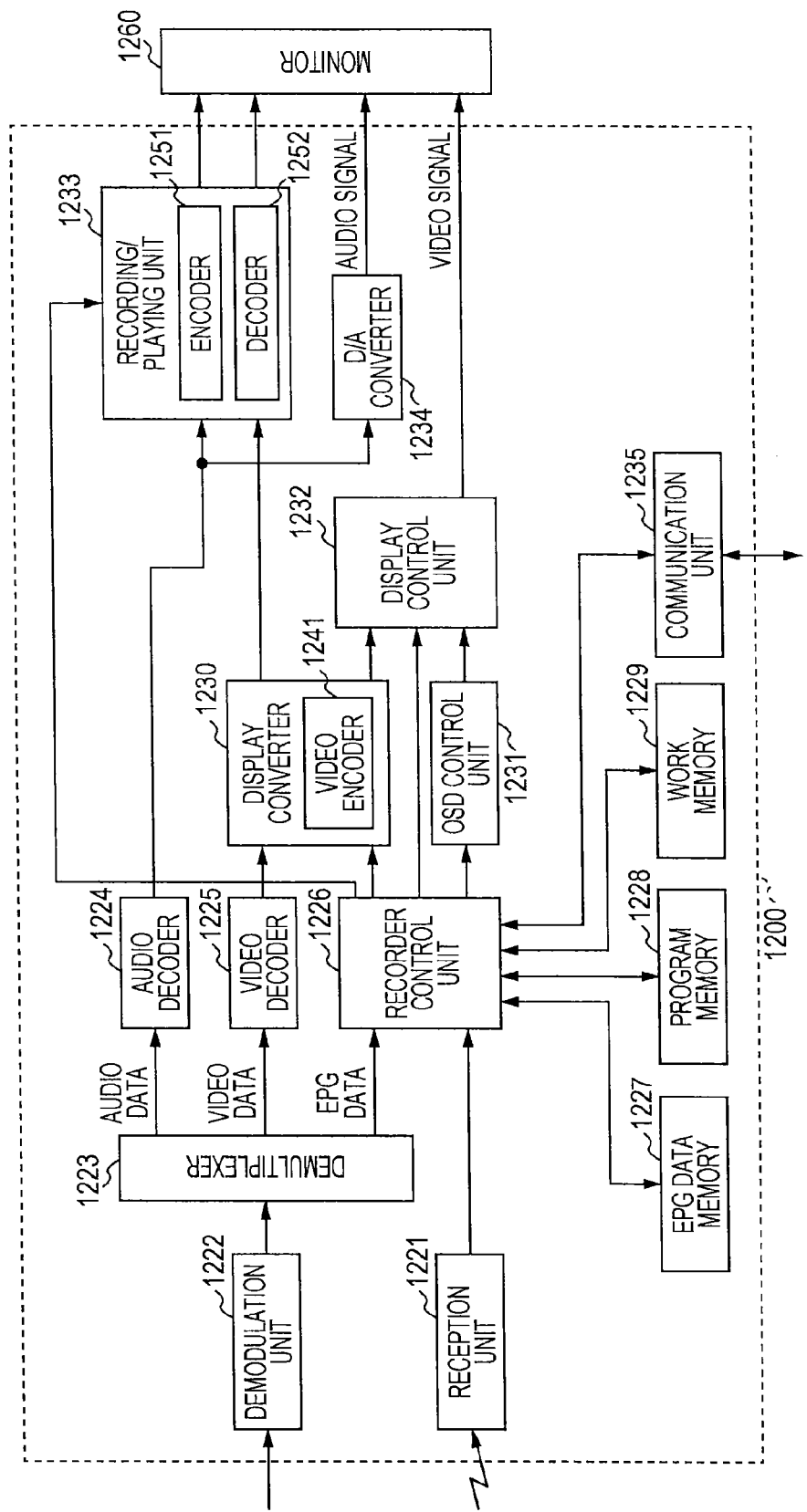
FIG. 29 is a block diagram illustrating a primary configuration example of a hard disk recorder.

FIG. 29 is a block diagram illustrating a primary configuration example of a hard disk recorder which employs the image encoding device 100 and image decoding device 200 to which the present invention has been applied.

A hard disk recorder (HDD recorder) 1200 shown in FIG. 29 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 1200 can extract audio data and video data from broadcast wave signals, decode these as appropriate, and store in the built-in hard disk, for example. Also, the hard disk recorder 1200 can also obtain audio data and video data from another device via the network, decode these as appropriate, and store in the built-in hard disk, for example.

Further, the hard disk recorder 1200 can decode audio data and video data recorded in the built-in hard disk, supply this to a monitor 1260, display an image thereof on the screen of the monitor 1260, and output audio thereof from the speaker of the monitor 1260, for example. Also, the hard disk recorder 1200 can decode audio data and video data extracted from broadcast signals obtained via a tuner, or audio data and video data obtained from another device via a network, supply this to the monitor 1260, display an image thereof on the screen of the monitor 1260, and output audio thereof from the speaker of the monitor 1260, for example.

Of course, operations other than these may be performed.

As shown in FIG. 29, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes EPG data memory 1227, program memory 1228, work memory 1229, a display converter 1230, an OSD (On Screen Display) control unit 1231, a display control unit 1232, a recording/playing unit 1233, a D/A converter 1234, and a communication unit 1235.

Also, the display converter 1230 includes a video encoder 1241. The recording/playing unit 1233 includes an encoder 1251 and a decoder 1252.

The reception unit 1221 receives the infrared signal from the remote controller (not shown), converts into an electrical signal, and outputs to the recorder control unit 1226. The recorder control unit 1226 is configured of, for example, a microprocessor and so forth, and executes various types of processing in accordance with the program stored in the program memory 1228. At this time, the recorder control unit 1226 uses the work memory 1229 according to need.

The communication unit 1235, which is connected to the network, performs communication processing with another device via the network. For example, the communication unit 1235 is controlled by the recorder control unit 1226 to communicate with a tuner (not shown), and to principally output a channel selection control signal to the tuner.

The demodulation unit 1222 demodulates the signal supplied from the tuner, and outputs to the demultiplexer 1223. The demultiplexer 1223 separates the data supplied from the demodulation unit 1222 into audio data, video data, and EPG data, and outputs to the audio decoder 1224, video decoder 1225, and recorder control unit 1226, respectively.

The audio decoder 1224 decodes the input audio data, and outputs to the recording/playing unit 1233. The video decoder 1225 decodes the input video data, and outputs to the display converter 1230. The recorder control unit 1226 supplies the input EPG data to the EPG data memory 1227 for storing.

The display converter 1230 encodes the video data supplied from the video decoder 1225 or recorder control unit 1226 into, for example, the video data conforming to the NTSC (National Television Standards Committee) format using the video encoder 1241, and outputs to the recording/playing unit 1233. Also, the display converter 1230 converts the size of the screen of the video data supplied from the video decoder 1225 or recorder control unit 1226 into the size corresponding to the size of the monitor 1260, converts into the video data conforming to the NTSC format using the video encoder 1241, converts into an analog signal, and outputs to the display control unit 1232.

The display control unit 1232 superimposes, under the control of the recorder control unit 1226, the OSD signal output from the OSD (On Screen Display) control unit 1231 on the video signal input from the display converter 1230, and outputs to the display of the monitor 1260 for display.

Also, the audio data output from the audio decoder 1224 has been converted into an analog signal using the D/A converter 1234, and supplied to the monitor 1260. The monitor 1260 outputs this audio signal from a built-in speaker.

The recording/playing unit 1233 includes a hard disk as a recording medium in which video data, audio data, and so forth are recorded.

The recording/playing unit 1233 encodes the audio data supplied from the audio decoder 1224 by the encoder 1251, for example. Also, the recording/playing unit 1233 encodes the video data supplied from the video encoder 1241 of the display converter 1230 by the encoder 1251. The recording/playing unit 1233 synthesizes the encoded data of the audio data thereof, and the encoded data of the video data thereof using the multiplexer. The recording/playing unit 1233 amplifies the synthesized data by channel coding, and writes the data thereof in the hard disk via a recording head.

The recording/playing unit 1233 plays the data recorded in the hard disk via a playing head, amplifies, and separates into audio data and video data using the demultiplexer. The recording/playing unit 1233 decodes the audio data and video data by the decoder 1252. The recording/playing unit 1233 converts the decoded audio data from digital to analog, and outputs to the speaker of the monitor 1260. Also, the recording/playing unit 1233 converts the decoded video data from digital to analog, and outputs to the display of the monitor 1260.

The recorder control unit 1226 reads out the latest EPG data from the EPG data memory 1227 based on the user's instructions indicated by the infrared signal from the remote controller which is received via the reception unit 1221, and supplies this to the OSD control unit 1231. The OSD control unit 1231 generates image data corresponding to the input EPG data, and outputs to the display control unit 1232. The display control unit 1232 outputs the video data input from the OSD control unit 1231 to the display of the monitor 1260 for display. Thus, EPG (Electronic Program Guide) is displayed on the display of the monitor 1260.

Also, the hard disk recorder 1200 can obtain various types of data such as video data, audio data, EPG data, and so forth supplied from another device via the network such as the Internet or the like.

The communication unit 1235 is controlled by the recorder control unit 1226 to obtain encoded data such as video data, audio data, EPG data, and so forth transmitted from another device via the network, and to supply this to the recorder control unit 1226. The recorder control unit 1226 supplies the encoded data of the obtained video data and audio data to the recording/playing unit 1233, and stores in the hard disk, for example. At this time, the recorder control unit 1226 and recording/playing unit 1233 may perform processing such as re-encoding or the like according to need.

Also, the recorder control unit 1226 decodes the encoded data of the obtained video data and audio data, and supplies the obtained video data to the display converter 1230. The display converter 1230 processes, in the same way as the video data supplied from the video decoder 1225, the video data supplied from the recorder control unit 1226, supplies to the monitor 1260 via the display control unit 1232 for displaying an image thereof.

Alternatively, an arrangement may be made wherein in accordance with this image display, the recorder control unit 1226 supplies the decoded audio data to the monitor 1260 via the D/A converter 1234, and outputs audio thereof from the speaker.

Further, the recorder control unit 1226 decodes the encoded data of the obtained EPG data, and supplies the decoded EPG data to the EPG data memory 1227.

The hard disk recorder 1200 thus configured employs the image decoding device 200 as the video decoder 1225, decoder 1252, and decoder housed in the recorder control unit 1226. In the same way as with the image decoding device 200, the video decoder 1225, decoder 1252, and decoder housed in the recorder control unit 1226 decode encoded data supplied from the image encoding device 100 for each entropy slice in parallel, and generates decoded image data. At this time, in the same way as with the image decoding device 200, the video decoder 1225, decoder 1252, and decoder housed in the recorder control unit 1226 divides the image before encoding, corresponding to the encoded data to be decoded, into vertically arrayed multiple (an even number) regions. The video decoder 1225, decoder 1252, and decoder housed in the recorder control unit 1226 then performs decoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the video decoder 1225, decoder 1252, and decoder housed in the recorder control unit 1226 performs decoding opposite the conventional manner, in the order from the bottom macroblock line toward the top, for the encoded data corresponding to odd-numbered regions from the top, referencing as peripheral macroblocks the macroblock one to the left and one below the macroblock to be processed.

Further, at the point that decoding of encoded data corresponding to the bottommost macroblock line of the odd-numbered regions from the top ending, the video decoder 1225, decoder 1252, and decoder housed in the recorder control unit 1226 starts decoding processing for the encoded data of the region one thereunder (even-numbered from the top).

Also, at this time, the video decoder 1225, decoder 1252, and decoder housed in the recorder control unit 1226 references the bottommost macroblock line of the odd-numbered regions from the top to perform decoding processing for the encoded data corresponding to the topmost macroblock line of the region one thereunder (even-numbered from the top).

Accordingly, the video decoder 1225, decoder 1252, and decoder housed in the recorder control unit 1226 can realize high speed image encoding while suppressing deterioration in encoding efficiency.

Accordingly, the hard disk recorder 1200 can correctly decode video data which the tuner or communication unit 1235 receives (encoded data encoded at high speed while suppressing deterioration in encoding efficiency), and video data which the recording/playing unit 1233 plays (encoded data encoded at high speed while suppressing deterioration in encoding efficiency), for example, thereby realizing real-time processing with lower costs.

Also, the hard disk recorder 1200 employs the image encoding device 100 as the encoder 1251. In the same way as with the image encoding device 100, the image encoder 1251 divides the image to be encoded into vertically arrayed multiple (an even number) regions. The image encoder 1251 then performs encoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the image encoder 1251 performs encoding opposite the conventional manner, in the order from the bottom macroblock line toward the top, for odd-numbered regions from the top, referencing as peripheral macroblocks the macroblock one to the left and one below the macroblock to be processed.

Further, at the point that encoding has ended for the bottommost macroblock line of the odd-numbered regions from the top ending, the image encoder 1251 starts decoding processing for the encoded data of the region one thereunder (even-numbered from the top).

Also, at this time, the image encoder 1251 references the bottommost macroblock line of the odd-numbered regions from the top to perform encoding processing for the topmost macroblock line of the region one thereunder (even-numbered from the top).

Accordingly, the image encoder 1251 can realize high speed image encoding while suppressing deterioration in encoding efficiency.

Accordingly, the hard disk recorder 1200 can suppress deterioration in encoding efficiency due to high speed image encoding at the time of generating encoded data to be recorded in the hard disk. As a result the cellular phone 1100 can realize real-time processing with lower costs.

Note that description has been made so far regarding the hard disk recorder 1200 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 100 and image decoding device 200 can be applied thereto in the same way as with the case of the above hard disk recorder 1200.

<8. Eighth Embodiment>

[Camera]

Figure 30:
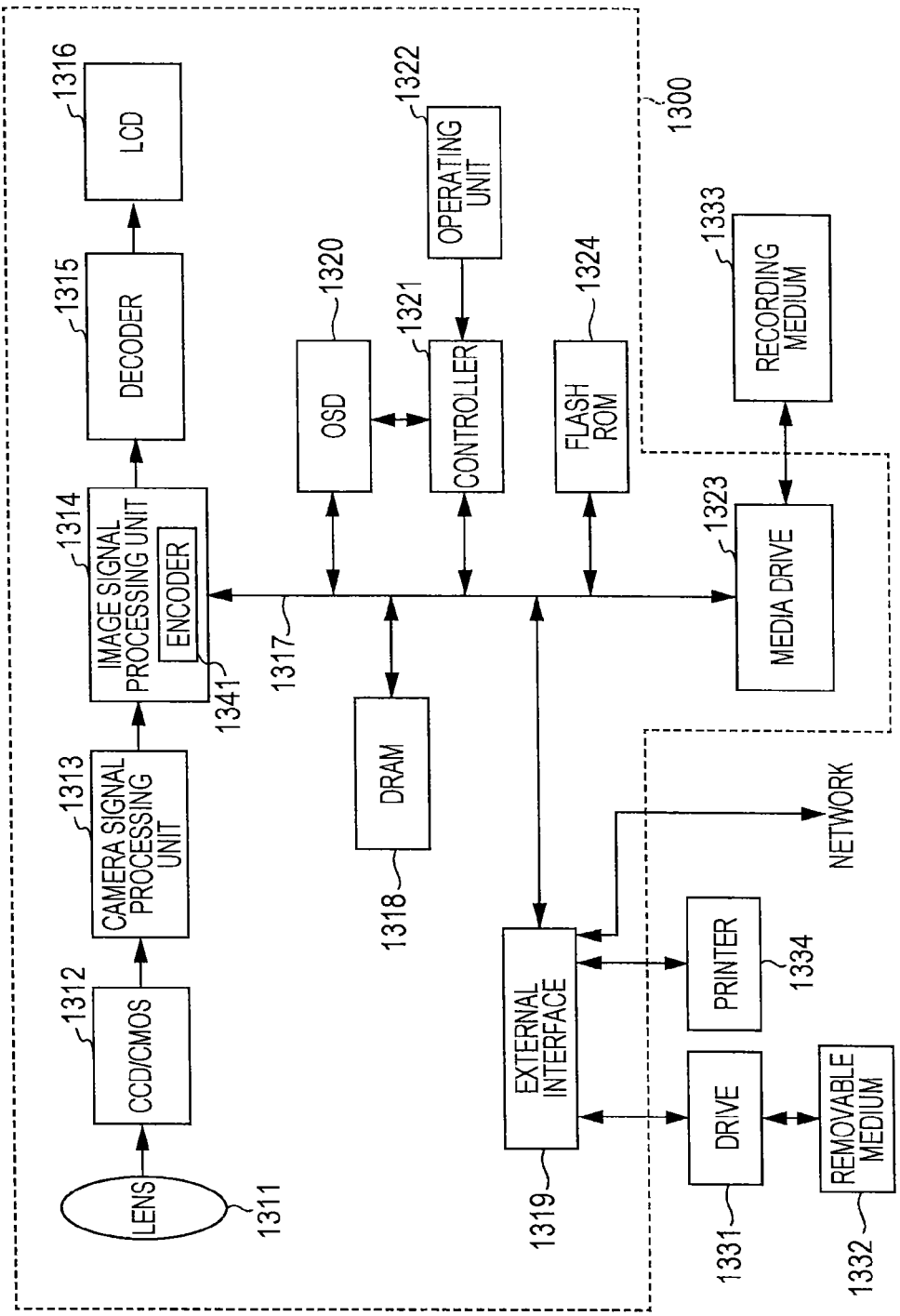
FIG. 30 is a block diagram illustrating a primary configuration example of a camera.

FIG. 30 is a block diagram illustrating a primary configuration example of a camera employing the image encoding device 100 and image decoding device 200 to which the present invention has been applied.

A camera 1300 shown in FIG. 30 images a subject, displays an image of the subject on an LCD 1316, and records this in a recording medium 1333 as image data.

A lens block 1311 inputs light (i.e., picture of a subject) to a CCD/CMOS 1312. The CCD/CMOS 1312 is an image sensor employing a CCD or CMOS, which converts the intensity of received light into an electrical signal, and supplies to a camera signal processing unit 1313.

The camera signal processing unit 1313 converts the electrical signal supplied from the CCD/CMOS 1312 into color difference signals of Y, Cr, and Cb, and supplies to an image signal processing unit 1314. The image signal processing unit 1314 subjects, under the control of a controller 1321, the image signal supplied from the camera signal processing unit 1313 to predetermined image processing, or encodes the image signal thereof by an encoder 1341. The image signal processing unit 1314 supplies encoded data generated by encoding an image signal, to a decoder 1315. Further, the image signal processing unit 1314 obtains data for display generated at an on-screen display (OSD) 1320, and supplies this to the decoder 1315.

With the above-mentioned processing, the camera signal processing unit 1313 appropriately takes advantage of DRAM (Dynamic Random Access Memory) 1318 connected via a bus 1317 to hold image data, encoded data encoded from the image data thereof, and so forth in the DRAM 1318 thereof according to need.

The decoder 1315 decodes the encoded data supplied from the image signal processing unit 1314, and supplies obtained image data (decoded image data) to the LCD 1316. Also, the decoder 1315 supplies the data for display supplied from the image signal processing unit 1314 to the LCD 1316. The LCD 1316 synthesizes the image of the decoded image data, and the image of the data for display, supplied from the decoder 1315 as appropriate, and displays a synthesizing image thereof.

The on-screen display 1320 outputs, under the control of the controller 1321, data for display such as a menu screen or icon or the like made up of a symbol, characters, or a figure to the image signal processing unit 1314 via the bus 1317.

Based on a signal indicating the content commanded by the user using an operating unit 1322, the controller 1321 executes various types of processing, and also controls the image signal processing unit 1314, DRAM 1318, external interface 1319, on-screen display 1320, media drive 1323, and so forth via the bus 1317. Programs, data, and so forth necessary for the controller 1321 executing various types of processing are stored in FLASH ROM 1324.

For example, the controller 1321 can encode image data stored in the DRAM 1318, or decode encoded data stored in the DRAM 1318 instead of the image signal processing unit 1314 and decoder 1315. At this time, the controller 1321 may perform encoding/decoding processing using the same format as the encoding and decoding format of the image signal processing unit 1314 and decoder 1315, or may perform encoding/decoding processing using a format that neither the image signal processing unit 1314 nor the decoder 1315 can handle.

Also, for example, in the event that start of image printing has been instructed from the operating unit 1322, the controller 1321 reads out image data from the DRAM 1318, and supplies this to a printer 1334 connected to the external interface 1319 via the bus 1317 for printing.

Further, for example, in the event that image recording has been instructed from the operating unit 1322, the controller 1321 reads out encoded data from the DRAM 1318, and supplies this to a recording medium 1333 mounted on the media drive 1323 via the bus 1317 for storing.

The recording medium 1333 is an optional readable/writable removable medium, for example, such as a magnetic disk, a magneto-optical disk, an optical disc, semiconductor memory, or the like. It goes without saying that the recording medium 1333 is also optional regarding the type of a removable medium, and accordingly may be a tape device, or may be a disc, or may be a memory card. It goes without saying that the recoding medium 1333 may be a non-contact IC card or the like.

Alternatively, the media drive 1323 and the recording medium 1333 may be configured so as to be integrated into a non-transportable recording medium, for example, such as a built-in hard disk drive, SSD (Solid State Drive), or the like.

The external interface 1319 is configured of, for example, a USB input/output terminal and so forth, and is connected to the printer 1334 in the event of performing printing of an image. Also, a drive 1331 is connected to the external interface 1319 according to need, on which the removable medium 1332 such as a magnetic disk, optical disc, or magneto-optical disk is mounted as appropriate, and a computer program read out therefrom is installed in the FLASH ROM 1324 according to need.

Further, the external interface 1319 includes a network interface to be connected to a predetermined network such as a LAN, the Internet, or the like. For example, in accordance with the instructions from the operating unit 1322, the controller 1321 can read out encoded data from the DRAM 1318, and supply this from the external interface 1319 to another device connected via the network. Also, the controller 1321 can obtain, via the external interface 1319, encoded data or image data supplied from another device via the network, and hold this in the DRAM 1318, or supply this to the image signal processing unit 1314.

The camera 1300 thus configured employs the image decoding device 200 as the decoder 1315. That is to say, in the same way as with the image decoding device 200, the decoder 1315 decodes encoded data supplied from the image encoding device 100 for each entropy slice in parallel, and generates decoded image data. At this time, in the same way as with the image decoding device 200, the decoder 1315 divides the image before encoding, corresponding to the encoded data to be decoded, into vertically arrayed multiple (an even number) regions. The decoder 1315 then performs decoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the decoder 1315 performs decoding opposite the conventional manner, in the order from the bottom macroblock line toward the top, for the encoded data corresponding to odd-numbered regions from the top, referencing as peripheral macroblocks the macroblock one to the left and one below the macroblock to be processed.

Further, at the point that decoding of encoded data corresponding to the bottommost macroblock line of the odd-numbered regions from the top ending, the decoder 1315 starts decoding processing for the encoded data of the region one thereunder (even-numbered from the top).

Also, at this time, the decoder 1315 references the bottommost macroblock line of the odd-numbered regions from the top to perform decoding processing for the encoded data corresponding to the topmost macroblock line of the region one thereunder (even-numbered from the top).

Accordingly, the decoder 1315 can realize high speed image encoding while suppressing deterioration in encoding efficiency.

Accordingly, the camera 1300 can further improve encoding efficiency of image data generated at the CCD/CMOS 1312, encoded data of video data read out from the DRAM 1318 or recording medium 1333, and encoded data of video data obtained via a network for example, thereby realizing real-time processing with lower costs.

Also, the camera 1300 employs the image encoding device 100 as the encoder 1341. In the same way as with the image encoding device 100, the image encoder 1341 divides the image to be encoded into vertically arrayed multiple (an even number) regions. The image encoder 1341 then performs encoding in the conventional manner in the order from the top macroblock line toward the bottom for the encoded data corresponding to even-numbered regions from the top, referencing as peripheral macroblocks the macroblock one to the left and one above the macroblock to be processed.

Conversely, the image encoder 1341 performs encoding opposite the conventional manner, in the order from the bottom macroblock line toward the top, for odd-numbered regions from the top, referencing as peripheral macroblocks the macroblock one to the left and one below the macroblock to be processed.

Further, at the point that encoding has ended for the bottommost macroblock line of the odd-numbered regions from the top ending, the image encoder 1341 starts decoding processing for the encoded data of the region one thereunder (even-numbered from the top).

Also, at this time, the image encoder 1341 references the bottommost macroblock line of the odd-numbered regions from the top to perform encoding processing for the topmost macroblock line of the region one thereunder (even-numbered from the top).

Accordingly, the image encoder 1341 can realize high speed image encoding while suppressing deterioration in encoding efficiency.

Accordingly, by using the image encoding device 100 as the encoder 1341, the camera 1300 can suppress deterioration in encoding efficiency due to increased speed of image encoded of encoded data recorded in the DRAM 1318 or recording medium 1333 and encoded data provided to other devices for example. As a result thereof, the camera 1300 can realize real-time processing with lower costs.

Note that the decoding method of the image decoding device 200 may be applied to the decoding processing which the controller 1321 performs. In the same way, the encoding method of the image encoding device 100 may be applied to the encoding processing which the controller 1321 performs.

Also, the image data which the camera 1300 takes may be moving images or may be still images.

As a matter of course, the image encoding device 100 and image decoding device 200 may be applied to devices or systems other than the above-described devices.

Note that the present technology may have the following configurations.

(1) An image processing device which encodes image data, the image processing device including:

an encoding unit which, with a small region line in which are arrayed in the horizontal direction small regions obtained by dividing large regions arrayed in the vertical direction of an image as an object, performs encoding of image data of the large region, advancing the encoding order of small regions in the same order as with the scan order, and advancing the encoding order of small region lines in an order different from the scan order; and a control unit which controls the encoding unit so as to encode in accordance with a state of a left small region situated at a left periphery of a small region to be processed, and a state of a lower small region situated at a lower periphery of the small region to be processed.

(2) The image processing device according to (1), wherein the encoding unit, with image data of a large region situated odd-numbered from the top of the image as an object, advances the encoding order of small regions in the same order as with the scan order, and advances the encoding order of small region lines in an order different from the scan order.

(3) The image processing device according to (2), wherein the control unit, with image data of a large region situated odd-numbered from the top of the image as an object, controls the encoding unit so as to encode image data of a small region to be processed without referencing the state of a small region situated one below the small region to be processed, for a small region line situated at the bottommost position of a large region to be processed.

(4) The image processing device according to (3), wherein, in the event that image data of a small region line situated at the bottommost position of a large region to be processed has been stored in a storage unit, the control unit, with image data of a large region situated odd-numbered from the top of the image as an object, controls the encoding unit so as to read out and encode the image data from the storage unit in the order of the encoding.

(5) The image processing device according to (4), wherein the encoding unit, with image data of a large region situated even-numbered from the top of the image as an object, advances the encoding order of small regions in the same order as with the scan order for the small region lines, and advances the encoding order of the small region lines in the same order as with the scan order.

(6) The image processing device according to (5), wherein the control unit, with image data of a large region situated even-numbered from the top of the image as an object, for a small region line situated at the topmost position of a large region to be processed, controls the encoding unit so as to encode image data of a small region to be processed while referencing the state of a small region of the small region line situated at the bottommost position in a large region situated one above the large region.

(7) The image processing device according to (6), wherein, in the event that image data of a small region line situated at the topmost position of a large region to be processed has been stored in a storage unit, the control unit, with image data of a large region situated even-numbered from the top of the image as an object, controls the encoding unit so as to read out and encode the image data from the storage unit in the order of the encoding.

(8) The image processing device according to any one of (1) through (7), wherein the encoding unit advances the encoding order of the small region lines in the opposite order from the scan order.

(9) The image processing device according to (8), wherein the scan order is a raster scan order.

(10) An image processing method of an image processing device which encodes image data, wherein an encoding unit, with a small region line in which are arrayed in the horizontal direction small regions obtained by dividing large regions arrayed in the vertical direction of an image as an object, performs encoding of image data of the large region, advancing the encoding order of small regions in the same order as with the scan order, and advancing the encoding order of small region lines in an order different from the scan order; and a control unit controls the encoding unit so as to encode in accordance with a state of a left small region situated at a left periphery of a small region to be processed, and a state of a lower small region situated at a lower periphery of the small region to be processed.

(11) An image processing device which decodes encoded data of image data which has been encoded, the image processing device including:

a decoding unit which, with a small region line in which are arrayed in the horizontal direction small regions obtained by dividing large regions arrayed in the vertical direction of an image to which the encoded data corresponds as an object, performs decoding of encoded data of the large region, advancing the decoding order of small regions in the same order as with the scan order, and advancing the decoding order of small region lines in an order different from the scan order; and a control unit which controls the decoding unit so as to decode in accordance with a state of a left small region situated at a left periphery of a small region to be processed, and a state of a lower small region situated at a lower periphery of the small region to be processed.

(12) The image processing device according to (11), wherein the decoding unit, with image data of a large region situated odd-numbered from the top of the image as an object, advances the decoding order of small regions in the same order as with the scan order, and advances the decoding order of small region lines in an order different from the scan order.

(13) The image processing device according to (12), wherein the control unit, with image data of a large region situated odd-numbered from the top of the image as an object, controls the decoding unit so as to decode image data of a small region to be processed without referencing the state of a small region situated one below the small region to be processed, for a small region line situated at the bottommost position of a large region to be processed.

(14) The image processing device according to (13), wherein, in the event that image data of a small region line situated at the bottommost position of a large region to be processed has been stored in a storage unit, the control unit, with image data of a large region situated odd-numbered from the top of the image as an object, controls the decoding unit so as to read out and decode the image data from the storage unit in the order of the decoding.

(15) The image processing device according to any one of (11) through (14), wherein the decoding unit, with encoded data of a large region situated even-numbered from the top of the image as an object, advances the decoding order of small regions in the same order as with the scan order for the small region lines, and advances the decoding order of the small region lines in the same order as with the scan order.

(16) The image processing device according to any one of (11) through (15), wherein the control unit, with encoded data of a large region situated even-numbered from the top of the image as an object, for a small region line situated at the topmost position of a large region to be processed, controls the decoding unit so as to decode encoded data of a small region to be processed while referencing the state of a small region of the small region line situated at the bottommost position in a large region situated one above the large region.

(17) The image processing device according to (16), wherein, in the event that image data of a small region line situated at the topmost position of a large region to be processed has been stored in a storage unit, the control unit, with image data of a large region situated even-numbered from the top of the image as an object, controls the decoding unit so as to read out and decode the image data from the storage unit in the order of the decoding.

(18) The image processing device according to any one of (11) through (17), wherein the decoding unit advances the decoding order of the small region lines in the opposite order from the scan order.

(19) The image processing device according to (18), wherein the scan order is a raster scan order.

(20) An image processing method of an image processing device which decodes encoded data of image data which has been encoded, wherein a decoding unit, with a small region line in which are arrayed in the horizontal direction small regions obtained by dividing large regions arrayed in the vertical direction of an image to which the encoded data corresponds as an object, performs decoding of encoded data of the large region, advancing the decoding order of small regions in the same order as with the scan order, and advancing the decoding order of small region lines in an order different from the scan order; and a control unit controls the decoding unit so as to decode in accordance with a state of a left small region situated at a left periphery of a small region to be processed, and a state of a lower small region situated at a lower periphery of the small region to be processed.

REFERENCE SIGNS LIST 100 image encoding device
106 lossless encoding unit
151 control unit
152 storage unit
153 slice 1 processing unit
154 slice 2 processing unit
200 image decoding device
202 lossless encoding unit
251 demultiplexer
252 slice 1 processing unit
253 slice 2 processing unit
301 context processing unit
501 control unit
503 slice 3 processing unit
504 slice 4 processing unit
551 demultiplexer
552 slice 3 processing unit
554 slice 4 processing unit

The invention claimed is:

1. A decoding method for decoding a bit stream, comprising:
performing an arithmetic decoding process, via circuitry of an image processing device, using a context on a current block line of the bit stream; and
controlling the arithmetic decoding process, via the circuitry, so as to initialize a context used in the arithmetic decoding process for a top block of the current block line using a context used in the arithmetic decoding process for a previous block of a previous block line.

2. The decoding method according to claim 1, further comprising controlling the arithmetic decoding process, via the circuitry, so as to use the context used in the arithmetic decoding process for the previous block of the previous block line as an initial value.

3. The decoding method according to claim 2, further comprising controlling the arithmetic decoding process, via the circuitry, so as to use a stage of a probability table used in the arithmetic decoding process for the previous block of the previous block line as the initial value.

4. The decoding method according to claim 1, wherein the previous block line is a neighboring block line on top of the current block line.

5. An image processing device for decoding a bit stream, comprising:
circuitry configured to:
perform an arithmetic decoding process using a context on a current block line of the bit stream; and
control the arithmetic decoding process so as to initialize a context used in the arithmetic decoding process for a top block of the current block line using a context used in the arithmetic decoding process for a previous block of a previous block line.

6. The image processing device according to claim 5, wherein the circuitry is configured to control the arithmetic decoding process so as to use the context used in the arithmetic decoding process for the previous block of the previous block line as an initial value.

7. The image processing device according to claim 6, wherein the circuitry is configured to control the arithmetic decoding process so as to use a stage of a probability table used in the arithmetic decoding process for the previous block of the previous block line as the initial value.

8. The image processing device according to claim 5, wherein the previous block line is a neighboring block line on top of the current block line.

* * * * *